US010625288B2

(12) United States Patent
Grossman

(10) Patent No.: US 10,625,288 B2
(45) Date of Patent: Apr. 21, 2020

(54) SYSTEM FOR GROWING PLANTS AND METHOD OF OPERATION THEREOF

(71) Applicant: Victor A. Grossman, Staten Island, NY (US)

(72) Inventor: Victor A. Grossman, Staten Island, NY (US)

( * ) Notice: Subject to any disclaimer, the term of this patent is extended or adjusted under 35 U.S.C. 154(b) by 0 days.

(21) Appl. No.: 16/357,187

(22) Filed: Mar. 18, 2019

(65) Prior Publication Data

US 2019/0278304 A1 Sep. 12, 2019

Related U.S. Application Data

(63) Continuation of application No. 15/495,813, filed on Apr. 24, 2017, now Pat. No. 10,234,876, which is a (Continued)

(51) Int. Cl.
*G05D 11/00* (2006.01)
*B05B 12/08* (2006.01)
(Continued)

(52) U.S. Cl.
CPC .......... *B05B 12/087* (2013.01); *A01B 79/005* (2013.01); *A01C 1/042* (2013.01); *A01C 1/044* (2013.01); *A01C 21/00* (2013.01); *A01G 25/02* (2013.01); *A01G 25/09* (2013.01); *A01G 25/16* (2013.01); *A01G 25/167* (2013.01); *A01G 27/00* (2013.01); *A01M 7/006* (2013.01); *A01M 7/0042* (2013.01); *B05B 12/008* (2013.01); *G05D 7/0617* (2013.01); *G05D 7/0635* (2013.01); *G05D 7/0676* (2013.01);
(Continued)

(58) Field of Classification Search
CPC ......... B22F 3/005; G06F 17/50; B23K 26/03; A01D 46/005; A01C 23/042; A01C 23/023; A01G 31/02; A01G 25/16; A01L 379/005; G06T 7/0012; H04N 5/2252; A01M 7/0042; F16K 31/0606; B05B 12/087; A01B 79/005
See application file for complete search history.

(56) References Cited

U.S. PATENT DOCUMENTS

| | | | | |
|---|---|---|---|---|
| 4,015,366 A * | 4/1977 | Hall, III ............... | A01D 46/005 47/1.43 |
| 6,575,218 B1 * | 6/2003 | Burns ..................... | B22F 3/005 156/512 |

(Continued)

*Primary Examiner* — Tuan A Vu

(57) ABSTRACT

A system for growing plants, the system may include a substrate having one or more weakened areas or openings: one or more grow portions coupled to the substrate and situated at the one or more weakened areas or openings and having at least one seed or plant; and/or a fluid distribution portion coupled to the substrate and configured to provide fluid to the one or more grow portions. The system may further include a method of operation including one or more acts of: obtaining a weather forecast for a future time period; determining whether rain is expected during the future time period; and preventing, terminating, or restricting an irrigation cycle when it is determined that rain is expected during the fare time period. The restricting may restrict a flow of liquid during the irrigation cycle or shorten the irrigation interval.

20 Claims, 32 Drawing Sheets

Related U.S. Application Data continuation of application No. 14/167,926, filed on Jan. 29, 2014, now Pat. No. 9,629,313.

(60) Provisional application No. 61/758,074, filed on Jan. 29, 2013.

(51) Int. Cl.

| | |
|---|---|
| ***A01C 21/00*** | (2006.01) |
| ***A01C 1/04*** | (2006.01) |
| ***A01G 25/16*** | (2006.01) |
| ***A01B 79/00*** | (2006.01) |
| ***A01G 25/02*** | (2006.01) |
| ***B05B 12/00*** | (2018.01) |
| ***A01M 7/00*** | (2006.01) |
| ***A01G 25/09*** | (2006.01) |
| ***A01G 27/00*** | (2006.01) |
| ***G05D 7/06*** | (2006.01) |
| *A01G 9/02* | (2018.01) |
| *A01G 9/14* | (2006.01) |
| *A01G 9/24* | (2006.01) |
| *A01G 13/02* | (2006.01) |
| *G06K 9/20* | (2006.01) |

(52) U.S. Cl.

CPC .............. *A01G 9/022* (2013.01); *A01G 9/023* (2013.01); *A01G 9/024* (2013.01); *A01G 9/1423* (2013.01); *A01G 9/246* (2013.01); *A01G 13/0231* (2013.01); *A01G 25/023* (2013.01); *A01G 27/003* (2013.01); *A01G 27/005* (2013.01); *G06K 9/2018* (2013.01); *Y02A 40/252* (2018.01); *Y02A 40/268* (2018.01)

(56) References Cited

U.S. PATENT DOCUMENTS

| | | | | | |
|---|---|---|---|---|---|
| 7,081,611 | B2 * | 7/2006 | Scott | A01B 79/005 239/155 |
| 8,170,721 | B2 * | 5/2012 | Nickerson | A01G 25/16 137/78.2 |
| 9,420,776 | B2 * | 8/2016 | Kline, III | A01M 7/0042 |
| 9,435,458 | B2 * | 9/2016 | Needham | F16K 31/0606 |
| 10,159,178 | B2 * | 12/2018 | Muff | A01C 23/023 |
| 10,255,670 | B1 * | 4/2019 | Wu | H04N 5/2252 |
| 10,269,107 | B2 * | 4/2019 | Jackson | G06T 7/0012 |
| 2004/0249505 | A1 * | 12/2004 | Sardas | A01G 31/02 700/245 |
| 2008/0097653 | A1 * | 4/2008 | Kaprielian | A01C 23/042 700/284 |
| 2009/0179017 | A1 * | 7/2009 | Matsumoto | B23K 26/03 219/121.71 |
| 2012/0084167 | A1 * | 4/2012 | Corlett | G06F 17/50 705/26.3 |

* cited by examiner

SYSTEM FOR GROWING PLANTS AND METHOD OF OPERATION THEREOF

REFERENCE TO PRIORITY APPLICATION

This application is continuation of U.S. patent application Ser. No. 15/495,813, filed Apr. 24, 2017, now U.S. Pat. No. 10,234,876 which is a continuation of U.S. patent application Ser. No. 14/167,926, filed Jan. 29, 2014, now U.S. Pat. No. 9,629,313, which claims priority to U.S. Provisional Application Ser. No. 61/758,074, filed Jan. 29, 2013, and entitled "SYSTEM FOR GROWING PLANTS AND METHOD OF OPERATION THEREOF," the contents of which are incorporated herein by reference in its entirety.

FIELD OF THE INVENTION

The present invention relates generally to a system for growing plants and, more particularly, to an environmentally friendly system for planting, growing, and watering plants and a method of operation thereof.

BACKGROUND OF THE INVENTION

Conventional farming systems and methods are inefficient and waste valuable resources such as water. For example, conventional farming irrigation methods (e.g., overhead, pressurized, unpressurized, and/or gravity flow methods) apply water to planted areas as well as unplanted areas (e.g., generally areas between rows for the sake of clarity). As watering the unplanted areas is not necessary, these methods waste water and are inefficient. Moreover, when these systems apply additive such as fertilizer, pesticides, herbicides, etc. these additives are also applied to the unplanted areas and contributes to ground pollution. Further, with regard to water-scarce locations (e.g., arid locations, desserts, etc.), growing certain crops such as water intensive crops using conventional irrigation methods may require more water than is available these locations. Accordingly, it can be difficult if not entirely impossible to grow water intensive crops in water-scarce locations using conventional farming methods.

Soil moisture levels are often difficult to accurately and/or efficiently control at one or more locations using conventional farming methods. Similarly, soil matric potentials are often difficult to accurately and/or efficiently control at one or more locations using conventional farming methods.

Moreover, with regard planting seeds, conventional farming methods rely upon seed drills to deposit seeds into the ground. Unfortunately, seed drills cannot fully condition the soil in which seeds are planted so as to provide an environment conducive to growth of the seeds such as an environment with nutrients and/or moisture retainers. Moreover, conventional seed drills cannot accurately track location of seeds when planting crops using mixed seed types such as is typical in research and/or rest plots.

Further, laying out and/or planting landscapes such as commercial landscapes is labor intensive, difficult to accurately lay out, and can often take days to cover a relatively small area. Accordingly, commercial landscapes are often expensive.

SUMMARY OF THE INVENTION

Therefore, embodiments of the present invention to solve the above-noted and other problems of conventional growing methods and provide a system, apparatus, computer program, an/or method (hereinafter each of which will be referred to as a system for the sake of clarity unless the context indicates otherwise) to efficiently grow seeds and/or plants and/or combinations thereof. Embodiments of the present invention to provide a system for planting (or sowing) seeds, securing seeds, watering seeds, priming seeds, sprouting seeds, growing plants, distributing seeds, distributing plants, etc. Further, embodiments of the present system may control, reduce, or entirely prevent the growth of undesirable (e.g. in a certain area) plants (e.g., weeds), bacteria, fungi, etc. Embodiments of the present system may further control soil moisture levels and/or soil matric potentials in accordance with desired settings which may be set by the user and/or system.

BRIEF DESCRIPTION OF THE DRAWINGS

Embodiments of the present invention will now be described, by way of example, with reference to the accompanying drawings, wherein.

DETAILED DESCRIPTION OF THE INVENTION

Embodiments of the present invention will now be described in detail with reference to the drawings. For the sake of clarity, certain features of the invention will not be discussed when they would be apparent to those with skill in the art. In some figures, for the sake of clarity, cross hatching may not be included in cutaway (e.g., cross-sectional) views.

Figure 1:
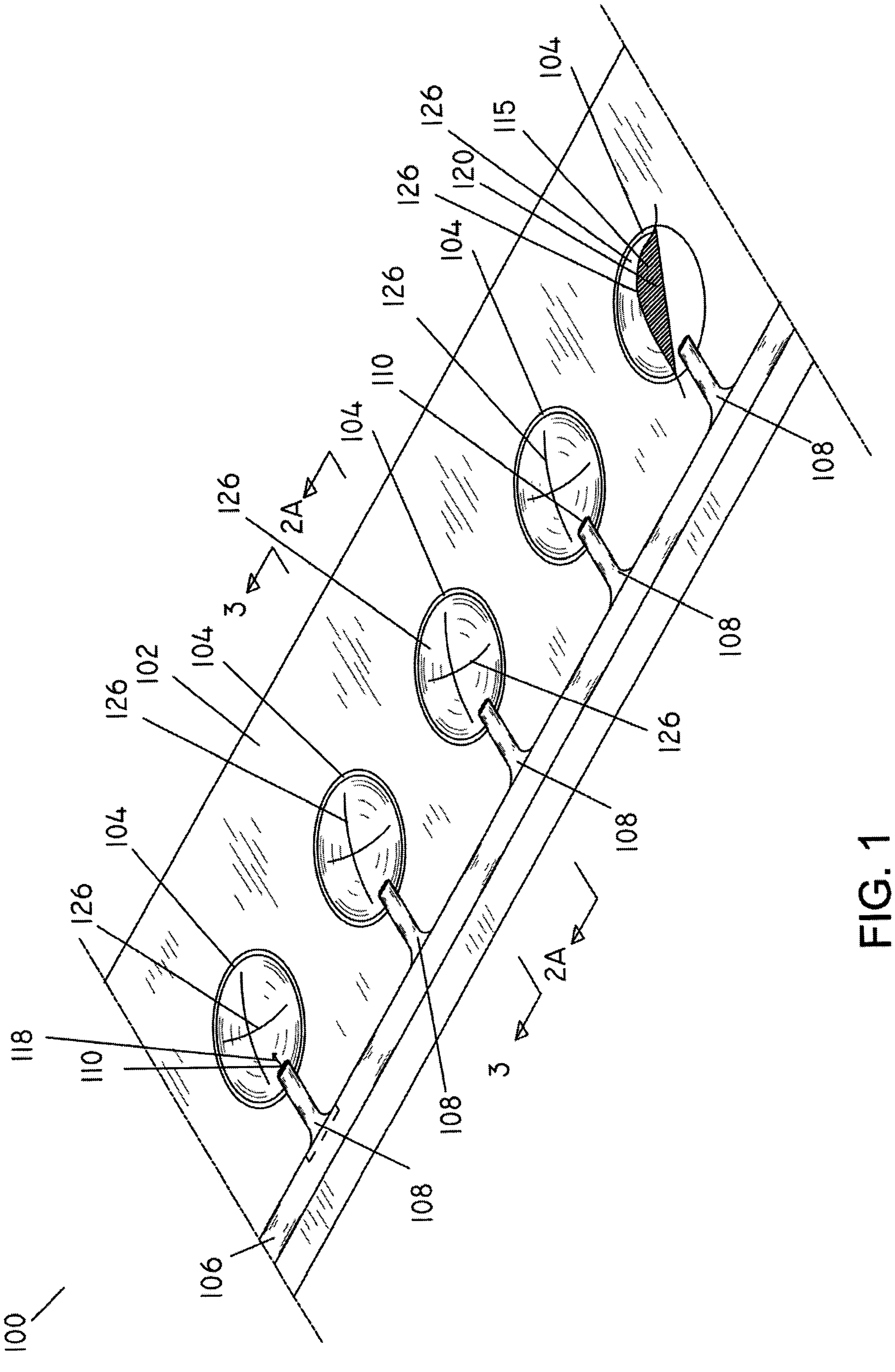
FIG. 1 is a perspective view illustration of a portion of a system in accordance with embodiments of the present system.

FIG. 1 is a perspective view illustration of a portion of a system 100 in accordance with embodiments of the present system. The system 100 may include one or more of a substrate 102, flow manifold 106, and one or more grow portions 104. For the sake of simplicity, only a portion of the substrate 102 of the system 100 is shown and is understood that the substrate 102, and/or grow areas 104 may be shaped and/or sized, as desired. Father, the grow portions 104 may be spaced from each other by a desired distance and/or may be formed integrally with other substrates 104 if desired. Further, embodiments of the system 100, in whole or portions thereof, may be scaled (e.g., in size, shape, number of grow portions 102, number of flow manifolds 106, etc.) to a desired shape and/or size, as desired. For example, rows of flow manifolds 106 may be repeated and may provide liquid to corresponding rows of grow portions such as grow portions 104.

The substrate 102 may be shaped and/or sized to cover a desired area and may be made from any suitable material or materials such as, for example, a landscape fabric, a weed control fabric, a woven material, a non-woven material a non-woven fibrous weed-blocking material, etc. However, it is also envisioned that the substrate 102 may include other materials and/or combinations thereof such as fibrous material (e.g., woven, non-woven, etc.), plastic, polymers, paper, netting, rubber, foils (e.g., aluminum), corrugated materials (e.g., plastic, paper, cardboard, etc.), fabrics (e.g., burlap, netting, etc.), organic materials, etc. It is further envisioned that the substrate 102 (depending upon the material or materials from which it is made from) may be permeable and/or impermeable by certain substances such as certain elements, certain chemical compounds, chemicals, radiation (e.g., solar (e.g., ultra violet (UV)), etc. Accordingly, for example, if desired, one or more portions of the substrate or portions thereof may be impermeable to, for example, air, water, water vapor, oxygen, nitrogen, etc. However, in yet other embodiments, the substrate 102 or portions thereof may be permeable by, for example, air, etc. In yet other embodiments, the substrate and/or portions thereof, may include a radiation barrier to filter UV. It is further envisioned that the substrate 102 may include one or more openings or surfaces which may be shaped and/or sized to provide a desired amount or air/liquid (e.g., water, etc.) to flow from one area of the substrate 102 to another. For example, the one or more openings may extend partially or fully from one major surface of the substrate 102 to another major surface of the substrate 102 (e.g., from a first major side to the other major side of the substrate 102) such that the gasses (e.g., air, etc.) and/or liquids (e.g., water, nutrients, etc.) may travel into and/or out of the ground or portions of the substrate 102 during use in one or more areas, as desired. Further, in yet other embodiments it is envisioned that the substrate 102 may include one or more active (e.g., under the control of a controller) or passive cooling portions which may be operative to cause liquid to condense. This condensed liquid may then be channeled to a desired area, if desired, for storage and/or immediate fluid deliver to plants.

Moreover, in certain embodiments it is further envisioned that the substrate 102 may include additives such as nutrients, fertilizers, pesticides, insecticides, herbicides, bactericide, and/or fungicides (hereinafter generally additive or additives unless the context indicates otherwise). The additives may be formed integrally with the substrate 102 or may be added thereto. For example, in some embodiments, the additives may be sprayed upon, or otherwise applied to, the substrate 102 in one or more areas such as at the grow areas 104 between grow portions, at the edges of the substrate 102, etc. The additives may decompose (e.g., may be compostable) over time, when exposed to sun, when exposed to liquids (e.g., water), etc., as desired for a particular application. The additives may then flow into a surrounding environment (e.g., into the soil), into parts of the substrate 102, and/or into grow portions 104, if desired. For example, in accordance with some embodiments the additives such as pesticides may be located at upper and lower major surfaces of the substrate 102 about one or more corresponding grow areas 102 in, for example, a ring pattern.

In some embodiments the substrate 102 may include nano-technology-based (type) materials which may be configured to have certain desired characteristics such as facilitating condensation and collection of water (e.g., from the environment). Further, it is envisioned that the substrate 102 may be formed from one or more biodegradable materials which may decay or otherwise decompose during use if desired. Further, it is envisioned that the biodegradable material may be configured to release additives (e.g., nutrients) when decomposing so as to, for example, fertilize the soil beneath it, release nutrients, pesticides, fungicides, bactericides, herbicides, etc. contained in the additives. However, it is also envisioned that the substrate 102, or portions thereof, may be formed from one or more non-biodegradable materials. In some embodiments, the additives may be sufficient for a single growing cycle.

The substrate 102 may include one or more grow portions 104. One or more of the grow portions 104 may be different from, or the same as, other grow portions 104. However, for the sake of clarity, it will be assumed that each grow portion 104 is similar to other grow portions 104. Accordingly, only a single grow portion 104 may be discussed for the sake of clarity. Further, each grow portion 104 may have any suitable shape and/or size such as oval, round, square, rectangular, polyhedral, etc., as may be desired. However, for the sake of clarity, it will be assumed that each grow portion 104 has a substantially round (plan) profile when viewed from above.

The grow portion 104 may be formed integrally with or separately from the substrate 102. For example, in some embodiments, the substrate 102 may form at least part of the grow portion 104. The grow portion 104 may include a cavity (or more than one cavity) suitable for containing a filler. The filler may include, for example, one or more of seed(s), plant(s) (or portions) and a grow portion fill (GPF). The GPF may include one or more of soil (e.g., seed starter soil, sand, rock, clay, etc.), organic matter (OM) (e.g., organisms, sphagnum, compostable matter, organic material etc.), perlite, lattices, scaffolds, cardboard, water retaining material, a seed starter or starting mix, non-organic matter (e.g., stones, etc.) a water wicking material, additives, and/or combinations thereof. However, it is also envisioned that the filler may include other materials as may be desired by a user and/or may be configured for enhancing growth of the seeds or plants included with the filler. The seeds and/or plants may include the same or different varieties, etc., as may be desired by the system and/or user. For the sake of clarity, in the present embodiment, it will be assumed that the filler may include seeds and a GPF such as a seed staring mix configured to promote the germination of the corresponding seeds. The seeds may be pelletized, primed, etc., if desired. With regard to the scaffolds and lattices, these may be configured to promote the growth and/or spread of roots from the seeds and/or plants, may wick fluids and/or provide aeration and/or a support path for the seeds and/or roots of plants. The materials (or parts thereof) which are included in the filler may be configured randomly and/or in a desired pattern such as a layered order (e.g., layer 1 upon layer 2, etc.). For example, the seeds may be placed in a layer of seed starter soil which is located upon a water wicking layer such as may be formed by a fluid (e.g., water) wicking mesh layer (or layers) in communication with a fluid source, etc. Thus, the filler may include one or more materials which may be layered in a certain order, if desired.

The fluid wicking layer may be formed from any suitable water wicking material such as an elastic material, a deformable material, a lattice having sufficient openings, a compostable material, etc. which may, if desired, provide for the passage of roots. In some embodiments, the filler may include a compostable germination sheet. In yet other embodiments, the filler may include solid filler (e.g., a compressed filler) such as is found in Miracle Grow™ Expand'n Grown™ or the like. The solid filler which may expand with time and/or with exposure to a liquid such as water and/or additives from, for example, the fluid from the flow manifold 106. Further, it is envisioned that the solid filler may include one or more solid filler layers similarly to a loose filler layer.

In some embodiments such as those which include a solid filler, a seed scaffold, a compostable germination sheet (generally a solid filler), a compostable cardboard filler (e.g., including seeds), etc., the filler may be attached to the substrate 104 using any suitable attachment method (e.g. using friction fitting, adhesives, threads, bonding, welding, etc.). As attachment methods may vary based upon materials used for the substrate and/or the filler, the attachment methods should be selected to be compatible with either or both of the substrate (or portions thereof) and the filler (or portions thereof). Further, as a grow portion having a solid filler may lack a cavity, it may be assumed for the sake of clarity, that a cavity of this grow portion may be defined at least in part by an outer peripheral surface of the solid filler of the corresponding grow portion.

The flow manifold 106 may be in controllable flow communication with one or more fluid sources such as, for example, mains water, reservoir water (e.g., stored by the system), and additives. One or more valves may be situated between the one or more fluid sources (or parts thereof) and the flow manifold to control the flow of fluids such as water and/or additives supplied to the flow manifold 106. Further, the one or more valves may be variably controlled by the controller so as to control an amount of fluids provided to the flow manifold 106. Accordingly, the controller may be configured to determine desired amounts of fluids from the fluid sources to be provided from the sources to the flow manifold 106. Thus, the controller may control amounts of, and/or proportions of, additives (e.g., nutrients, bactericide, fungicide, herbicides, pesticides, etc.). Accordingly, the controller may be operative to activate one or more pumps to pressurize fluids such that they may flow in the flow manifold 106. However, in yet other embodiments, a gravity flow system or pressure from a mains fluid supply may be operative to pressurize fluid(s) of the system, if desired.

The system may further include sensors to provide sensor information, such as flow rates, flow velocity, conductivity, moisture levels, PH levels, temperature, UV level, light intensity levels (e.g. sunlight), time (e.g., day, date, time), etc., to the controller. The controller may then process the sensor information and determine when to open and/or close the one or more valves so as to open or close a flow of fluid from the one or more fluid sources such as selected fluid sources. The one or more fluid sources may include water (mains), water (reservoir), water (well), nutrients (e.g., fertilizer), bactericide, herbicide, fungicide, and/or pesticide sources, as desired, and may be selected by the controller. The system may include algorithms and/or lookup tables which the controller may refer to determine actions to perform (e.g., open additive valve #1, close additive valve #2, open water valve 1 (mains water), activate pressure pump #2 (10 psi), regulate fluid pressure (e.g., using a controlled pressure regulator) (line 1 10 psi), etc.), in accordance with sensor information. The algorithms and/or lookup tables may be formed and/or set by the system (e.g., heuristically using history information, etc.) and/or user. The algorithms and/or lookup table may be different for different varieties of seeds, plants, weather patterns, location, and/or soil types, as desired.

The system may also include solid flow valves and/or mixers which may mix a solid (e.g., fertilizer powder or solid) with a fluid such as water. Thus, the sources may receive, for example, some additives in a solid form such as in a powder form and may thereafter mix the corresponding powder with a liquid such as water so as to form a liquid for distribution to one or more of the grow portions 104. Accordingly, in some embodiments, the one or more valves may include wet or dry valves to control a flow of fluids or solids (e.g., solid powders), respectively.

Further, the present system may condense, collect, and/or store fluids such as water for later use. For example, it is envisioned that the controller may be configured to collect fluids using passive and/or active techniques. For example, in some embodiments, it is envisioned that the system may be operative to condense liquids from the atmosphere using, for example, active or passive condensation techniques. Accordingly, the present system may include a cooling system (e.g., a thermo-electric module (TEM)), a chiller, a heat pump, gas-based refrigerators, etc.), operative under the control of the controller to chill atmospheric air to condense water vapor contained in the atmosphere and/or may store the condensed water in a water reservoir of the present system. Further, it is envisioned that the controller may be operative to control pumps and valves of the system to transfer the collected fluids to a desired reservoir and/or fluid channel of the system.

Further, embodiments of the system may include fluid pumps which may be controlled by the controller and which may be operative to pressurize fluids of the system such as water, additives, etc. Further, it is envisioned that sensors of the system may provide sensor information such as fluid level information, flow rate information, total flow information, pressure information, temperature, electrical resistance, acidity (e.g., PH) level, temperature, pressure, etc. for use by the controller to determine proper actions to perform based up the sensed information as may be discussed elsewhere.

The flow manifold 106 may include one or more drippers, emitters, openings and/or flow runners (generally runners) 108 which may be operative to direct fluids contained within the flow manifold 106 to one or more desired locations such as to one or more of the grow portions 104. Accordingly, the runners 108 may be in flow communication with the flow manifold 106 and may receive fluid from the flow manifold 106 and may be operative to transfer the received fluid to the corresponding grow portions 104. The runners 108 may be shaped and/or sized to deliver fluids to the corresponding grow portions 104. In embodiments of the present system, the runners 108 may be shaped and/or sized to distribute the fluid to one or more desired locations of the corresponding grow portions 104. Accordingly, the runners 108 may have one or more exit openings and/or fluid control orifices such as flow valves 110. Further, one or more of the runners 108 may have a shape and/or size which is the same as or different from other runners 108. The emitters and/or drippers may be located within the flow manifold 106 and/or the runners 108. For example, in some embodiments the emitters/drippers may be situated in the flow manifold 106 and may provide fluid to a corresponding runner 108. However, in yet other embodiments, the emitters/drippers may be located in a corresponding runner 108 and may provide fluid to an opening situated directly in the flow manifold 106. The flow manifold 106 and/or runners 108 or portions thereof may be of (fluid) return or returnless types. Further, the flow manifold 106 and/or portions thereof may be formed from a foldable type material. It is further envisioned that in some embodiments, that the flow manifold may be formed from one or more plastic layers which may be bonded to each other and/or from a woven material Further, in some embodiments, it is envisioned that the substrate may include a plurality of cuts or straps through which the flow manifold may travel (e.g., from an upper surface to a lower surface and/or vice versa) such that the flow manifold 108 or portions thereof may be assumed to be threaded or woven into or through the substrate and/or may pass through the straps. Further, it is envisioned that the flow manifold 108 may be foldable.

Each runner 108 may include one or more flow valves 110 (e.g., emitters/drippers) which may control a fluid pressure and/or flow from a corresponding runner 108. The flow valves 110 may be set to control fluid flow such that a desired fluid flow is maintained during operation and may be formed integrally with, or separately from, a corresponding runner 108. For example, integrated flow valves 110 may be formed by shaping (e.g., using any suitable method such as welding, molding, seaming, bonding, etc.) one or more openings of corresponding runners to desired shapes and/or sizes. In yet other embodiments, flow valves may be formed by cutting one or more openings in corresponding runners. However, in yet other embodiments, it is envisioned that flow valves 110 may include an orifices (e.g., having a desired flow rate value (fixed) or range (e.g., actively controllable)) which may be attached to corresponding runners. In yet other embodiments, the flow valves 110 may include conventional emitters and/or drippers. The flow valves 110 may be located at an end of or within a corresponding runner 108 and may be active (e.g., controlled by the controller) or passive. However, it is also envisioned that the flow valves 110 may be located in other areas such as in the flow manifold 106 and/or runners 108. Further, is also envisioned that one or more of the flow valves 110 may be operated electronically (e.g., actively) to control (e.g., by a controller of the present system) a flow pressure and/or rate. A water flow direction out of the flow valves 110 is indicated by arrow 118 and fluid which exits a runner 108 may be delivered to a corresponding grow portion 104. However, in yet other embodiments, it is envisioned that a water wicking material of a grow portion 104 is in flow communication with the flow manifold 106 or the runner 108 and is operative deliver or otherwise wick fluid from the flow manifold 106 or runner 108 to the corresponding grow portion 104 so as to receive fluid from the flow manifold 106 and/or runner 108. Accordingly, fluid such as water may be provided to each grow portion 108 to promote growth of seeds and/or plants within the corresponding grow portion in an efficient manner. In some embodiments, the flow manifold 106 and/or the runner 108 may be include a foldable type hose. In yet other embodiments, the flow manifold 106 and/or the runner 108 may include one or more layers. In further embodiments, the flow manifold 106 and/or the runners 108 may be formed from two or more substrates (e.g. films) bonded to each other so as to form a cavity within.

Although a row of grow portions 104 are shown to one side of the flow manifold 106, it yet other embodiments, it is envisioned that a single flow manifold 106 may be situated between, and supply fluids to, a plurality rows and/or columns of grow portions 104 situated on, for example, two or more sides of the flow manifold 106. Thus, grow portions 104 supplied with fluids by the flow manifold 106 may be located on one or more sides of the corresponding flow manifold 106. Accordingly, the runners and/or flow valves 110 may be in flow communication with and located on both sides of a corresponding flow manifold 106.

In some embodiments, the flow manifold 106, the runners 108, and/or the flow valves 110 may be formed integrally with each other using, for example, one or more polymer sheets which are sealed to each other along an outer periphery and which has a cavity to form the flow manifold 106, the runners 108, and/or the flow valves 110. The flow valves 110 may comprise an opening along the outer peripheral seal or may be formed at other locations, and should be shaped and sized such that it may provide a desired liquid flow rate. However, in yet other embodiments, the flow valves 110 may be actively controllable.

One or more of the manifold 106, the runners 108, and/or the flow valves 110 may be formed using a suitable flow material as is known in the art such as, for example, rubber, vinyl, a woven material, a non-woven material, a multiple layered material, etc. It is further envisioned that the sections of one or more of the manifold 106, the runners 108, and/or the flow valves 110 may be formed using porous material which may allow liquids to pass therethrough such as is used in typical soaker hoses in which case the flow valves may not be necessary. The emitters and/or drippers may include conventional emitters and/or drippers as may be manufactured by, for example, the Netafim™ corporation.

However, it is also envisioned that one or more portions of the flow manifold 106, the runners 108, and/or the flow valves 110 may be formed using tubular hoses which may be coupled to each other.

In some embodiments, it is envisioned that the grow portion and/or substrate may include control layers such as moisture retaining layers, moisture wicking layers, permeable layers (e.g., gas and/or moisture permeable layers), matric control layers, and/or impermeable layers (e.g., gas and/or moisture impermeable layers), as desired. Accordingly, the control layers may remain for the duration of use, may be removed by a user (e.g., prior to use and/or at a certain time), and/or may decay or decompose (e.g., when exposed to desired conditions such as water, liquids (e.g., dissolvent, etc.), certain temperature(s), moisture, light (e.g., certain wavelengths of light such as sunlight. UV light, etc.), etc., and/or combinations thereof.

Figure 2A:
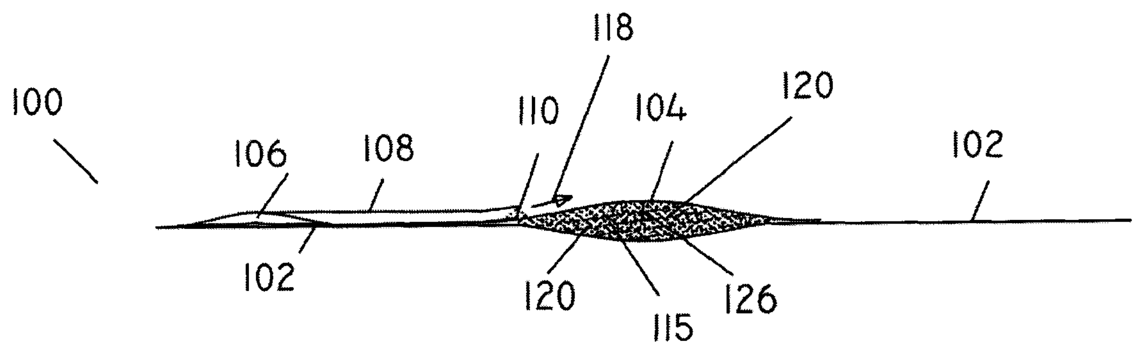
FIG. 2A is cross sectional view illustration of a portion of the system taken along lines 2A-2A of FIG. 1 in accordance with embodiments of the present system.

FIG. 2A is cross sectional view illustration of a portion of the system 100 taken along lines 2A-2A of FIG. 1 in accordance with embodiments of the present system. The substrate 102 may form at least a portion of a cavity 120 of the grow portion 104. An upper sheet 124 may be attached to the substrate 102 so as to form at least another portion of the cavity 120 and may be attached to the substrate using any suitable method (e.g., welding, bonding, adhesives, stitching, etc.). However, in yet other embodiments, the upper sheet 124 may be formed integrally with the substrate or portions thereof. A filler 115 may be located within the cavity 120 and, for the sake of clarity is assumed to include one or more seeds and/or a seed starter mix (soil). However, in yet other embodiments the filler may include a plant. Either or both of the upper sheet 124 and the substrate 102 may include one or more weakened areas 126 which may separate and provide passage of portions of a plant such as stems, roots, leaves, etc., to an opposite side of the weakened area 126. In some embodiments, the weakened area may include a score, a perforated area (e.g., a perforated line, shape, etc.), a die or kiss cut area, a reduced integrity area (as compared with other portions of the substrate 102), fabric (e.g., a knitted portion, etc.), an acid—or solvent—etch areas, etc. The weakened areas 126 may weaken and provide an opening when subject to a force (e.g., provided by a plant in the cavity 120 or provided by the system (e.g., when planting, a user, etc.)), exposed to light (e.g., sunlight, UV), moisture, chemicals (e.g., certain additives such as a solvent, etc.), etc., if desired. However, in yet other embodiments, the weakened areas 126 may include an opening having a desired shape and/or size. In yet further embodiments, the weakened areas 126 may include one or more materials (such as a knitted material (e.g., a stocking-type material, etc.)) which may provide passage of portions of a corresponding plant. The weakened areas 126 may be continuous or discontinuous and may have a desired shape and/or size. For example, in some embodiments, the weakened areas 126 may include a plurality of openings in the substrate 102 and/or the upper sheet 124 sufficient to provide passage of a plant or plants within the cavity 120. The weakened areas 126 may extend substantially across the substrate 102 if desired. However, in yet other embodiments, the weakened areas may have other shapes, sizes, orientations, etc.

One or more of the flow manifold 106, the runners 108, and/or the flow valves 110 may be located adjacent to, over, upon, etc., and/or attached to the substrate 102. The flow valves 110 (or orifices) may be located in proximity to the cavity 120 and/or filler 115 and may be located outside of the cavity 120. Accordingly, fluid which passes exits from the flow valves 110 may be absorbed by the filler 115. Further, when placing the flow valves 110 outside of the cavity 120, the flow valves 110 should be located above the filler 115 so that fluid which exits the low valves 110 is deposited upon, or absorbed by, the filler 115. However, in yet other embodiments, it is envisioned that the flow valves 110 may be located on an opposite major side of the substrate 102. In yet other embodiments, it is envisioned that one or more of the flow manifold 106, the runners 108, and/or the flow valves 110 may be attached to, or located on, opposite major sides of the substrate 102.

Figure 2B:
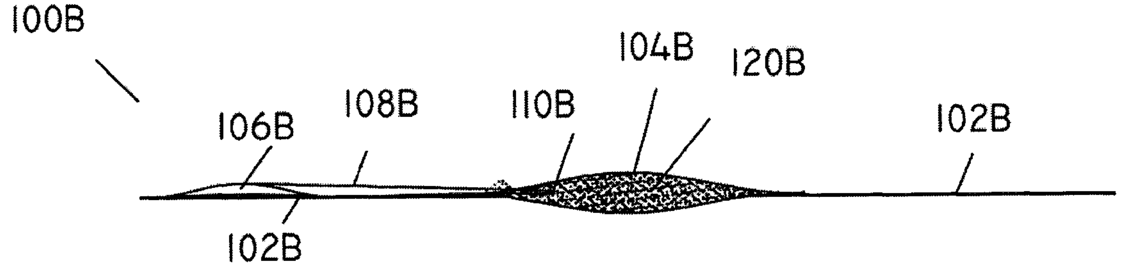
FIG. 2B is a cross-sectional view illustration of a portion of a system in accordance with embodiments of the present system.

FIG. 2B is a cross-sectional view illustration of a portion of a system 100B in accordance with embodiments of the present system. The system 100B is similar the system 100 shown in FIG. 2A and includes a substrate 102B and a grow portion 104B which are similar to the substrate 102 and grow portion 104, respectively, of FIG. 1. However, the system 100B includes runners 108B (similar to runners 108) which are configured such that the terminating portion (including the exit orifice) of the flow valve 110B is situated within the cavity 120B so that fluid(s) exit the flow valve 110B directly into a cavity 120B. This can reduce or prevent undesirable evaporation of water provided to water the seed(s) or plant(s) within corresponding cavities 115B. In yet other embodiments, at least a terminating portion of the flow valve is situated partially or substantially within the cavity so that fluid(s) exit the flow valve into the cavity. Further, the runners may be situated within a cavity of a grow portion. The grow portion may be formed integrally with, or separately from, the substrate.

Figure 2C:
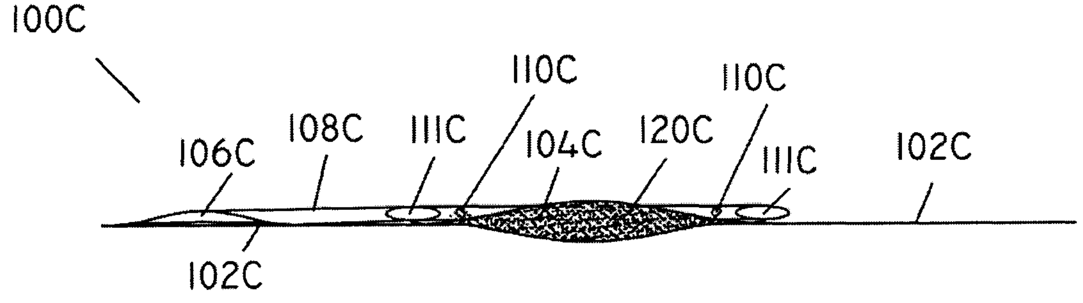
FIG. 2C is a cross-sectional view illustration of a portion of a system in accordance with embodiments of the present system.

FIG. 2C is a cross-sectional view illustration of a portion of a system 100C in accordance with embodiments of the present system. The system 100C is similar the system 100 shown in FIG. 2A. However, the system 100C includes one or more runners 108C having a distribution manifold 111C which includes multiple flow valves 110C. The multiple flow valves 110C may be situated adjacent to (e.g., above) or within a cavity 120C. For example, assuming the cavity 120C has a round shape, the multiple flow valves 110C may be located in a circular, (annular) or semicircular (semi-annular) pattern such that the multiple flow valves 110C may be located adjacent to, or within the cavity 120C of a corresponding grow portion 104C. In yet other embodiments, the flow valves may be located inside of, or outside of, a corresponding cavity. The multiple flow valves 110C may include openings situated in a wall of the distribution runner 111C. Further, the distribution runner 111C may include a circular or semicircular shape and may be sized such that it may be situated atop or around a corresponding grow portion 104C.

Figure 2E:
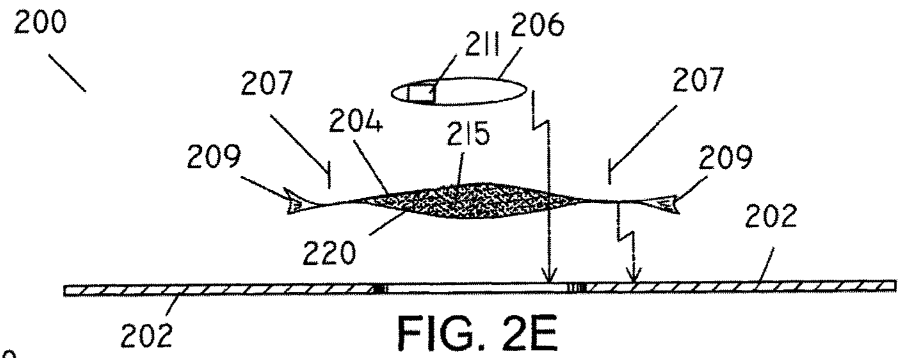
FIG. 2E is an exploded cross-sectional view illustration of a portion of a system taken along lines 2E-2E of FIG. 2D in accordance with embodiments of the present system.
Figure 2F:
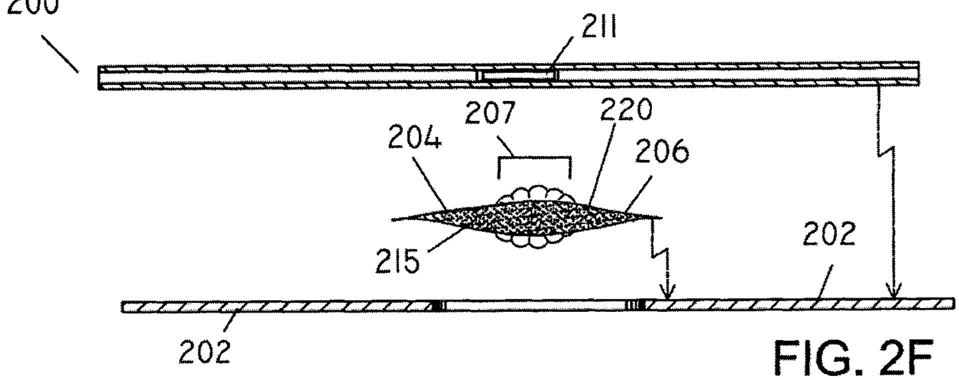
FIG. 2F is an exploded cross-sectional view illustration of a portion of a system taken along lines 2F-2F of FIG. 2D in accordance with embodiments of the present system.
Figure 2D:
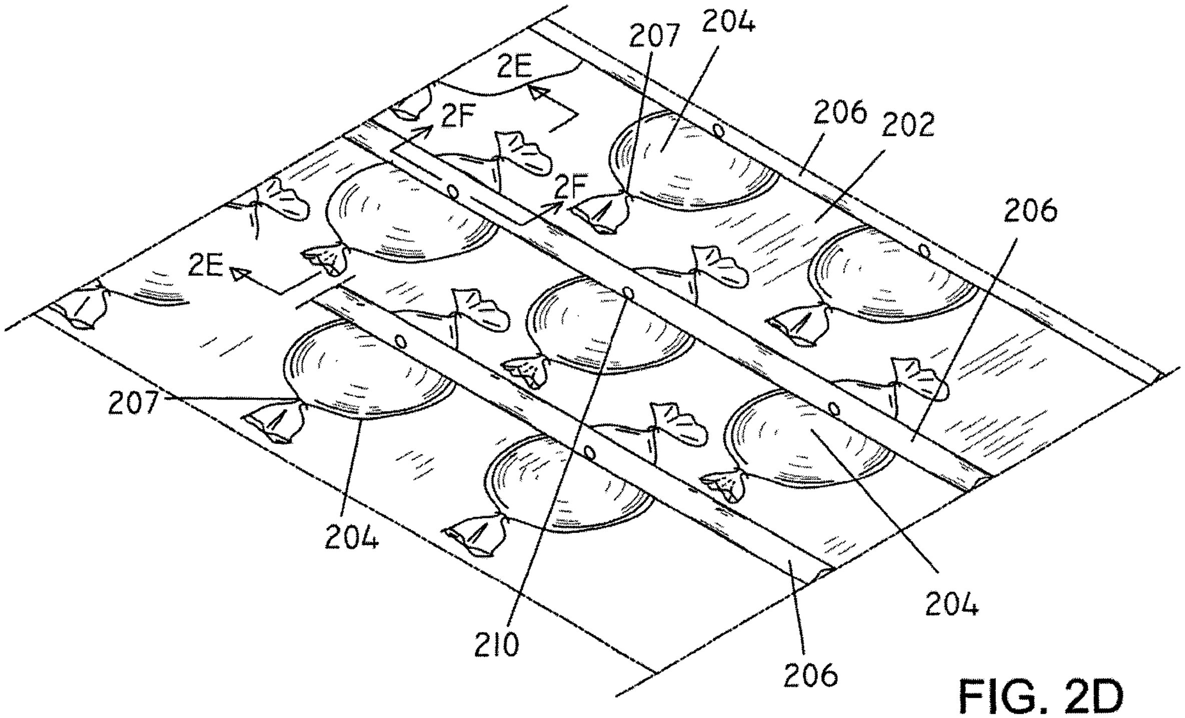
FIG. 2D is a partially cutaway perspective view illustration of a portion of a system in accordance with embodiments of the present system.

FIG. 2D is a partially cutaway perspective view illustration of a portion of a system 200 in accordance with embodiments of the present system. FIG. 2E is an exploded cross-sectional view illustration of a portion of a system 200 taken along lines 2E-2E of FIG. 2D in accordance with embodiments of the present system. FIG. 2F is an exploded cross-sectional view illustration of a portion of a system 200 taken along lines 2F-2F of FIG. 2D in accordance with embodiments of the present system. With reference to FIGS. 2D through 2F, the system 200 may be similar to the system 100 and may include one or more of a substrate 202, flow manifolds 206, and one or more grow portions 204. However, several rows (and/or columns) of flow manifolds 206 each providing liquid to corresponding grow portions 204. Further, the flow manifold 206 may include a dripper line such as a Netafim™ with an internal dripper/emitter 211 combination. In some embodiments, the flow manifold 206 may be foldable and/or collapsible, if desired. Openings 210 of the flow manifold 206 may be situated such that they may feed a corresponding grow portion 204. Moreover, one or more of the grow portions 204 may be formed using tubular type knitted material (e.g., similar to a material use for hosiery) through which portions of plants such as stems, roots, leaves, etc., may pass during growth. The grow portions 204 may include a cavity 220 including a filler 215. Ends of the cavity 220 may be sealed using any suitable method such as gluing, bonding (e.g., heat bonding, etc.), staples 207, nylon tie-wraps, stitching, etc. The grow portions 204 may be attached to the substrate 202 using any suitable method. For example, the stapes 207 may further be configured to attach the grow portions 204 to the substrate 202. The flow manifold 206 may be attached to the substrate 202 and/or the grow portions 204 using any suitable method such as bonding, adhesives, staples, straps, loops, hook-and-loop fasteners, friction fits, threaded fasteners, etc. One or more of the flow manifolds 204 may be fluidly coupled to each other and/or may be independent of each other and, in some embodiments, may receive fluid such as water and/or additives under the control of a controller of the system.

Figure 3:
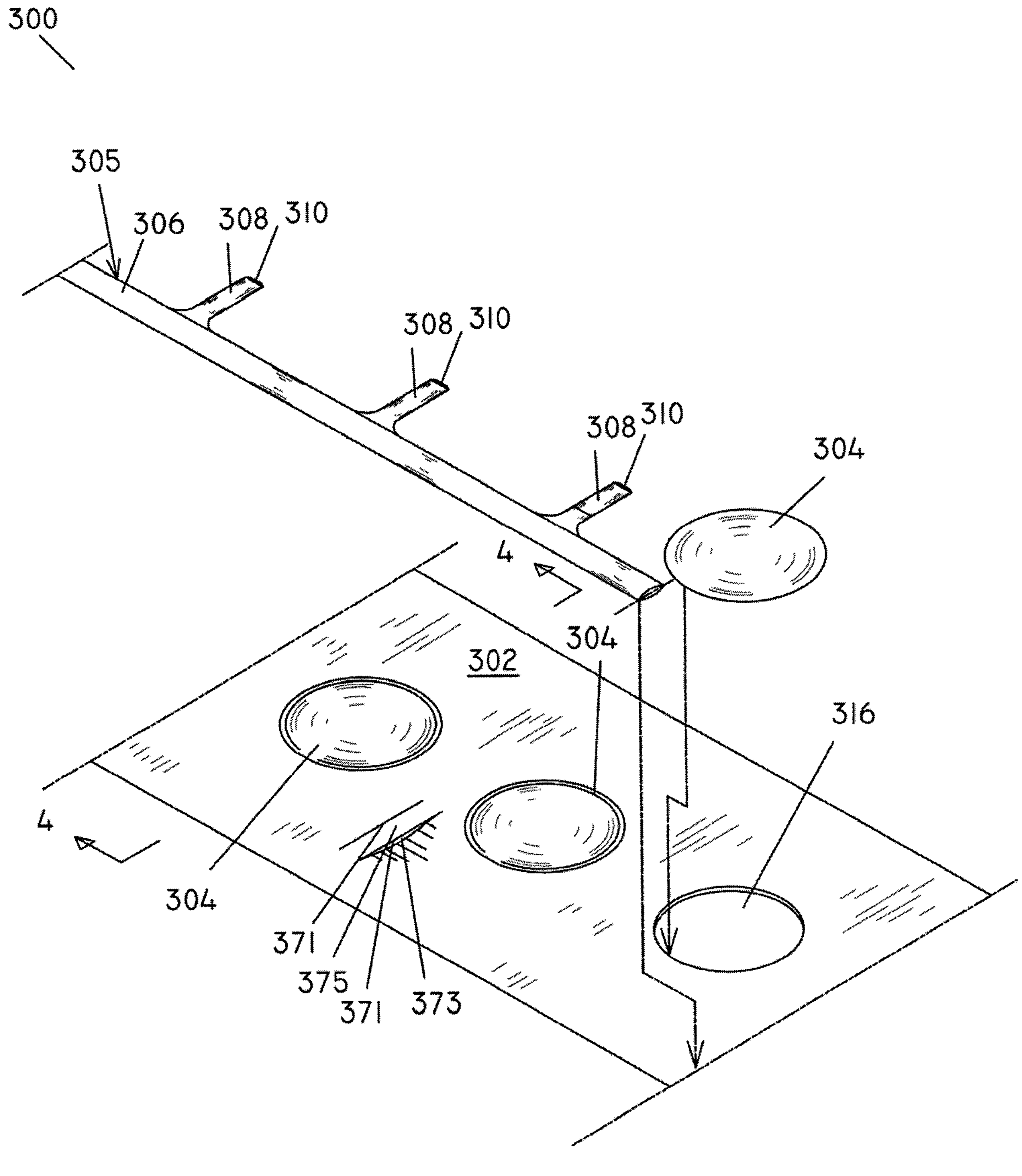
FIG. 3 is a perspective exploded view illustration of a portion of a system in accordance with embodiments of the present system.

FIG. 3 is a perspective exploded view illustration of a portion of a system 300 in accordance with embodiments of the present system. The system 300 is similar to the system 100 of FIG. 1 and includes a substrate 302, grow portions 304, and a fluid distribution system 305. However, the grow portions 304 are discrete grow portions may be attached to the substrate 302. Further, the substrate 302 may include one or more openings 316. Each opening 316 may be shaped and/or sized so as to be suitable for providing passage of portions of plants such as stems, leaves, roots, etc., as may be desired. The fluid distribution system 305 may distribute water to one or more of the grow portions 304 and may include one or more of a flow manifold 306, one or more runners 308, and flow valves 310. The fluid distribution system 305 may be coupled to the substrate 302 using any suitable method. The flow valves 310 may be fluidly coupled to the flow manifold 306 and may distribute fluid (e.g., from the flow manifold 306) to corresponding grow portions 304. The flow valves 310 may include, for example, a suitable opening(s), orifice(s), valves, etc., as may be desired. The grow portions 304 may be are discrete from, and attached to, a substrate 302. Further, the substrate 302 may include openings 312 at which corresponding grow portions 304 are attached. The openings 312 should be shaped and sized to allow passage of portions (e.g., roots, stems, etc.) of plants situated in a corresponding grow portion of the grow portions 304. A one or more runners 306 are in fluid communication with the flow manifold 306 and may provide fluid to flow valves 310. The flow valves 310 may provide the fluid to corresponding grow portions 304. In yet other embodiments, one or more of the flow manifold 306, the one or more runners 306, and the flow valves 310 are located on opposite major surfaces of the substrate 302. Accordingly, vias may be provided to provide for fluid communication between the flow manifold 306, the one or more runners 306, and the flow valves 310 which are located on opposite major surfaces of the substrate 302. In yet other embodiments, it is envisioned that one or more of the grow portions 304, the flow manifold 306, the one or more runners 306, and the flow valves 310 are located on opposite major surfaces of the substrate 302. For example, in some embodiments when in use growing plants the grow portions may be located underneath the substrate and the fluid distribution system or portions thereof may be located above the substrate or on the same side of the substrate. In yet other embodiments, it is envisioned that the grow portions and/or fluid distribution system may be located above the substrate during use when growing plants.

In some embodiments, the substrate 302 may include one or more cuts 371 which may define at least part of an opening 373 through which a portion of the flow manifold 306. The cuts 371 may define at least part of a loop 375 which may secure the flow manifold 306, if desired.

Further, in some embodiments, it is envisioned that the grow portions 304 may be secured to the substrate using flexible (e.g. accordion type), threaded and/or friction fit type couplers. It is further envisioned that in some embodiments, protective sphere (e.g., a transparent or substantially transparent) or portions thereof may extend over a corresponding grow portion to provide protection such as impact, weather, and/or thermal protection to the corresponding grow portion 304.

Figure 4:
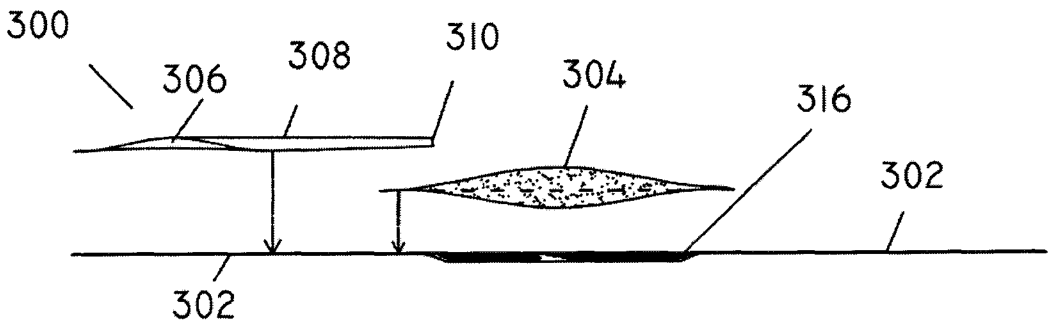
FIG. 4 is cutaway exploded side view illustration of a portion of the system taken along lines 4-4 of FIG. 3 in accordance with embodiments of the present system.

FIG. 4 is cutaway exploded side view illustration of a portion of the system 300 taken along lines 4-4 of FIG. 3 in accordance with embodiments of the present system. The grow portion 304 may be attached to the substrate 304 using any suitable method (e.g., sewing, welding, adhesives, friction fitting, pins, rivets, etc.). For example, in some embodiments, the grow portion 304 may be formed from a knitted material (e.g., a stocking or hosing type fabric, etc.) and may be bonded, welded and/or sewn to the substrate 304. However, in yet other embodiments, the substrate may include reinforced area such as an annular reinforcement area (e.g., a ring) situated around an inner periphery of the opening and which may be configured to hold the grow portion in place relative to the opening using any suitable method such as a friction fit, a screw mount, a bayonet-type mount, adhesives, etc. Further, it is envisioned that one or more of the grow portions may be inserted and/or removed by a user.

It is further envisioned that one or more the portions of the system (e.g., 100, 300, etc.) may be labeled. This may aid in a process of matching and/or tracking grow portions and/or plants. The labels may include an identification such as a grow portion identifier (GPID) which may identify a grow portion and an opening ID (OID). The GPID may be represented as text, graphics (e.g., an SKU), and/or in electronic form (e.g., as a radio-frequency identification (RFID)) signal generated by an RFID tag associated with the corresponding grow portion. The GPID may include information such as plant type or other information which may identify the plant such as name, (e.g., Purple Cherokee Tomato, classification (e.g. species, genus, family, etc.) etc.), color, identification (e.g., experimental crop no. x1234, etc.), date information (date information (e.g., packing date, use by date, expiration date, best by date, growing date, etc.)), brand (e.g., Burpee™, etc.), filler information (filler mix identification (10.0 oz., Scotts™, etc.), mix percentage, etc.), desired location information (e.g., plant at row 5 of substrate), preparation information (e.g., pelletized, primed, etc.), and/or other information such as information which may be desirable for commercial sale, distribution, research, development (e.g., experimental crop development information), etc. With regard to the substrate, the substrate and/or areas of the substrate (e.g., rows, columns, openings, etc.) may be identified using a substrate ID (SID). The SID may include an identifier which may identify the substrate (e.g., substrate no. 5, Scotts, Experimental. January 2015, 10 oz, soil, 10 seeds (each of XY species), etc.) and/or may identify portions thereof. For example, each opening associated with a grow portion may be identified (e.g., by number, row/column, size, geophysical location, 10.0 oz./hr, fluid flow head (e.g., associated fluid flow rate from fluid distribution system), etc.) using, for example, an RFID tag. Thus, each substrate may include one or more RFID transmitter/receiver (Tx/Rx) which may identify the substrate and/or portions thereof.

The identification of the substrate and/or grow portions may enable the system to generate and/or provide the system and/or a user (e.g. by rendering the information on a display of the system, etc.) with information which matches grow portions to openings and/or location relative to a substrate and/or a geophysical location. For example, the system may include an application which may render (e.g., on a display of the system, etc.) information indicative of SIDs (1, 2, 3, 4, . . . , and corresponding GPIDs, type-3, type-4, type-4, . . . , respectively). Thus, for example, a user may select a gardening style (e.g., Holland Tulip early spring mix, alternating colors, single row, GPID 4 and GPID 5), and the application may determine SID and matching GPIDs and thereafter render information related to the determination (e.g., on a display of the system, etc.) for the convenience of a user. For example, assuming that there are nine openings 1 through 9 arranged in a single row in a substrate, the system may determine that openings numbers 1, 3, 5, 7, and 9 may be assigned GPID 4 (e.g., red tulips) and openings numbers 2, 4, 6, and 8, receive GPID 5 (e.g., blue tulips). The system may then form a desired substrate and attach corresponding grow portions to the substrate at the determined positions (e.g., corresponding to the above-described openings). The system may further shape and/or form substrates in accordance with topography of a desired area which may be obtained from a database of the system and/or from a third party application (e.g., Google™ Maps, etc.).

Further, the determined SIDs and GPID information may be rendered in electronic form for assembly operations at a remote location. Further, one or more grow portions may include a radio-frequency identification (RFID) transmitter/receiver (Tx/Rx) which may transmit and/or receive information about a corresponding plant. This information may be used to program a fluid supply system, inform a user of a corresponding plant's ID information (e.g., which may be useful in a Botanical garden, etc. (e.g., type: Brooklyn Rose, year planted: 1984, place: New York Botanical Garden™)), and/or provide plant identification information (e.g., plant no 123456-com, which may be useful for growing and tracking experimental crops).

In yet other embodiments, the grow portions may include a cup-like member such as a flower pot, a cylinder. In some embodiments, it is envisioned that the grow portions may include a screw drill portion which may be rotated (e.g., by a user or by the system when planting) to dig the grow portion into the soil. Further, the grow portion may be attached to the corresponding opening using a slip-rig type arrangement.

Figure 5:
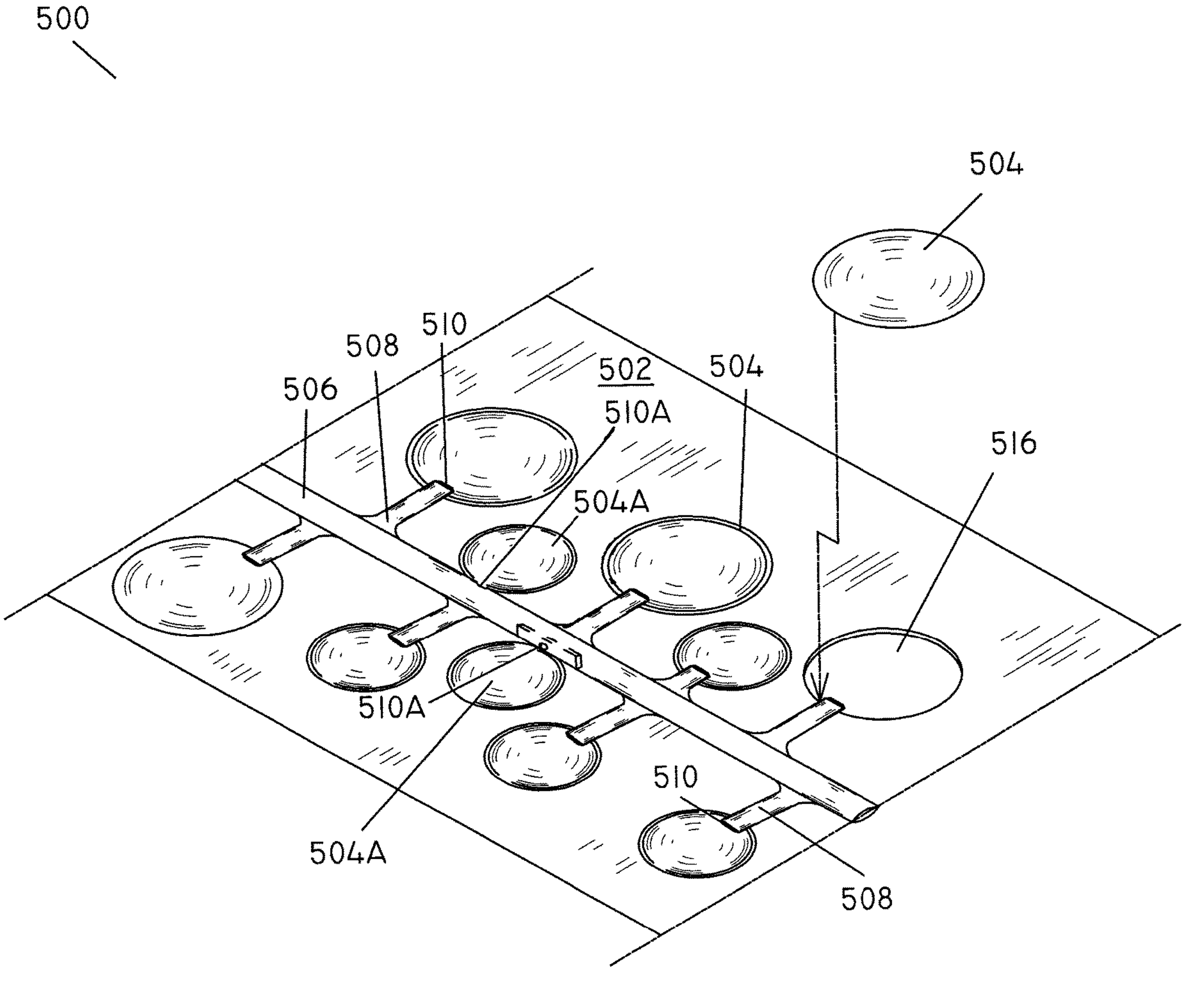
FIG. 5 is a perspective exploded view illustration of a portion of a system in accordance with embodiments of the present system.

FIG. 5 is a perspective exploded view illustration of a portion of a system 500 in accordance with embodiments of the present system. The system 500 is similar to the system 300 of FIG. 3 and includes one or more of a substrate 502, grow portions 504, and a fluid distribution system 505. However, the grow portions 504 are arranged on in a pattern arranged so that grow portions 504 are on either side of the fluid distribution system 505. The fluid distribution system 505 may include one or more of a flow manifold 505, runners 508 and flow valves 510 in fluid communication with each other. However, the flow valves 510 may a flow valve such as flow valve 505 which comprises an opening 510A in the flow manifold 505 and may provide fluid to grow portion 504A. The pattern formed by placement of the grow portions 504 may be determined and/or formed by the system.

Figure 6:
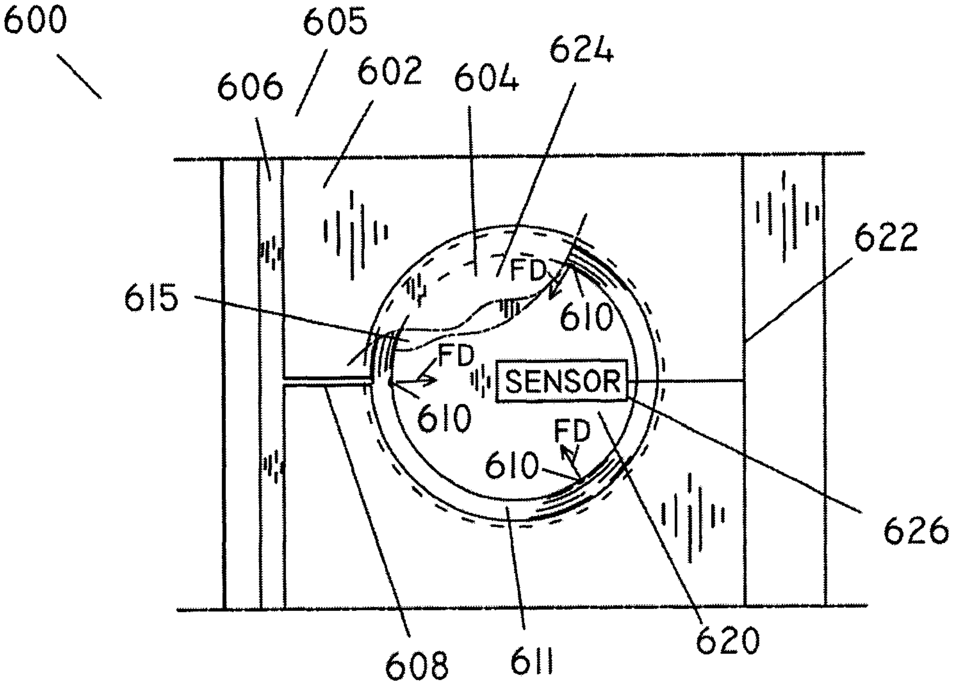
FIG. 6 is a partial cutaway top view illustration of a portion of a system in accordance with embodiments of the present system.

FIG. 6 is a partial cutaway top view illustration of a portion of a system 600 in accordance with embodiments of the present system. The system 600 is similar to the system 100 shown in FIG. 1 and includes a substrate 602 grow portions 604, and a fluid distribution system 605. For the sake of clarity, only a single grow portion 604 and corresponding portion of the fluid distribution system 605 may be shown and described. The grow portion 604 may include upper sheet 624 which may define a portion of a cavity 620 configured to receive a filler 615. The grow portion 604 may further include integrated and/or discrete grow portions (e.g., see, FIG. 3 for discrete grow portions). The filler 615 which may be situated within the cavity 620 and may include one or more seeds or plant. The upper sheet 624 has been partially cutaway to reveal the cavity 620 and filler 615 (which has also been partially cutaway) optionally contained therein.

One or more sensors such as a sensor 626 may sense environmental conditions at or in cavity 620, the filler 615 and/or areas adjacent to the filler 615 and/or cavity 620. For example, the sensor 626 may detect moisture, temperature, acidity, etc., and may form corresponding sensor information. The sensor 626 (as well as other sensors of other grow portions) may be coupled to a controller via any suitable method such as bus 622. Accordingly, the sensor 626 may form sensor information and transmit the sensor information to the controller. In a similar manner the controller may transmit information such as command and/or control information to the sensor 626 to, for example, acquire a reading etc. The bus 622 may include any suitable bus and may be wired and/or wireless or combinations thereof. Further, the bus 626 may include a proprietary bus, an analog bus, a digital bus, a network bus (e.g., a local area network (LAN), a wide area network (WAN), the Internet, a controller area network (CAN)-type bus, etc. For example, when using a wireless bus, one or more sensor 626 may include a radio-frequency identification (RFID) transmitter which may transit information (e.g., in response to a query) to an RFID interrogator (e.g., mounted upon a mobile station, etc.). However, it is also envisioned that one or more sensors 626 may include a wired and/or wireless transmitter(s) which may operate using other standards, protocols, methods, etc. For example, with regard to wireless transmitters, one or more of the sensors 626 may include other types of wireless transmitters such as Bluetooth™, Wi-Fi™ GSM™, CDMA™, etc., -type transmitters. Further, the system may include repeaters which may relay information between the controller and the sensors 626. For example, the repeaters may transmit/receive information to/from one or more of the sensors 626 using a low power link (e.g., RFID, Bluetooth™, etc.) and may transmit/receive information (e.g., information to be relayed) to the controller using a higher-power link (e.g., GSM). Thus, the system may include one or more repeaters each of which may serve a plurality of sensors 626. Moreover, each sensor 626 may include identification information in the sensor information. The identification information may identify a sensor, its corresponding grow area, row, column, geophysical coordinates (location), etc. This information may be used by the controller to track crop growth and/or to determine desired actions such as apply additives (e.g., fertilizer, etc.), apply water, heat, etc.

The fluid distribution system 605 may include one or more of a flow manifold 605, one or more runners 608, a distribution manifold 611, and flow valves 610 in fluid communication with each other. The grow portion 604 may include a cavity 620 and/or a filler 615. The distribution manifold 611 may have a shape which may correspond with a shape of the grow portion 604. For example, if the grow portion is square, the distribution manifold may be square, etc. However, in yet other embodiments, the distribution manifold 611 may have a shape and/or size which corresponds with a desired shape and/or size and/or a desired fluid distribution pattern. For example, assuming the grow portion 604 of the present example is substantially round and an even fluid distribution pattern is desired, the distribution manifold 611 may have an annular, circular, semicircular, and/or crescent shape which may be located at an outer periphery of a corresponding grow portion 604. The distribution manifold 611 may include a plurality of flow valves 610 separated from each other and which may distribute fluid from the fluid distribution system 605 to multiple locations of the grow portion 604 such as to the cavity 620 and/or filler 615 of the grow portion 604. For example, the flow valves 610 may distribute fluid in various directions some of which are illustrated by arrows FD.

In some embodiments, the distribution manifold may be located at or adjacent to an outer periphery of a grow portion. However, in yet other embodiments, the distribution manifold may superpose (e.g., superimpose, extend over, or overlap) at least part of a corresponding grow portion. For example, in some embodiments, the distribution manifold may have a desired shape and/or may correspond with a shape of a corresponding grow portion such as a zigzag or "S" shape.

Figure 7:
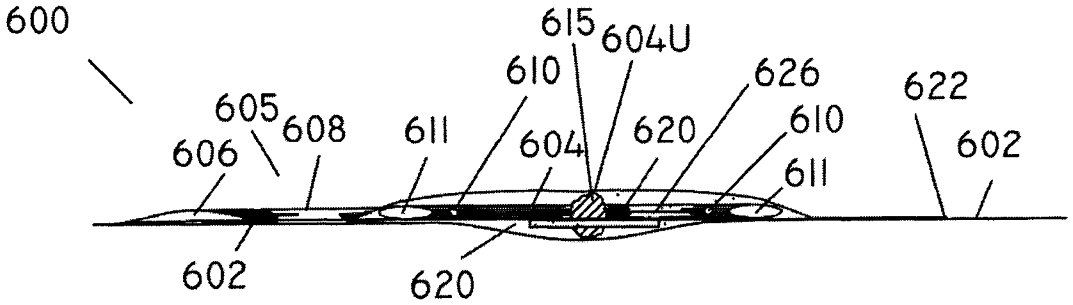
FIG. 7 is a cross-sectional view illustration of a portion of the system taken along lines 7-7 of FIG. 6 in accordance with embodiments of the present system.

FIG. 7 is a cross-sectional view illustration of a portion of the system 600 taken along lines 7-7 of FIG. 6 in accordance with embodiments of the present system. The system 600 is similar to system 100C shown in FIG. 2C. However, the distribution manifold 611 and multiple flow valves 610 may be situated within the cavity 620. However, in yet other embodiments, the distribution manifold 611 and/or the multiple flow valves 610 may be situated adjacent to (e.g., above (e.g., see, FIG. 2C), below, to the side of etc.) a corresponding cavity 620. Only a portion of the filler 615 is shown for clarity.

Figure 8:
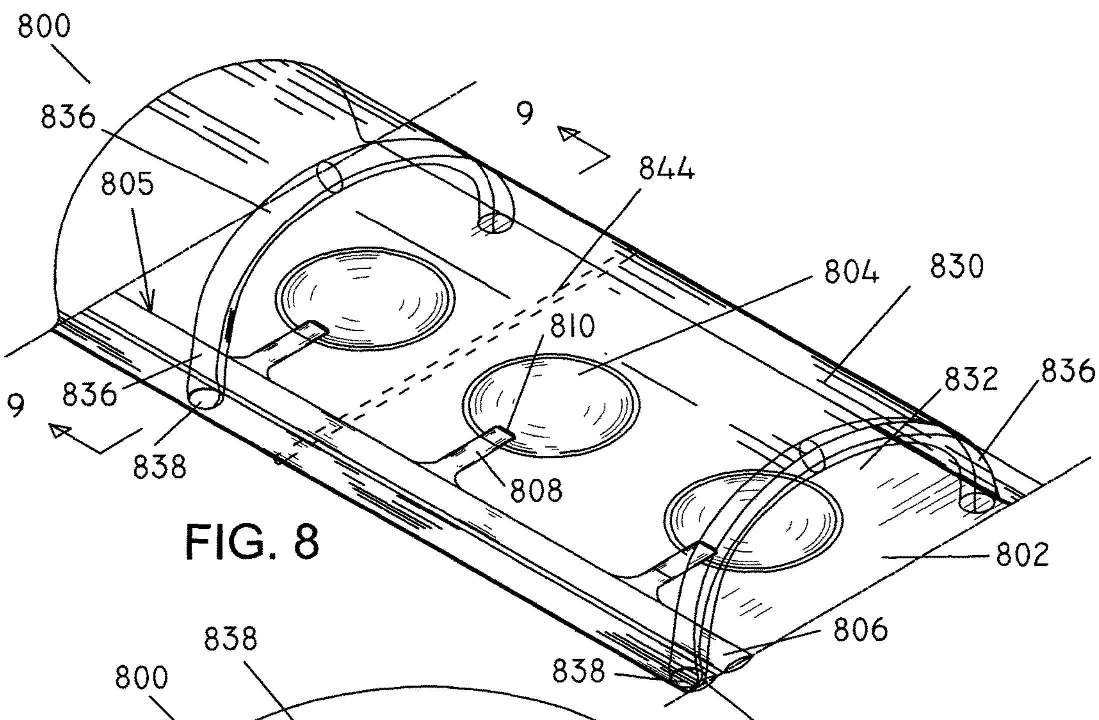
FIG. 8 is a perspective view illustration of a portion of a system in accordance with embodiments of the present system.

FIG. 8 is a perspective view illustration of a portion of a system 800 in accordance with embodiments of the present system. The system 800 is similar to the system 100 of FIG. 1 and includes one or more of a substrate 802, one or more grow portions 804, and a fluid distribution system 805. However, the system 800 includes a barrier 830 (shown in the open position) which may form at least a portion of a barrier cavity 832. The substrate 802 may form at least another portion of the cavity 832. The barrier cavity 832 may provide an environment suitable for growth of plants. This environment may insulate the plants from ambient conditions (e.g., cold/hot temperatures, rain, hail, snow, frost, etc.), contamination (e.g., acid rain, pollution, etc.), and invasive species, and may be controlled (e.g., by a controller of the system) to provide desired environmental conditions such as temperature, humidity, and/or gas/mixture ratio or ranges. The barrier 830 may be formed from any suitable material or materials and may include a single or multiple layers which may be laminated and/or otherwise coupled to each other. Further, the barrier 830 may include one or more layers which may which have different characteristics. For example, in some embodiments, the barrier 830 may include a clear or translucent material (e.g., layer) which may provide for passage of natural (e.g., sunlight) or artificial light rays or certain frequencies thereof. Further, the barrier 830 may include one or more insulating layers which may insulate the secondary cavity. For example, the one or more insulating layers may include a thermal insulation layer, a reflective layer, etc. Moreover, the barrier 830 may include one or more layers such as filtering layers which may filter certain frequencies of rays such as ultra violet (UV) rays, etc. such that they are fully or partially filtered (attenuated) by the layer. The barrier 830 may be coupled to the substrate 802 using any suitable method (e.g., bonding, welding, etc.) and may include one or more weakened area (e.g., scores, etc.) the barrier 830 (in whole or part) may be separated from the substrate 802 and/or other portions of the barrier 830 so that the barrier cavity 832 may be opened to the environment. However, in yet other embodiments, it is envisioned that the system may include a cutting mechanism to separate at least a portion of the barrier from the substrate.

The fluid distribution system 805 may distribute water to one or more of the grow portions 804 and may include one or more of a flow manifold 806, one or more runners 808, and flow valves 810 through which fluids may exit therefrom. The grow portions may include a wicking material to absorb fluids from the fluid distribution system.

The grow portions 804 may include a cavity 820 in which a filler 815 may be located. An outer periphery of the grow portion 804 may include one or more openings and/or weakened areas such as weakened area 826 through which portions of a plant situated within the grow portion 804 may extend.

The barrier 830 may include one or more positions such as a closed (e.g., folded) position (e.g., during transport, storage, placement, etc.) and/or the opened position (e.g., during plant growth periods). In the closed position, the barrier 830 may be folded flat over the substrate 802 so as to collapse the barrier cavity 832. Accordingly, the combination of the substrate 802, the grow portions 804, the fluid distribution system 805, and the barrier 830 may be folded and/or rolled to conserve space. The system may include a support mechanism to hold the barrier 830 in the open position. The support mechanism may include an inflatable support mechanism such as transverse chambers 836. However, in yet other embodiments, it is envisioned that the barrier cavity 832 may be pressurized to hold it fully or partially in an open position. Accordingly, the substrate 802 may be formed from a suitable material to fully or partially seal the barrier cavity 832. However, in yet other embodiments, it is envisioned that the support mechanism may include rigidity enhancing members such as tensioning mechanisms (e.g., support wires or cables) and/or rods (e.g., fiberglass rods) which may be coupled to the one or more portions of the barrier 830. Accordingly, the barrier 830 may include couplings (e.g., hooks, loops, straps, grommets, etc.) configured to couple (the barrier 830) to the tensioning mechanisms. Further, the barrier 830 may include one or more flaps including a sealing mechanism (e.g., a zipper, seal, etc.) which may be opened to access plants within the barrier cavity 832. Further, the barrier 830 may cover a one or more grow portions 804. The covered grow portions 804 include grow portions in the same row or column or in multiple rows and/or columns.

An inflation manifold 834 may be coupled to one or more of the chambers 836 via openings 838 and may provide pressurized gas or liquid to the chambers 836 to hold the barrier 830 in the open position. The chambers 836 may be positioned so as to properly support the barrier 830. For example, the chambers 836 may extend transversely across the barrier 830. However, it is also envisioned that the chambers 836 may extend in a longitudinal direction of the barrier 830. The chambers 836 may be pressurized by an inflation pump operative under the control of the controller and which may be coupled to the inflation manifold 834. Pressure release valves may be provided to release pressure and may passive (e.g., release pressure when it exceeds a threshold value) or may be active and controlled by the controller which may determine pressure in the inflation manifold 834 and control the pressure so that it is within a desired value or range. In yet other embodiments, the chambers may include substantially vertical chambers.

The substrate 802 may extend beyond an outer periphery of the barrier 830 and may include transverse rods 144 to provide tension the substrate 802, if desired. Further, the substrate 802 may include a barrier or seal to prevent or reduce a flow of gas from the barrier cavity 832, if desired. Moreover, the substrate 802 may include opening, notches, tabs, marking, etc., to aid in the handling and placement of the substrate 802 and/or the attachment of the substrate 802 to adjacent substrates 802.

Figure 9:
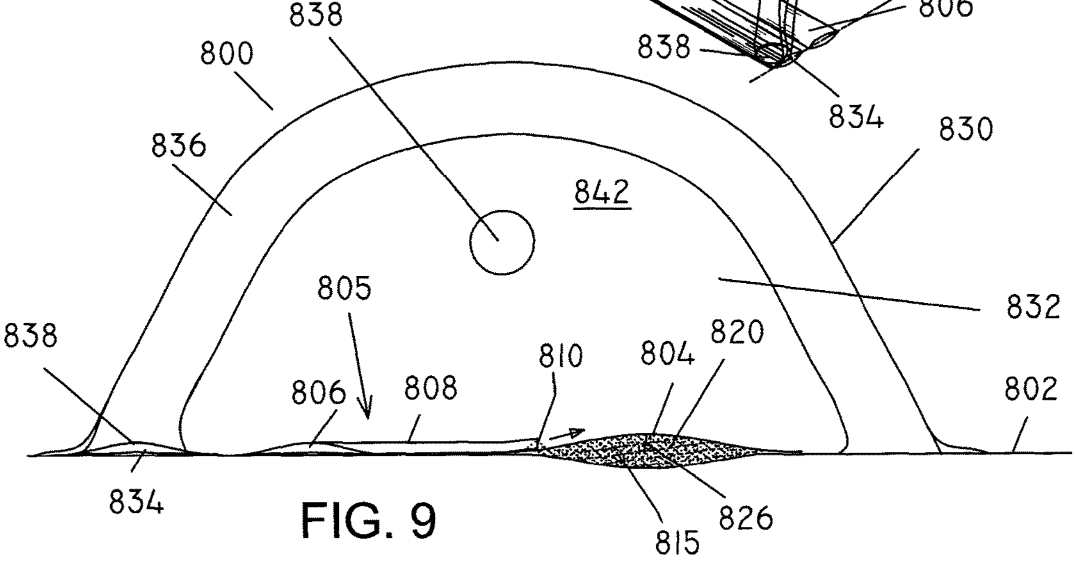
FIG. 9 is cross sectional view illustration of a portion of the system taken along lines 9-9 of FIG. 8 in accordance with embodiments of the present system.
Figure 10:
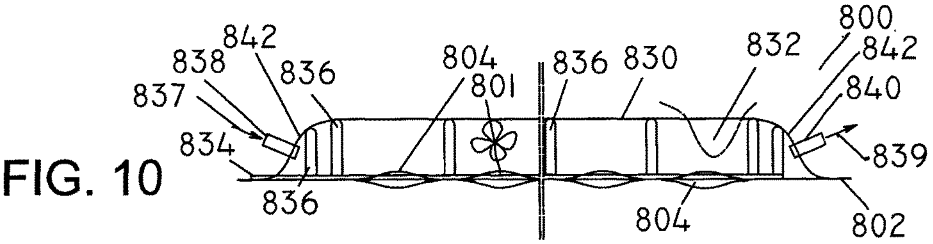
FIG. 10 is a side view illustration of a portion of the system in accordance with embodiments of the present system.

FIG. 9 is cross sectional view illustration of a portion of the system 800 taken along lines 9-9 of FIG. 8 in accordance with embodiments of the present system and FIG. 10 is a side view illustration of a portion of the system 800 in accordance with embodiments of the present system. The barrier 830 may include one or more end walls such as end walls 842 configured to seal (fully or partially) at least a portion of the barrier cavity 832 such as ends of the barrier cavity 832. However, in yet other embodiments, openings may be provided in other portions of the barrier 830. Further, the barrier may include other openings to provide airflow (e.g., in or out of the barrier cavity 832), if desired. Moreover, the barrier 830 may include one or more vents (e.g., vents 838 and 840 configured to receive and/or vent gas within the barrier cavity 832, respectively, is indicated by arrows 837 and 839 which illustrate inlet and outlet gas flows, respectively as shown in FIG. 10). However, it is envisioned that other gas flow directions through the vents 838 and 840 may be used. The vents 838, 840 may be placed anywhere in the barrier 830 such as in an end 842, etc.

The barrier cavity 832 may have a height which may provide for the growth of plants such as plant 801 within the cavity to a desired height.

Moreover, the system may include one or more pumps, fans, and/or valves which may operate under the control of the controller, and which may be configured to provide gas (e.g., air, oxygen, nitrogen, carbon dioxide, etc.) to the barrier cavity 832, pressurize the barrier cavity 832, and/or to vent gas from the barrier cavity 832. Accordingly, the one or more pumps, fans, and/or valves may be coupled to the barrier cavity 832 using any suitable method. The system may further be coupled to a source of gases such as one or more greenhouse gases (e.g., carbon dioxide, etc.) and may provide these gases to the barrier cavity 832 to aid in the growth of the plants of the system such as plants 801.

Accordingly, the plants may use the greenhouse gases such as carbon dioxide to conduct photosynthesis. Further, the controller may control the environment with in the barrier cavity 832 to control pests which may be in the barrier cavity 832 by, for example, introducing gases such as pesticides or gasses such as carbon dioxide (at increased levels).

The system 800 may further include one or more sensors within the barrier cavity 832 to sense environmental conditions with the barrier cavity 832 such as temperature, humidity, illumination, acidity, etc., and provide the corresponding sensor information to a controller of the system.

It is further envisioned that the substrate and/or the barrier may include an insulating material such as a bubble wrap or bubble pack type material. In some other embodiments, it is envisioned that inflated pillows may be inserted within and support the barrier cavity in the opened position and may be removed when the barrier is removed.

Figure 8B:
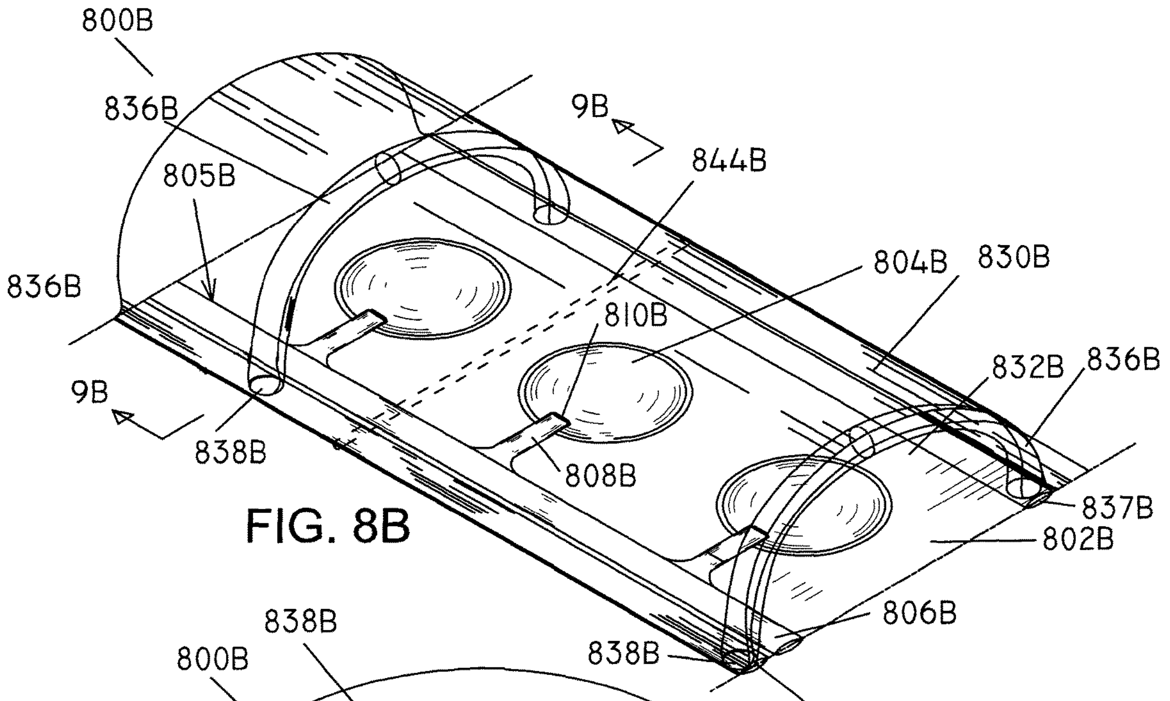
FIG. 8B is a perspective view illustration of a portion of a system in accordance with embodiments of the present system.
Figure 9B:
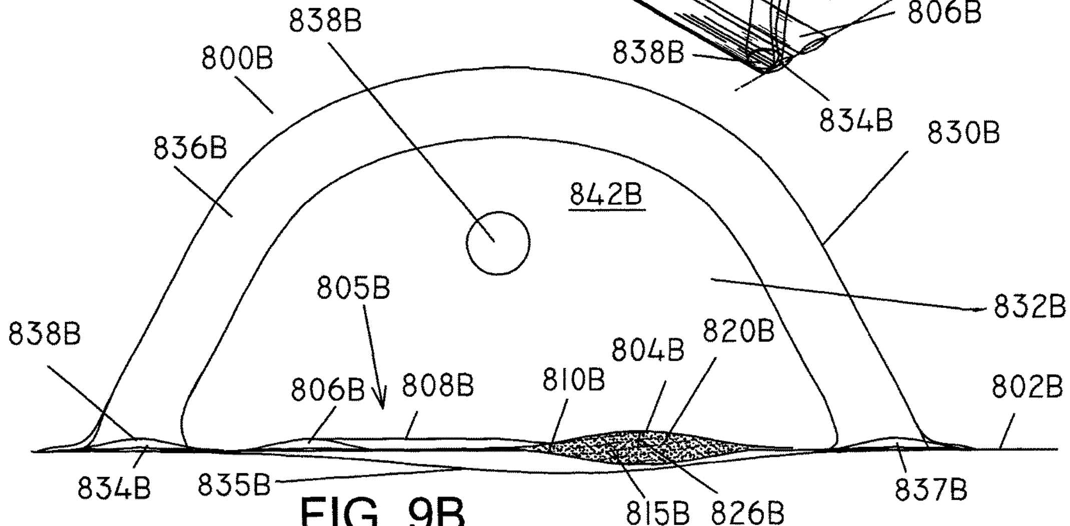
FIG. 9B is cross sectional view illustration of a portion of the system taken along lines 9B-9B of FIG. 8B in accordance with embodiments of the present system.
Figure 10B:
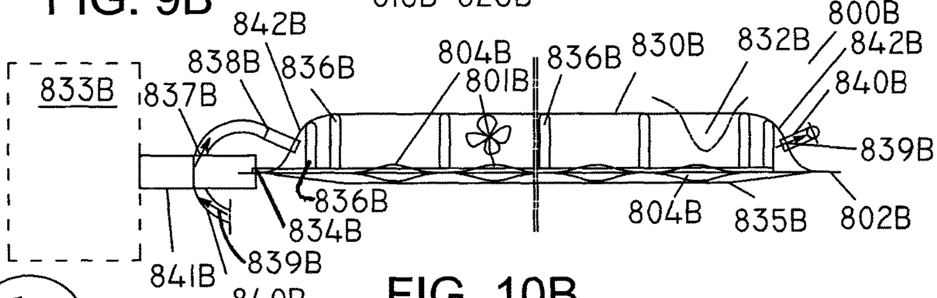
FIG. 10B is a side view illustration of a portion of the system in accordance with embodiments of the present system.

FIG. 8B is a perspective view illustration of a portion of a system 800B in accordance with embodiments of the present system. FIG. 9B is cross sectional view illustration of a portion of the system 800B taken along lines 9B-9B of FIG. 8B in accordance with embodiments of the present system. FIG. 10B is a side view illustration of a portion of the system 800B in accordance with embodiments of the present system.

Referring to FIGS. 8B, 9B, and 10B, the system 800B is similar to the system 800 of FIG. 8 and includes one or more of a substrate 802B, one or more grow portions 804B, and a fluid distribution system 805B and similar numerical designations are provided with a "B" postfix. Thus, the inflation manifold 834 of FIG. 8 may be illustrated as an inflation manifold 834B in FIG. 8B. However, the system 800B is suitable for low pressure and/or gravity environments such as a space environment and the barrier 830B fully or substantially about the substrate 802B so that the grow portions 804B are fully situated within the barrier cavity 832B which may be pressurized above an ambient atmosphere or pressure. Accordingly, the barrier 830B may include second portion 835B (e.g., see, FIG. 9B). One or more portions of the barrier 830B may be coated with an insulating material such as a vapor deposited aluminum, gold, a thermal insulator, etc., which may be suitable for a desired environment (e.g., space). The fluid distribution system 805B may distribute water to one or more of the grow portions 804B and may include one or more of a flow manifold 806B, one or more runners 808B, and flow valves 810B through which fluids may transferred a fluid wicking material of a corresponding grow portion 804B. A fluid transfer directly to a wicking material may be desirable in reduced gravity and/or zero-gravity environments.

Figure 10C:
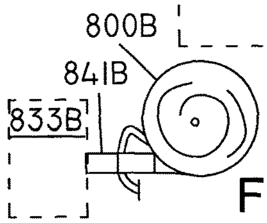
FIG. 10C illustrates the system with a barrier and substrate in a rolled configuration in accordance with embodiments of the present system.

An other inflation manifold 837B may be provided and may be similar to the inflation manifold 834B and may be pressurized from the same or similar pressure source. Thus, for example, inflation manifolds 834B and 837B may be coupled to each other. A coupler 841B may couple the system 800 in a desired location such as to a vessel 833B (e.g., a spacecraft, etc.) and may provide one or more degrees of freedom (e.g., 6 degrees, etc.) about one or more axes. The coupler 841B may further fluidly, electronically, and/or gaseously, couple the system to the vessel 833B, if desired. Moreover, the barrier 830B may include one or more vents (e.g., vents 838B and 840B configured to receive and/or vent gas within the barrier cavity 832B, respectively, is indicated by arrows 8378 and 839B which illustrate inlet and outlet gas flows, respectively as shown in FIG. 10B). The vent 840B may be coupled to the coupler 841B so that an outlet gas flow from the vent 840B may be returned to the coupler 841B. The vent 840B may include a cavity which may formed, at least in part, integrally with the barrier 830B and/or substrate 802B, if desired. One or more portions of the barrier 830B may be folded about and/or coupled to the substrate 802B. For example, FIG. 10C illustrates the system 800B with the barrier 830B and substrate 802B in a rolled configuration in accordance with embodiments of the present system. The system 800B may be unrolled by pressurizing one or more chambers of the substrate 800B and/or barrier 830B.

An atmosphere from the vessel 833B may be transferred to the barrier cavity 832B and may be processed (e.g., oxygenated and/or scrubbed of undesirable gasses and/or compounds such as carbon dioxide (CO.sub.2), etc.) by plants situated within the barrier cavity 832B and returned to the vessel 833B to enhance an atmosphere within the vessel 833B. FIG. 10C is a schematic view of the system 800 attached to the vessel 833B and in a rolled (e.g., see, FIG. 18B) configuration for storage and/or transportation in accordance with embodiments of the present system.

The coupler 841B may include a quick connect-type coupler and may include an airlock to close cavities within the coupler 841B such as fluid and/or gas cavities, if desired. The coupler 841B may further include one or more actuators controlled by the controller and which may rotate and/or otherwise move the substrate about the one or more axes. Accordingly, the coupler 841B may position one or more portions of the substrate system 800B in a desired orientation (e.g., such as an upper surface of the substrate 802B facing the sun, etc.) to enhance growth of plants contained within and/or provide proper insulation. Further, one or more portions of the barrier 830B may include a shielding portion such as a passive or active (e.g., controlled by the controller) filters which may passively or actively, respectively, shield radiation such as solar radiation. In some embodiments, the barrier 830B may form a cylindrical tube with closed ends defining a cavity such as the barrier cavity 832B in which the substrate 802B may be situated. Rigidity enhancing chambers such as inflation manifolds (e.g., see, 834B and 837B, etc.) may extend in one or more desired direction such as transversely, longitudinally, radially, axially, etc., if desired. Inlet and outlet passages may be coupled to the barrier 830B to provide a gas flow within the barrier cavity 832B.

One or more sealable openings may be provided to access the barrier cavity 832B (e.g., to access and/or remove plants or portions thereof such as vegetables, legumes, etc.). In some embodiments, tools such as cutters, etc., may be inserted through the coupler 841B (e.g., via a proprietary cavity and/or a cavity of one of the vents) and into the barrier cavity 832B so as to interact with plants within the barrier cavity 832B and/or remove portions thereof (e.g. fruits, vegetables, legumes, cuttings, seeds, cuttings, etc.). The tools may include controllable flexible body portions (e.g., similar to an endoscope, etc.) and may be controlled by a user. The tools may access the barrier cavity 832B without interrupting an atmosphere within the barrier cavity 832B, if desired. By providing optional rigidity enhancing chambers which are separate from the barrier cavity 832B, an atmosphere within the barrier cavity 832B may controlled independent of the rigidity enhancing chambers and vice versa. This may optimize control the rigidity of the system 800B.

Sensors may be provided to provide sensor information such as pressure, temperature, humidity, moisture, solar radiation, solar angle, etc., for further processing by a controller of the system 800B.

The control portion may be located internally and/or externally of the vessel and may control fluid delivery (water, nutrients, etc.) to the fluid distribution system 805B and/or gas delivery and/or exchange within the barrier cavity 832B.

Figure 8C:
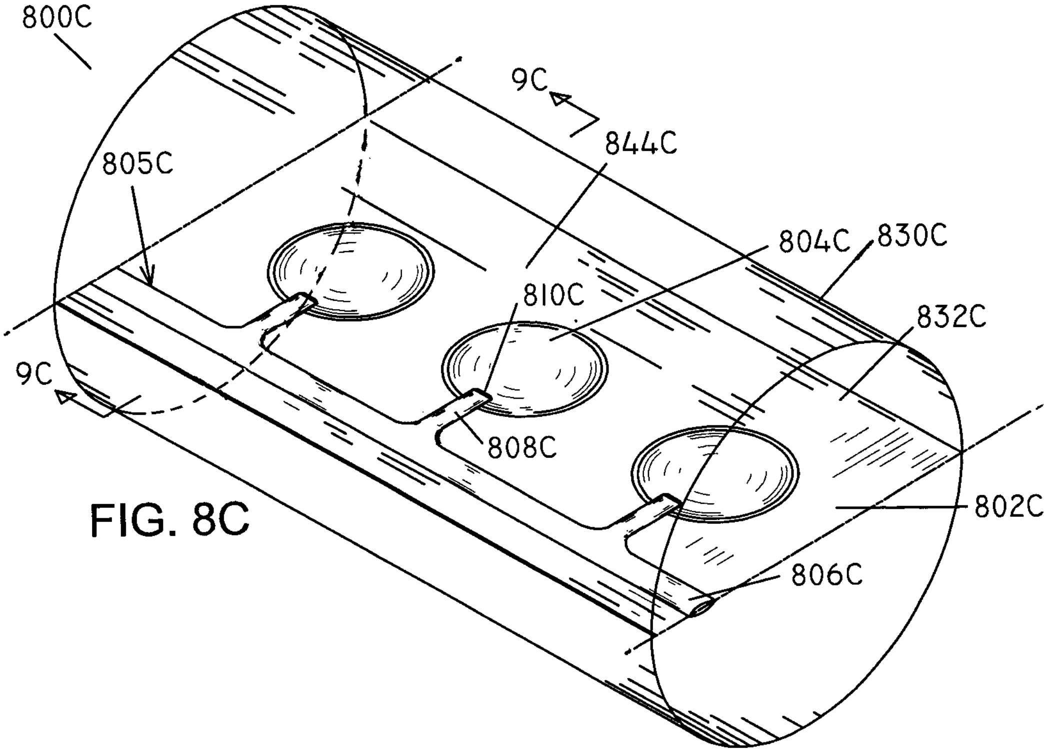
FIG. 8C is a perspective view illustration of a portion of a system in accordance with embodiments of the present system.
Figure 9C:
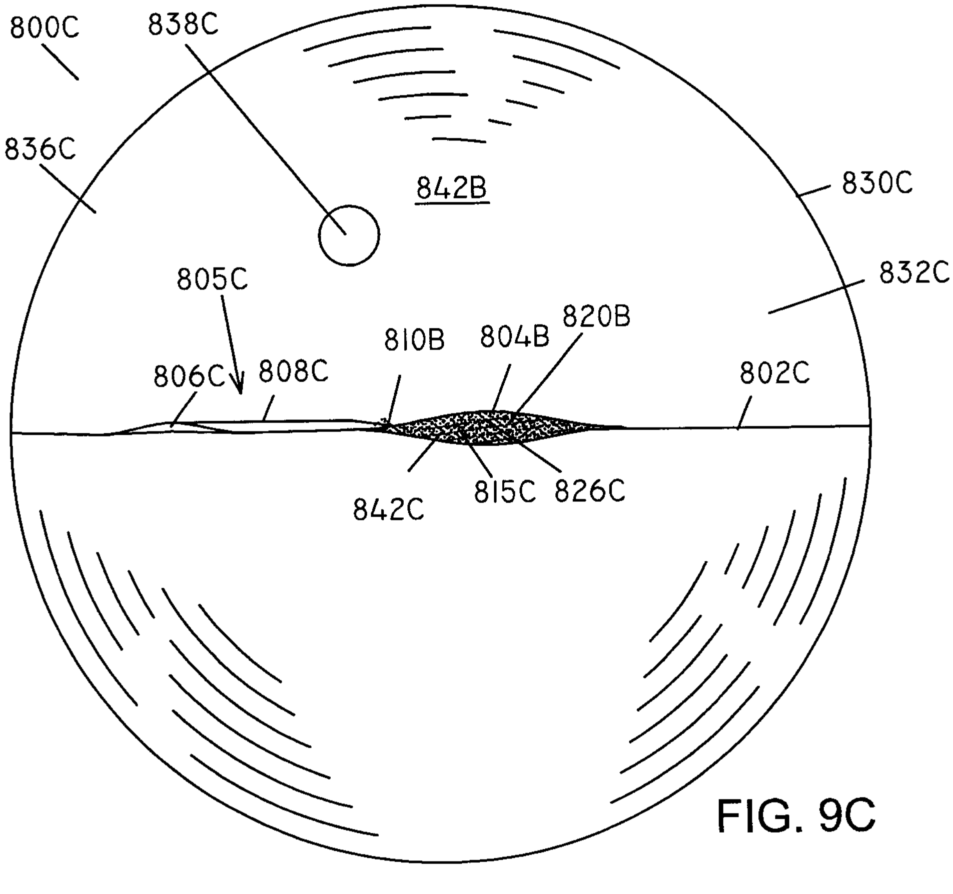
FIG. 9C is cross sectional view illustration of a portion of the system taken along lines 9C-9C of FIG. 8C in accordance with embodiments of the present system.

FIG. 8C is a perspective view illustration of a portion of a system 800C in accordance with embodiments of the present system. FIG. 9C is cross sectional view illustration of a portion of the system 800B taken along lines 9C-9C of FIG. 8C in accordance with embodiments of the present system. The system 800C is similar to the system 800 of FIGS. 8 and 800B of FIG. 8B and includes one or more of a substrate 802C, one or more grow portions 804C, and a fluid distribution system 805C and similar numerical designations are provided with a "C" postfix. The barrier 830C may include a tubular cylinder cylindrical and/or oval cross section defining a barrier cavity 832C in which the substrate 802C is located. The substrate 802C may be attached to the barrier 830C using any suitable method. One or more portions of plants of a grow portion may extend from the grow portions 804C from one or more sides, if desired. The substrate 802C may be centrally located relative to the barrier 830C. However, in yet other embodiments the substrate 802C may be located asymmetrically within the barrier 830C. Further, portions of the barrier cavity 832C to either major side of the substrate 802C may have atmospheres which may be the same as or vary from each other. For example, in some embodiments, the atmosphere on a first major side of the substrate 802C may have more moisture than on the other major side of the substrate 802C. Ends of the barrier 830C may be sealed similarly to ends of the barrier 830B. Vents may be provided to access, pressurize, and/or vent the barrier cavity 832C. The vents may be gaseously coupled to the controller. Further, the fluid distribution system 805C may be fluidly coupled to the controller which may control the overall operation of the system 800C.

Figure 11:
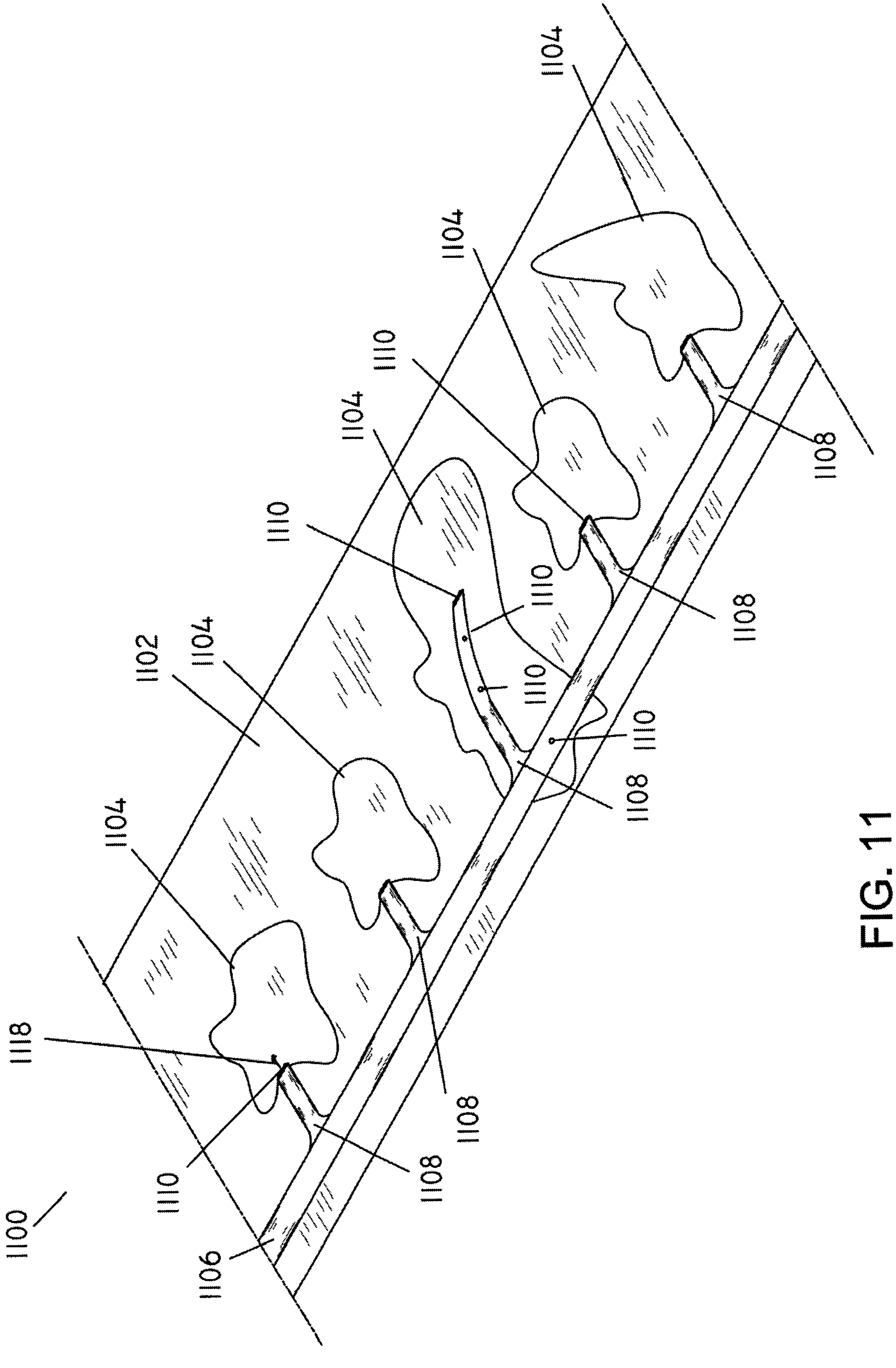
FIG. 11 is a perspective view illustration of a portion of a system in accordance with embodiments of the present system.

FIG. 11 is a perspective view illustration of a portion of a system 1100 in accordance with embodiments of the present system. The system 1100 is similar to the system 100 of FIG. 1 and includes a substrate 1102, grow portions 1104, and a fluid distribution system 1105. However, the grow portions 1104 have a different shapes. This may be useful when creating a landscape with different sized and/or shaped grow portions 1104. The fluid distribution system 1105 may distribute water to one or more of the grow portions 1104 and may include one or more of a flow manifold 1106, one or more runners 1108, and flow valves 1110. Further, the flow valves 1110 may include openings in a side wall of the flow manifold 1106.

Figure 12:
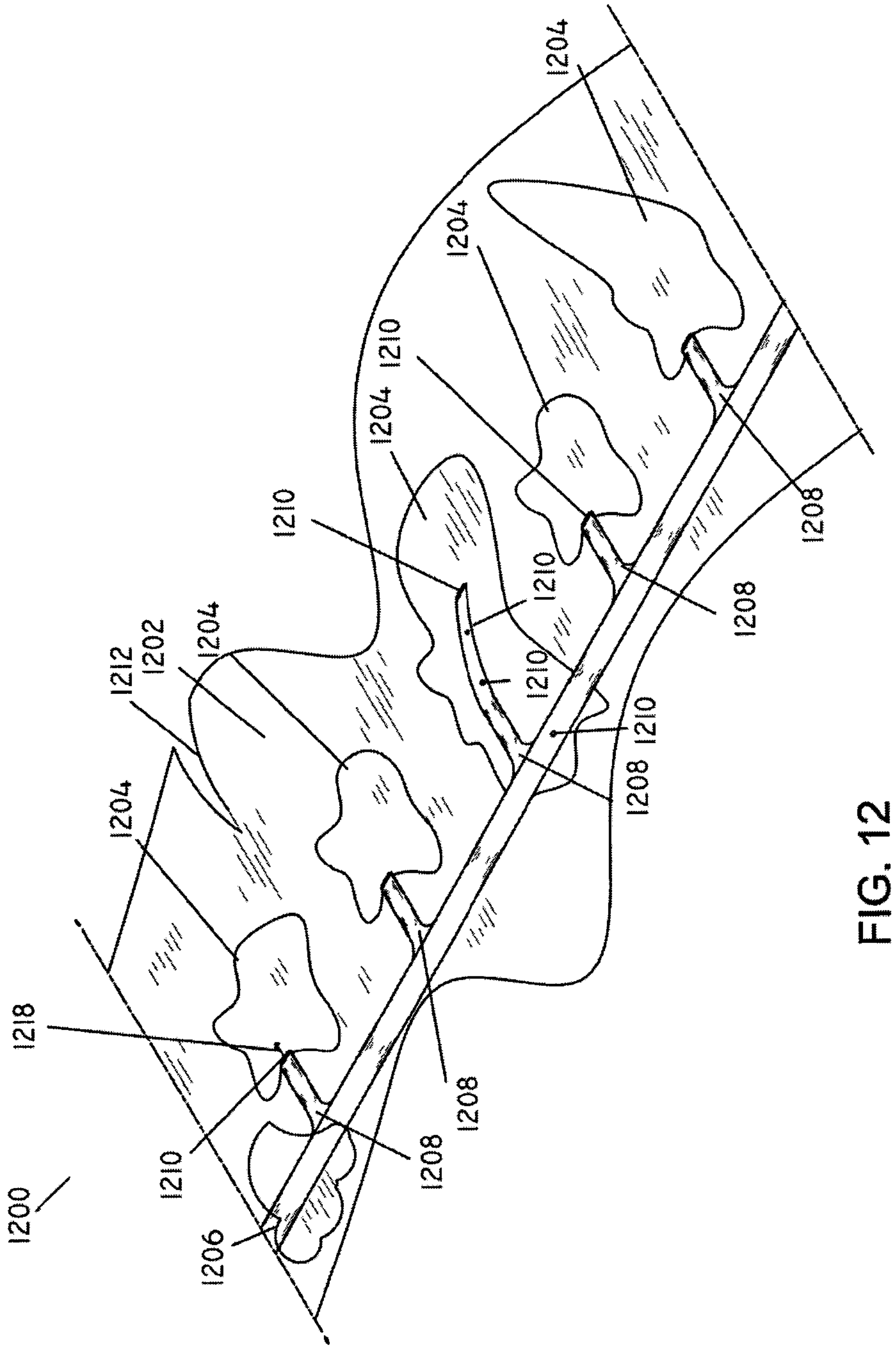
FIG. 12 is a perspective view illustration of a portion of a system in accordance with embodiments of the present system.

FIG. 12 is a perspective view illustration of a portion of a system 1200 in accordance with embodiments of the present system. The system 1200 is similar to the system 1100 of FIG. 11 and includes a substrate 1202, grow portions 1204, and a fluid distribution system 1205. However, the substrate 1202 has a curved shape. Similarly, the fluid distribution system 1205 may include curved areas. For example, the fluid distribution system 1205 may include one or more of a flow manifold 1206, one or more runners 1208, and flow valves 1210 which may be shaped and/or sized in accordance with a shape of the substrate and/or grow portions 1204. This shape may be formed by the controller of the system to correspond with a shape and/or size of a desired area. Accordingly, for example, the controller may determine a size and/or shape of an area or volume (e.g., a landscaped area, etc.) and may cut the substrate and/or set the size and/or shape of one or more grow areas correspondingly. Further, the substrate may include one or more cuts or notches such as notch 1212 to enable the substrate 1202 to confirm to a surface of an area to which it is to be applied without having to fold portions of the substrate 1202. In other words, the substrate may include cuts for confirming to a three-dimensional surface or to a desired shape. With regard to conforming to three-dimensional shapes such as may be encountered when applying substrates of the present system to landscapes, terrain, farms, the process may employ map projection methods or the like to determine a shape of one or more of the substrate, the fluid distribution system, the grow portions. Further, system may use a selected landscape from, for example, landscape library of the system, which may set forth landscape styles (e.g., mixed tulips and grass, etc.) which, may be selected by the user using a UI of the system. Accordingly, the system may include an application which may transform coordinates from a curved surface (e.g., of an area to which the substrate is to be applied) to a plane (e.g., to the substrate) such as a plane of the substrate. In other words, the process may employ a projection application which include mathematical function configured to transform coordinates from the curved surface to the plane. Further, substrates of the present system may be configured to include relieve areas, weakened areas, cuts, notches, etc., configured to so that the substrates may confirm to three dimensional areas.

Further, the system may obtain map information such as imagery information (e.g., satellite imagery information, map information, topography information, etc.) from any suitable source (e.g., Google™ Earth™, Google™ Maps™, topographic information, street-level image information, etc.), process the information in accordance with a current location (e.g., a user selected location such as 123 Mockingbird Lane, Anyplace, AnyState 12345, USA) and determine landscape information. The system may further analyze the map information to determine shade patterns and form corresponding shade information. Then, the system may determine substrate specifications for one or more substrates in accordance with a (e.g., user) selected landscape style, the substrate specifications, and/or the shade information. Accordingly, the system may receive an address (e.g., an address, a location, a landmark, etc.) from a user, a selected landscape style from the user, obtain map information for the corresponding address, and form corresponding substrate information. Then, the substrate information may be used to form a substrate including a corresponding fluid delivery system, sensors, and/or grow portions (style, fill, and/or placement). This process will be explained in further detail below. Embodiments of the present system may include a landscape design application in which a user may select a landscape to apply to a desired area. The user may select plants (e.g., plants, flowers, etc.) to place in the landscape. The system may obtain image information of a selected area from various imaging sources such as satellite image information, street or ground view information, picture information, live image information (e.g., video information), three-dimensional image information, proximity information (e.g., as may be obtained using a proximity detection system such as a Microsoft™ Kinect™ type proximity detection system), topographic map information, etc. The system may obtain the image information directly or via a third party resource such as Google™ Earth™, etc. The system may then combine image information from one or more sources (e.g., Google™ Earth™ and Topographic information, etc.) to generate a current area map. Then system may then map out and/or form substrates and corresponding planting portions in accordance with the current map area. For example, upon detecting a circular driveway, a substrate to be applied adjacent to the circular driveway would have a generally round shape when viewed from above. Thus, the system may obtain a current area map. Using a landscape design application (e.g., a third-party landscape design application), user selections (e.g., flower types, location, etc.) be applied to the current area map to determine a landscape area map. The system may then configure one or more substrates in accordance with the landscape area map such that plants such as flowers may grow in accordance with the user selections.

Figure 13:
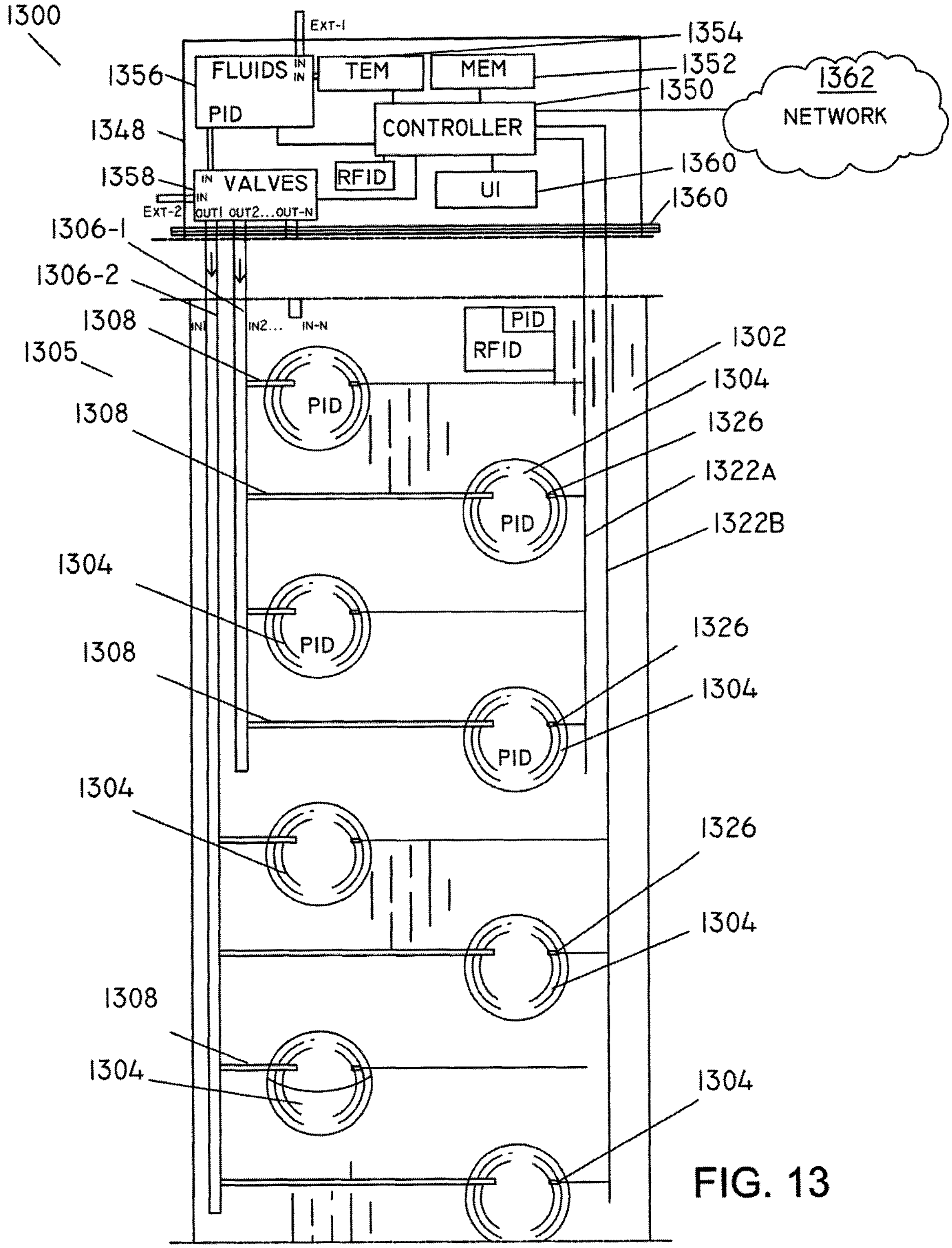
FIG. 13 is a partial cutaway top view illustration of a portion of a system in accordance with embodiments of the present system.

FIG. 13 is a partial cutaway top view illustration of a portion of a system 1300 in accordance with embodiments of the present system. The system 1300 is similar to the system 600 shown in FIG. 6 and includes one or more of substrate 1302 grow portions 1304, sensors 1326, and a fluid distribution system 1305. However, the system 1300 shows a control portion 1348 including a controller 1350. Further, the system 1300 may include a plurality of substrates 1302 and corresponding sensors 1326, fluid distribution system 1305, and grow portions 1304 each of which may be coupled to the a common control portion 1348 so that it is operative in accordance with embodiments of the present system. For the sake of clarity, only a single substrate 1304 and corresponding sensors 1326, fluid distribution system 1305, and grow portions will be described. Further, heaters may be coupled to the substrate 1302 and/or corresponding grow portions 1306-*x*.

The fluid distribution system 1305 may include a plurality of flow manifolds 1306-1 and 1306-2 (generally 1306-*x*) each of which may provide fluid provided thereto to one or more corresponding grow portions 1304 directly or via runners 1308. Thus, each flow manifold 1306-*x* may serve one or more grow portions 1304 or groups of grow portions 1304. For example, grow portions of a first group may include plants such as tulips may be served by the flow manifold 1306-1 while grow portions of a second group including a different type of plant may be served by the flow manifold 1306-2. Thus, the flow manifolds 1306-*x* may provide different amounts of fluids, and/or different types of fluids such as water, fertilizer, pesticide, etc., to grow portions 1304 which it provides fluid to. However, it is also envisioned that in some embodiments a grow portion may receive fluids from more than one flow manifolds 1306-*x*. Further, it is envisioned that each flow manifold 1306-*x* may provide fluids grow portions 1304 of a row, column, area, etc. and/or portions thereof.

The sensors 1326 may include wired and/or wireless sensors (as may be described elsewhere) and may sense conditions at a corresponding grow portion (e.g., temperature, humidity, moisture levels, acidity, chemicals, enzymes, etc., as may be desired by a user) and may be coupled to the controller 1350 using any suitable method such as a wired and/or wireless methods. For example, the sensors may communicate using a wireless communication method (e.g., RFID, Bluetooth™, Wi-Fi™, GSM™, CDMA™, etc.) or via a wired bus such as a bus 1322. In some embodiments, each sensor may transit an ID with sensor information and/or may have an address. In some embodiments information from each sensor may be identified by grow portion plant type (e.g., by sensor ID, location, area, grow portion type (e.g., Tulips, Tomatoes, etc.). Although a sensor is shown with each corresponding grow portion 1304, in some embodiments, a single sensor or a plurality of sensors may be provided for a plurality of grow portions 1304. Further, sensors may be located in other areas such as upon the substrate 1302 at a distance from grow portions 1304 and may detect environmental conditions such as illumination intensity, temperature, wind direction, humidity levels, rain sensors, etc. The controller may process this information and set system functions (e.g., when it is determined that the temperature drops below a threshold temperature, the system may activate heaters).

The control portion 1348 may include one or more of a controller 1350, a memory 1352, a fluid collector (FC) 1354, a fluid portion 1356, valves 1358, and a user interface (UI) 1360.

The controller 1350 may include one or more processors (e.g., microprocessors, etc.) or other logic devices and may control the overall operation of the system. For example, the controller 1350 may receive sensor information, process the sensor information, and control functions of the system accordingly. The controller 1350 may include one or more processors which may be locally and/or remotely located relative to each other. The controller 1350 may communicate with the memory 1352, the FC 1354, the fluid portion 1356, and/or the UI 1360 via wired and/or wireless methods. The controller 1350 may communicate with portions of the system and/or external sources (e.g., a website such as a company website, etc.) via a network such as the network 1362.

The network 1362 may include any suitable network such as a local bus, a proprietary network, local area network (LAN), a wide area network (WAN), an intranet, the Internet, a controller area network (CAN), etc. The controller 1350 may communicate with the network via wired and/or wireless communication methods.

The memory 1352 may include any suitable memory such as a local memory, a remote memory, a distributed memory, etc. The memory 1352 may store information used and/or generated by the system.

The FC 1354 may include active and/or passive condensation portions which may passively or actively collect water and/or condition air (e.g., dehumidify, humidify, etc.) air used by the system. For example, in some embodiments the FC 1354 may include a heat pump, thermo-electric modules, etc., which may condense ambient moisture (e.g., collect dew) from ambient air. The FC 1354 may then provide the collected water to a reservoir of the system and/or to the grow portions 1304 (e.g., via, for example, fluid distribution system 1305) under the control of the controller 1350. The FC 1354 may further include pumps such as fluid pumps, air pumps, and/or vacuum pumps which may be used to flow (e.g., pressurize) a fluid, flow air (e.g., condensation air, etc.), and/or create vacuum as may be required by the system.

The UI 1360 may include any suitable user interface such as a user input device (e.g., a touch screen display, a keyboard, a pointer, a mouse, a microphone, etc.) and/or an output device such as a display, a speaker, etc. Accordingly, information may be rendered for the convenience of a user via the UI 1360 and may be received from a user via the UI 1360. Portions of the UI 1360 may be locally and/or remotely located relative to each other. For example, a user may view system settings, current status, and/or parameters (e.g., graphically and/or textually), via a mobile station (MS) such as a smart phone (e.g., a Galaxy™, an iPhone™, a Blackberry™, etc.), a tablet (e.g., an iPad™, a Nexus™, etc.), a laptop, notebook, etc. Accordingly, for example, the controller 1350 may determine fluid flow rates and/or sensor information and display this information on a display of the system such as on an iPhone™ of a user.

The fluid portion 1356 may include one or more fluid reservoirs for one or more fluids such as mains water, well water, generated water (e.g., received from the FC 1354), and additives (e.g., pesticides (by type), herbicides, etc.). The fluids may be directed to and/or contained in separate storage reservoirs (e.g., pesticide A, pesticide B, . . . pesticide L, herbicide A, herbicide B, . . . , herbicide M, fertilizer A, fertilizer B, . . . , fertilizer N, etc. may be contained separately from each other) and/or may be mixed (e.g., using mixers of the fluid portion 1356) for storage with one or more other selected fluids (e.g., water may be mixed with fertilizer A, etc.) under the control of the controller 1350 or a user.

The fluid portion 1356 may include sensors such as fluid level sensors, fluid pressure, fluid flow rate, fluid temperature, etc., which may sense corresponding information such as fluid levels, fluid pressures, fluid flow rates, viscosity, fluid temperatures, etc., respectively, and report this information to the controller 1350. The controller 1350 may process the sensor information and control on or more valves, mixers, heaters, coolers, etc., accordingly. For example, if the fluid pressure is determined to be below a threshold value, the controller may be operative to activate a fluid pump to increase pressure or may be operative to open a valve further to decrease parasitic flow losses, etc.

When growing different types of plants (e.g., Azaleas, Daffodils, etc. (e.g., types may be defined by name, species, subspecies, etc. as may be set by the system and/or user)) using the same or different substrates, it may be desirable to match fluids delivered (e.g., different fertilizers, additives, etc.) to each of the grow portions 1304 (e.g., by needs of the plants 1301 of the grow portion 1304) (via, for example, the flow manifold 1306-*x*) to enhance growth of the plant(s) 1301 in a corresponding grow portion 1304. Accordingly, the controller 1350 may store and/or obtain fluid type information (FTI) for each fluid in each of the one or more fluid reservoirs (dry fluid reservoirs which may store powder such as powder fertilizer) and may obtain grow information (GI) for each grow portion 1304. The FTI may be obtained from a memory of the system such as the memory 1352, by scanning RFID tag of a product, and/or from an external resource such as a third-party resource (e.g., a manufacture's website, etc.). For example, a FTI of an additive may be obtained from a material data sheet (MDS) of the additive (e.g., see, MDS for Scotts™ fertilizer) obtained via the manufacturer's website. The controller may contextually analyze the MDS (e.g., using any suitable method such as a context application) and may filter desired information (e.g., "fertilizer analysis 32-0-4") from extraneous information by application. The FTI may include information as may be included in a MDS (e.g., product datasheet) for a corresponding fluid (e.g., an additive such as a fertilizer, a pesticide, a herbicide, a fungicide, growth enhancer, etc.). The system may obtain FTI using any suitable method such as by scanning an SKU or RFID tag of a product and obtaining corresponding information from a memory of the system such as the memory 1352 or from a third-party resource (e.g., a manufacturer's database or website) via the network 1362. Similarly, the GI may be obtained from a memory of the system such as the memory 1352, from an ID of a corresponding substrate 1302 (e.g., a substrate may include an ID which may be used to identify the substrate and/or GI of grow portions included with the substrate), from an ID of a grow portion 1304 (e.g., a grow portion a use may associate with a substrate), from a user input, and/or from an external resource such as a third-party resource (e.g., a manufacture's website, etc.). The controller 1352 may refer to the GI to determine characteristics of particular grow portion 1352 (e.g., soil moisture should be maintained between X and Y %, PH of soil PH should be between L and M %, etc.) and may be operative to provide corresponding fluids to maintain the desired values or range of values.

Thus, the controller 1350 may be configured to determine a type of plant (e.g., as may be entered by user "Azaleas," "Straw Grass," "Orchids," etc.), and/or GI for a particular grow portion 1304, obtain sensor information (e.g., current moisture level, current soil PH, current lighting, etc.), compare the sensor information to corresponding thresholds (e.g., as may be set forth in the GI) and determine actions in accordance with the results of the comparison (e.g., provide water, decrease PH, increase PH, activate artificial lighting, etc.), and may be operative to perform these actions by controlling portions of the present system (e.g., by activating valves, pumps to supply water, selected additives, activating lighting, etc.). With regard to the additives, additives such as fertilizer may include different FTI. For example, a first fertilizer (e.g., in a first fertilizer reservoir) may include a high nitrogen fertilizer while an other fertilizer (e.g., in an other fertilizer reservoir) may include a high calcium fertilizer. Accordingly, the controller 1350 may distinguish between these fluids (e.g., based upon the FTI) of a fluid and may provide them by matching the FTI of a fluid to needs of a plant 1301 or grow portion 1304 as may be set forth in the GI. When multiple flow manifolds 1306 are provided, the controller 1350 may determine grow portions 1304 and associated flow manifolds 1306 or vice versa. The fluid portion 1356 may include pumps, valves, and/or mixers operating under the control of the controller 1350 and which may distribute and/or mix the fluids, if desired. Further, the system may include matching additives and grow portions (e.g., plants in grow portions). Moreover, the system may include one or more energy storage devices such as batteries, capacitors, fuels, etc. to supply power to one or more portions of the system for an intended use. Moreover, the system may include an energy refilling portion (e.g., solar cells, etc.) to recharge the energy storage devices. Further, the system may determine energy use rates (e.g., rate of depletion) in accordance with available energy.

The fluid portion 1356 may include one or more fluid inputs (e.g., see, In) to receive fluids (e.g., mains water, well water, additives, etc.) for storage and/or output to, for example, the valve portion 1358. The fluids may be contained locally and/or remotely from each other. For example, one or more fluid reservoirs may be remotely located. Further, the fluid portion 1358 may include mixers to mix powders (e.g., dry powder additives such as fertilizer, herbicide, pesticide, fungicide, etc.) with the other powders and/or fluids (e.g., water) and may store (e.g., in a reservoir of the system) and/or distribute the resulting mixture.

The valve portion 1358 may include one or more valves operative under the control of the controller 1350 and may selectively distribute fluids input thereto to one or more flow manifolds 1306-*x* for distribution to corresponding grow portions 1304. The valve portion 1358 may include one or more fluid inputs such as inputs from the valve portion 1358 and/or external inputs. For example, external inputs may be coupled to mains water, etc. The valve portion 1358 may include sensors such as fluid level sensors, fluid pressure, fluid flow rate, fluid temperature, etc., which may sense corresponding information such as fluid levels, fluid pressures, fluid flow rates, fluid temperatures, etc., respectively, and report this information to the controller 1350. The controller 1350 may process the sensor information and control on or more valves, mixers, heaters, coolers, etc., accordingly. The valve portion 1358 may be configured to mix fluids input thereto and output the mixed fluid to one or more flow manifolds 1306-*x* under the control of the controller 1350. For example, the valve portion 1358 may receive water from a first input and an additive such as fertilizer from a second input and may control its valves to mix the water and additives to achieve a desired water-to-additive ratio under the control of the controller 1350.

A coupler 1360 may couple the control portion 1348 and/or portions thereof, to one or more of the sensors 1326, the substrate 1302, and the flow manifolds 1306-*x*, or portions thereof. The coupler 1360 may include a matching interfaces (e.g., a quick connect coupler for coupling each of the sensors 1326, the substrate 1302, and the flow manifolds 1306-*x* to the control portion 1348 in a single step or may include a plurality of interfaces for coupling one or more of the sensors 1326, the substrate 1302, and the flow manifolds 1306-*x* to the control portion 1348 separately using a plurality of steps. The coupler may be used to couple portions of embodiments of the present system so as to form a modular system which may be scaled.

The system may further include one or more product IDs (PIDs) associated with one or more of the substrate, the grow portions, the coupler, the fluid coupler, the fluid distribution system, the sensors, the reservoirs, the memory, the actuators, the mixers, the valve portions, the fluid containers, the powder containers (e.g., RFID tag in fertilizer powder), the TEM (or water condensation portions), etc. or portions thereof. The PID may be used to identify a corresponding portion and may be read by the controller using any suitable communication method such as a wired or wireless (e.g., RFID, etc.) communication methods. For example, in some embodiments, the substrate may include a PID which may be read by the controller. The PID may include a code be assigned, for example, by a manufacturer. The PID code may be a proprietary code and/or may be used to identify a portion of the system. Further, the PID may information such as one or more of manufacturer assigned information, manufacturer, product information, product name (e.g., brand and/or generic), product settings, product parameters, production dates, expiration dates, etc. or associated information. The controller may store PIDs and/or associated information (e.g., date or date range of use, expiration date, associated components (e.g., substrate ID with corresponding grow portion IDs, etc.) in a memory of the system for later use. The controller may poll for unit IDs at certain times such as at random times, at scheduled day(s) date(s) and/or time(s), upon sensing that a portion has been removed and/or replaced, at startup or powering up, before or when performing certain processes (e.g., before applying additives, the IDs of the additives are checked), etc. The controller may poll to read all PIDs associated with a system (e.g., a system installed by a user, an operating system, etc.).

After reading a PID, the controller 1350 may determine whether the PID is recognized. Accordingly, if it is determined that the PID is a recognized, the controller 1350 may be operative to control the system to operate (e.g., grow plants, seedling, etc. as described elsewhere). However, if it is determined that the PID is not recognized (or not read), the controller may restrict functionality of the system or portions thereof. For example, the controller may restrict a portion including the not-recognized PID. For example, if it is determined that a PID of a fertilizer reservoir added to the system is not a recognized, the controller may restrict a fertilization function and restrict distribution of fertilizer to the grow portion(s). Accordingly, the controller may restrict functionality of the additive functions, etc. when it is determined that a PID is not read and/or recognized. Similarly, if it is determined that a PID of a grow portion is not a recognized, the controller may restrict operations such as watering and/or fertilizing of the corresponding grow portions.

To determine whether a PID is recognized, the controller may compare a PID with registered IDs which may be obtained from a memory of the system. If it is determined that a PID corresponds with a registered ID (e.g., matches a registered ID), the controller may determine that the PID is recognized. However, if it is determined that the PID does not correspond with a registered ID, the controller may determine that the PID is not recognized. Further, the controller may determine whether portions of the present system are compatible with each other. For example, when building a modular system, a user may couple a control portion to an additive portion, a substrate portion including grow portions, etc.

Moreover, in certain embodiments of the present system, the controller may track a time of use (TOU) of a portion of the system. For example, a substrate may have TOU threshold value of 180 days. After initially detecting the substrate via recognition of its PID and determining its TOU threshold value, the controller may start a TOU count at 1 and may increment the TOU count every 24 hours (e.g., one day). Then, at scheduled intervals such as once a day, at certain days, dates, times, every 24 hours, etc., the controller may determine whether the TOU count is greater than the threshold TOU. Accordingly, if it is determined that the TOU count is greater than the threshold TOU, the controller may restrict functionality of the system. However, if it is determined that the TOU count less than or equal to the threshold TOU, the controller may operate regularly (e.g., without restriction due to exceeding the TOU threshold (absent restrictions)). Thus, portions of the system may have a predetermined time-of-use.

Further, systems in accordance with embodiments of the present system may store detected PIDs used in a memory of the system. Each time a PID is detected to have been changed for a given portion (e.g., as may happen when a substrate is switched with another substrate), the system may compare the current PID with previously detected PIDs stored (e.g., used PIDs) in a memory of the system, and determine whether the current PID matches a previously detected PID. Accordingly, if it is determined that the current PID matches a previously detected PID, the controller may enter a restricted mode in which it may restrict operative features of the system in accordance with system settings. However, if it is determined that the current PID does not match a previously detected PID (e.g., a previously used PID), the controller may operate in a normal mode (e.g., without any restriction). This may prevent unauthorized refilling and/or recycling of portions of the system such as grow portions (e.g., by refilling with seeds and/or organic matter, etc.), substrates, etc. Further, the system may include a function to enter an authorization code to change a PID and/or to provide an override to allow a PID to reused two or more times, if desired. Thus, a user may refill grow portions and enter a new PID and/or a PID override code (e.g., to reuse PIDs), if desired, and the system may continue unrestricted operation, if desired.

Thus, portions of the system may have a preset use time (e.g. time-of-use or duration-of-use) or number of uses (e.g., 1 refill, 2 refills, etc.), and upon detecting that the preset use time or number of uses has exceeded corresponding thresholds (e.g., 180 days or one use), the system may enter a restricted mode in which it may restrict functionality of the system in accordance with corresponding restricted mode settings as may be stored in a memory of the system. These restricted mode settings may be set by, for example, the manufacturer, an installer, etc. and may be protected from access by certain users. Thus, for example, operation of the system with full functionality with unauthorized portions or refurbished portions may be prevented or restricted.

The controller may render results of one or more determinations of the system on a UI (e.g., a display, etc.) of the system for the convenience of the user. For example, the controller may render a determination such as "unregistered PID for substrate, system operation restricted, please replace substrate with XYZ brand substrate." or "substrate usage exceeds threshold, please replace," or "fertilizer 1 not recognized, please replace with XYZ brand fertilizer to maintain full operation of the system.").

In yet other embodiments, the controller may check a PID of a first portion (e.g., an additive portion) are compatible with a PID of another portion (e.g., a grow portion), and restrict operations of portions which are determined to be incompatible with each other. The system may store compatibility information in a memory of the system and may refer to the compatibility information to determine whether portions are compatible.

Further, embodiments of the present system may include one or more locators to determine a location and/or orientation of portions such as substrates, grow portions, etc. The locator may include any suitable locator such as a global positioning system (GPS), an assisted GPS (A-GPS), a triangulation system, an orientation sensor (e.g., a magnetic orientation sensor, an accelerometer, etc.), accelerometers, etc. The position orientation information may be processed by the system to determine position of, for example, a substrate, and store this information in memory of the system for later use. This may be desirable for experimental crops.

Figures 14, 15, 16:
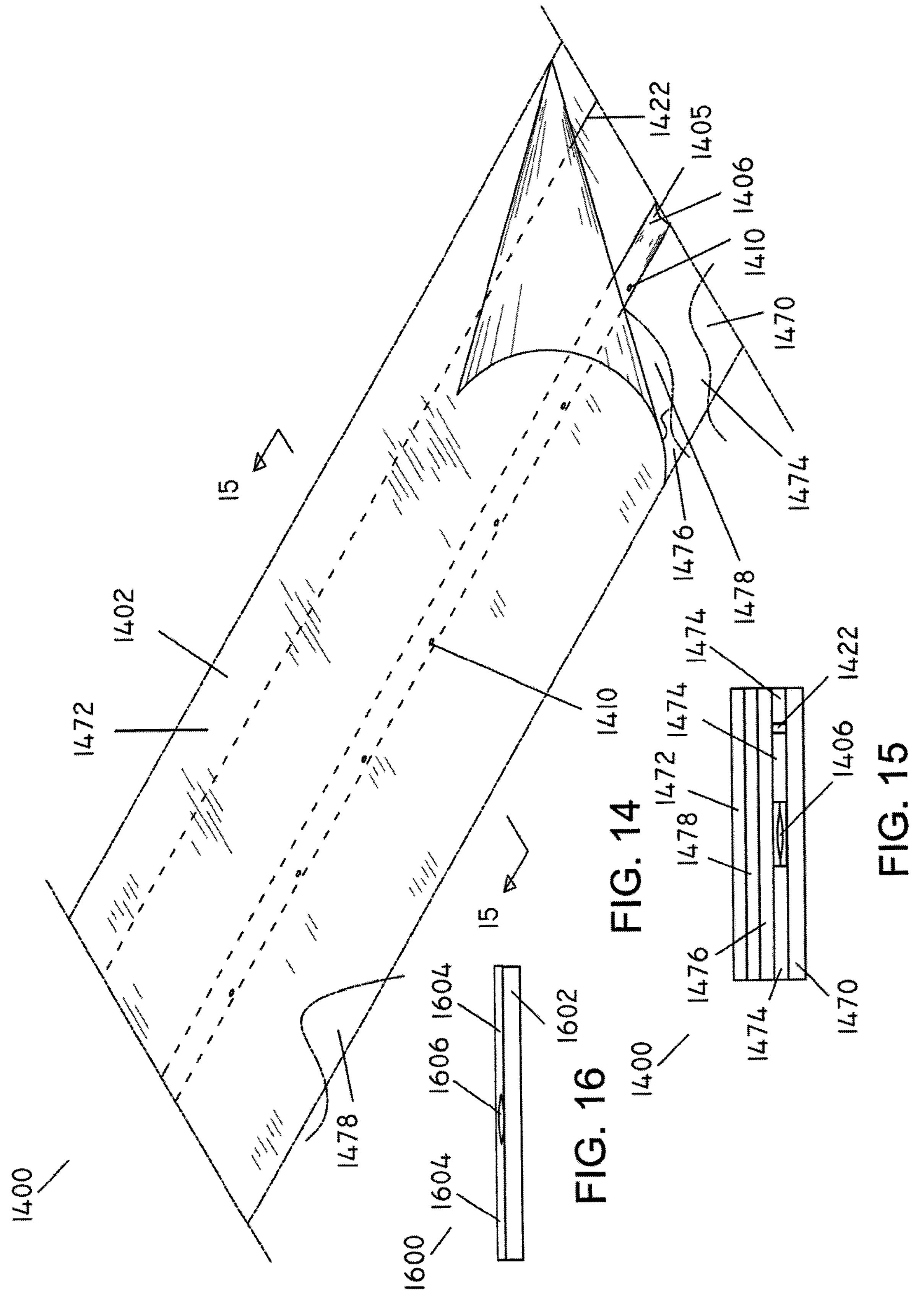
FIG. 14 is a partial cutaway perspective view illustration of a portion of a system having a uniform growing area in accordance with embodiments of the present system.
FIG. 15 is a cross sectional view illustration of a portion of the system taken along lines 15-15 of FIG. 14 in accordance with embodiments of the present system.
FIG. 16 is a cross sectional view illustration of a system in accordance with embodiments of the present system.

FIG. 14 is a partial cutaway perspective view illustration of a portion of a system 1400 having a uniform growing area 1404 in accordance with embodiments of the present system. The system 1400 illustrates a substrate 1402 including a plurality of layers such as one or more of a base layer 1470, blocking layers 1474, a flow manifold 1406, a sensor layer 1422, a wicking layer 1476, a grow layer 1478, and an upper layer 1472. One or more of these layers may include one or more materials that are similar to, or different from, one or more materials of an other layer or layers. Further, one or more of the layers may be compostable. For example, the base layer 1470 and 1476 may be formed from a material such as a fabric (e.g., burlap, etc.), paper, etc., that may wick water and may provide support to the substrate 1402. The flow manifold 1406 may be part of a fluid distribution system 1405 and may include one or more openings such as orifices 1410. The orifices 1410 may include openings which are shaped and/or sized so that a desired amount of fluid (e.g., water, additives, etc.) may pass therethrough and may be absorbed by other layers such as one or more of the wicking layers, and/or a seed layer. The size and/or location of the orifices 1410 may further be determined in accordance with an expected orientation of the substrate 1402. The orifices 1410 may have different sizes so that fluid may be distributed evenly, if desired. The sensor layer 1422 may include wiring and/or one or more sensors which may senses conditions of the grow layer 1478 such as moisture, acidity (PH), temperature, etc. The sensors may be distributed along the sensor layer and/or may attached to wiring of the sensor layer 1422. The sensors may be coupled to a controller of the system using any suitable communication methods such as wired and/or wireless communication methods. Further, if wireless communication methods are used, the sensors may be located at one or more discrete locations upon, for example, the base layer 1470.

To promote evenness of the substrate 1402, the substrate 1402 may include one or more blocking layers such as blocking layers 1474. In the present embodiment, the blocking layers 1474 may be situated between the base layer 1470 and the wicking layer 1476 and on the sides of one or more of the flow manifold 1406 and the 1422 sensor layer so as to fill in uneven areas between the base layer 1470 and the wicking layer 1476. Evenness of the substrate 1402 may be desirable when the substrate 1402 is rolled and/or folded upon itself.

The grow layer 1478 may include a seed mix (e.g. grass seed) and/or a starter composition such as soil (e.g., starter soil, etc.), compost, paper, a binder, etc.

The upper layer 1472 may include a protective layer such as a binder layer, a plastic layer, a compostable layer, etc., which may protect the seeds of the grow layer 1478 during deposit and/or initial growth. For example, the upper layer 1472 may protect the seeds of the grow layer 1478 from being washed away by rain, eaten by animals (e.g., birds and/or vermin), etc. The upper layer 1472 may include a compostable protective layer such as a binder which may degrade with exposure to one or more of water, sunlight, etc. However, it is also envisioned that the upper layer 1472 may include a plastic layer which may be removed (e.g., peeled off) by a user. Further, the upper layer 1472 may include an insulation layer which may protect the seeds and/or plants of the grow layer 1478 during seeding and/or initial growth. For example, the upper layer 1472 may include a plastic layer such as a foam layer.

Although several layers are shown, in yet other embodiments, a flow manifold and seeds are directly attached to a wicking layer. The wicking layer may be placed directly upon a desired surface such as a soil surface of an area to be planted (e.g., a landscape area).

Further, the substrate 1402 may include cuts, scores, folded areas, etc. configured so that the substrate 1402 may be applied easily and uniformly to uneven surfaces such as uneven terrain.

The system 1400 is suitable for uniformly growing small seeds such as grass and the like. For example, the system 1400 is suitable for growing plants in difficult areas such as landscaped hills on the side of highways and the like. Accordingly, the substrate 1402 may be easily applied and configured to grow plants such as grass, etc., in these areas and others such as home lawns, etc.

FIG. 15 is a cross sectional view illustration of a portion of the system 1400 taken along lines 15-15 of FIG. 14 in accordance with embodiments of the present system. One or more portions of the substrate 1402 may be attached to each other using any suitable method or methods (e.g., adhesives, sewing, etc.) However, the methods used should be compatible with the materials being bonded.

FIG. 16 is a cross sectional view illustration of a system 1600 in accordance with embodiments of the present system. The system 1600 is similar to the system 1400 and includes a substrate 1601 including one or more of a wicking layer 1602, a flow manifold 1606, and a grow layer 1604. However, the substrate 1606 includes a single wicking layer 1602. The flow manifold is 1606 is similar to the flow manifold 1406 and is attached to the substrate 1602 using any suitable methods. The grow layer 1604 is attached to the wicking layer 1602 using any suitable method (e.g., adhesives, binders, etc.). For example, the seeds may be mixed with a binder, adhesive, additive (e.g., fertilizer), and/or biological material (e.g., soil, compostable material, paper, mulch, etc.), etc. and coupled to the wicking layer 1602. Further, a protective layer may be situated upon the grow layer 1604 to protect the seeds (e.g., from birds, etc.).

The substrate may include a fluid distribution system (or portions thereof) having one or more flow manifolds. The flow manifolds may be parallel or non-parallel to each other and/or may have any desired shape (e.g., may be straight, arced, extend helically, zigzag, etc.). Further, in some embodiments, the flow manifolds may extend radially away from a center distributor which may provide the fluid to each flow manifold.

Figure 17:
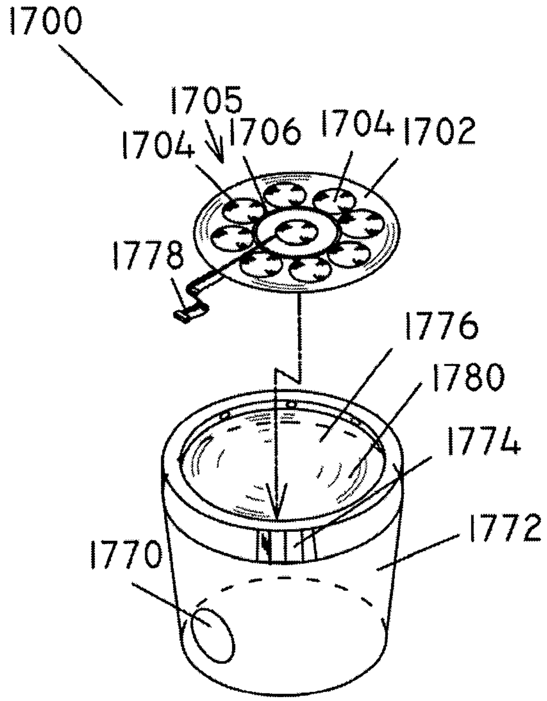
FIG. 17 is a perspective view illustration of a system in accordance with embodiments of the present system.

FIG. 17 is a perspective view illustration of a system 1700 in accordance with embodiments of the present system. The system 1700 includes one or more of a planter 1772, a control portion 1772, and a substrate 1702. The control portion 1772 may include one or more of a controller (e.g., a microprocessor, a logic device, etc.), a user interface (UI), a liquid reservoir, and an energy device such as a battery, a capacity, mains power, and/or a solar cell such as solar cell 1774. The substrate 1702 may include one or more of a substrate layer, a fluid distribution system 1705, and grow portions 1704. The substrate 1702 may be similar to grow portions described elsewhere and include a desired shape and/or size. For example, the substrate 1702 may have a 10 inch diameter for 10 inch pots. A coupler 1778 may fluidly couple one or more of the fluid distribution system 1705 to receive water from a liquid reservoir under the control of the controller. In some embodiments, the coupler 1778 may electronically couple portions coupled to the substrate 170 such as sensors, a memory (for reading ID), active portions such as valve, pumps, etc. to the controller for electronically transmitting and/or receiving information to/from the controller.

The liquid reservoir may be located in the planter 1772 and may be filled via a filler opening or via an output of a condenser. The condenser may include any suitable condenser to condense water vapor in the ambient air and may include a thermo electric cooler, a gas cooler, etc. The condenser may operate under the control of the controller and may operate continuously, at a certain times (e.g., in accordance with a schedule, etc.), when sufficient power is available (e.g., when determining that there is sufficient solar power available), and/or when sufficient humidity is determined to be present (e.g., when the controller determines that the current humidity is greater than a threshold humidity). Water condensed by the condenser may output via a condenser output to the reservoir or may be provided to the one or more grow portions 1704 under the control of the controller. The reservoir may include a level sensor to sense a fluid level and may provide this information to the controller. The controller may determine whether a fluid level in the reservoir is greater than a full threshold value. If it is determined that reservoir level is greater than a threshold level, the controller may turn off a condensing operation of the condenser. However, if it is determined that reservoir level is less than or equal to the threshold level, the controller may turn on a condensing operation of the condenser so as to collect more water. Further, the controller may determine whether the reservoir level is less than an low threshold level. Accordingly, if it is determined that the reservoir level is less than the low threshold level, the controller may render an indication of such on UI of the system (e.g., "refill reservoir").

The controller may obtain information related to a type of plant (seeds or plant) in one or more of the grow portions via a user input (e.g., user may enter plant type or select plant type via a UI of the system such as a user entry device such as a keyboard, a touchpad, etc.) or via electronic identification of the substrate via a substrate ID. Accordingly, the substrate may include an identification tag such as an RFID tag which may transmit ID information to the controller. In some embodiments, the controller may use a default or predefined information for growing the plants. For example, in embodiments where two or more types of plants are located in the grow portions 1704, the controller or system may use a predefined information obtained from a memory of the system which may be suited for both types of plants or with a selected pattern. The predefined information may include information related to growing plants such as soil moisture ranges (e.g., soil moisture 10-20%, soil PH level, watering intervals (e.g., water every 48 hours)).

In use, a user may insert the substrate 1702 into a cavity 1776 of the planter 1772 such that the substrate 1702 lies upon soil 1780 of the planter 1772. The substrate 1702 may then be electronically and/or fluidly coupled to the planter 1772 via the coupler 1778.

The controller may be configured to sense a moisture level in the soil within the planter 1772 and provide liquid such as water to the plant(s) within the planter accordingly so that one or more predefined moisture levels are maintained. However, in yet other embodiments the controller may be configured to provide liquid such as water in accordance with a flow amount (e.g., apply 16 ounces water every 24 hours) and/or flow times (e.g., 2 minutes flow every 24 hours, 3 minutes flow every three hours, 10 minutes flow at 2.00 am, 4:00 am 7:00 pm, etc.). The controller may refer to a watering table for watering information and may provide water in accordance with the watering information. The watering information may include default watering information and/or may be defined for one or more plant types.

In yet other embodiments the planter 1772 includes sensors and/or a fluid deliver system.

Thus, the present system may provide a planter 1700 which may provide liquid such as water and/or additives (e.g. fertilizer, etc.) to one or more plants growing in the planter 1700. The planter m 1700 may operate independent of a mains power and/or a mains water supplies. Further, the planter 1700 may operate without the need for a user to provide water to the planter 1700.

Figure 18:
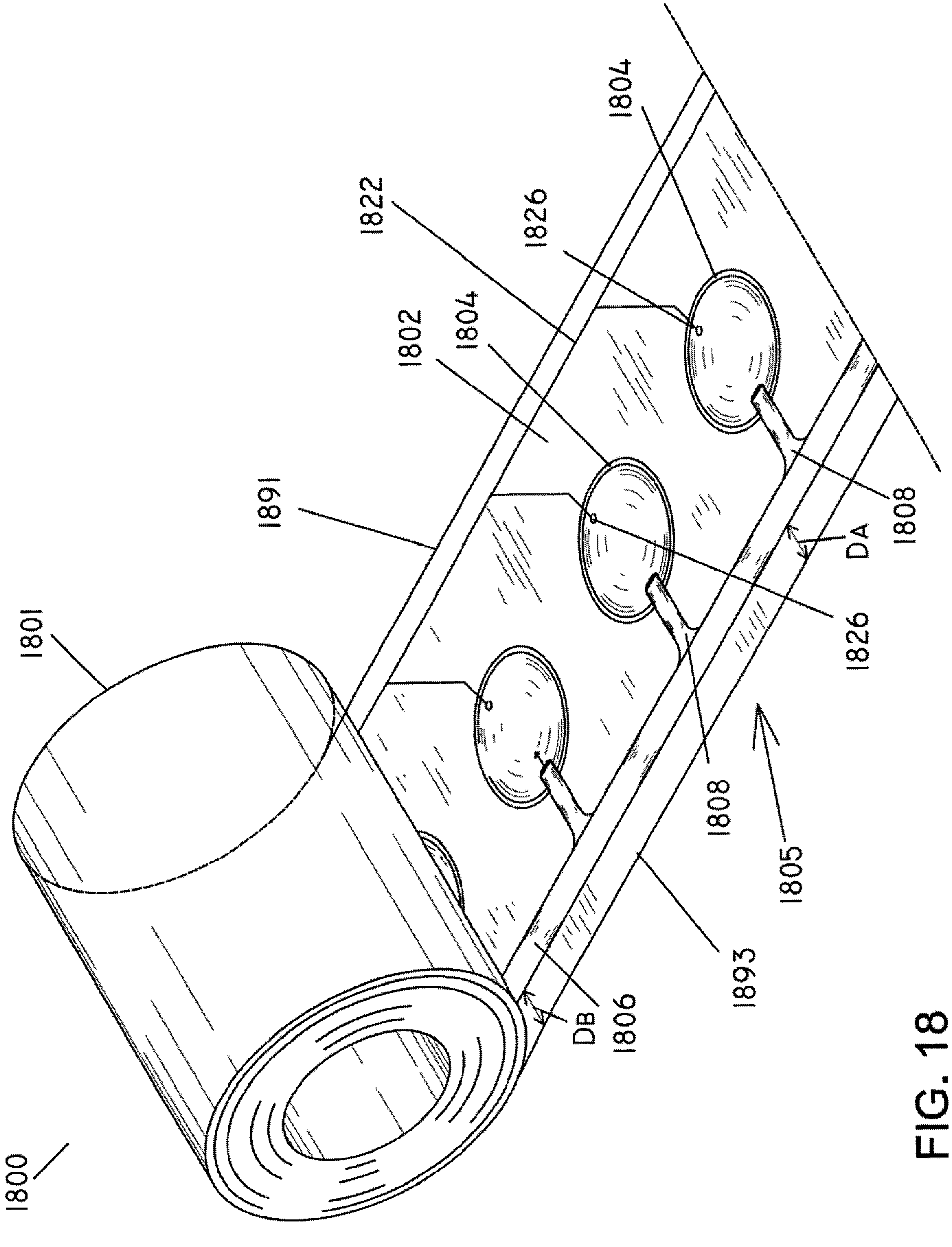
FIG. 18 is a top perspective view illustration of a portion of a system in accordance with embodiments of the present system.

FIG. 18 is a top perspective view illustration of a portion of a system 600 in accordance with embodiments of the present system. The system 1800 is similar to system 600 shown in FIG. 6 and includes a substrate 1802 grow portions 1804, and a fluid distribution system 1805. The fluid distribution system 1805 includes a flow manifold 1806, one or more runners 1808, and flow valves which may provide liquid such as water to the grow portions 1804. The substrate 1802 is rolled into a roll 1801 for compact form. However, in yet other embodiments, the substrate 1802 may be folded in one or more locations. In use, the substrate 1802 may be unrolled and/or applied to a desired area. The substrate 1802 may be coupled to a controller and to fluid sources. Accordingly, the controller 1802 may be operative to control the fluid source to provide liquids to fluid distribution system 1805, and, thus, the grow portions 1804 as described elsewhere. Further, the controller may obtain sensor information from sensors 1826 via, for example, control lines 1822. However, in yet other embodiments it is envisioned that the sensors may communicate with the controller via wireless methods. Further, although sensors 1826 are shown associated with corresponding grow portions 1804, in some embodiments, only a single sensor 1826 may be provided for several portions 1804. Further, although only a substrate 1802 having a single row of grow portions 1804 is shown, additionally substrates (e.g., similar to substrate 1802) may be coupled to and/or located at sides 1891 and 1893 of the substrate 1804. Thus, for example, in some embodiments a substrate may include 10 rows of grow portions 1804 and/or corresponding fluid delivery systems 1805. Further, the fluid distribution system 1805 may include couplers to couple the flow manifolds (or other portions of the fluid distribution system 1805) of several substrates 1802-*x* together. Further, portions of the system 1800 may be offset so that adjacent portions do not substantially overlap with each other when the substrate 1802 forms the roll 1801. For example, in some embodiments, the flow manifold 1806 may configured to form at least part of a helix when the substrate 1802 forms a roll 1801 so that the substrate 1801 is more compact. Accordingly, the flow manifold may be configured to be offset relative to one or more sides or edges of the substrate 1802 along a longitudinal distance of the flow manifold 1806. Thus, for example, a distance Da may be greater than or less than Db. Accordingly, when the substrate 1802 is rolled over itself (e.g., coiled), at least some portions of the flow manifold 1806 may not superpose other portions of the flow manifold 1806. This may prevent blocking (in thickness) due to the flow manifold 1806 and may result in a more compact roll 1801. This may be similar to thread of thread which is coiled about a spool and is spread about an axial axis of the spool. In yet other embodiments, it is envisioned that the grow portions 1804 may be offset along the substrate 1802 so as to reduce a thickness of the roll 1801, if desired. It is further envisioned that blocking portions (e.g., having a desired thickness) may be situated in various locations of the substrate such as about the growth portions, along longitudinally along the sides, transversely, etc., so as to even a thickness of the roll 1801 (or portions thereof) and/or reduce or eliminate pressure upon the grow portions (and/or plants of seeds within). For example, the blocking members may include portions of foam, etc., which may be removed after transportation and/or installation of the substrate 1802, if desired.

Further, couplings for the fluid delivery system to couple to a controller and/or liquid supply and/or for the sensors to couple to the controller may be located at ends and/or interior portions of the substrate 1802. However, in yet other embodiments, the couplers may be located at other locations relative to the substrate 1802. Location may be based upon a desired use and/or an existing configuration. Further, the substrate 1802 may include mechanical fasteners such as hook-and-loop-type fasteners (e.g., Velcro), hook-and-eyelet-type fasters, friction fasteners, etc. to couple other substrates and/or options (e.g., plant ID, fluid distribution systems or portions thereof), covers (e.g., clear covers for protecting plants, etc.), as may be desired by a user.

It is envisioned that in some embodiments, the substrate may include couplings to couple (mechanically, fluidly, and/or electronically) the substrates to each other, control systems, and/or fluid distribution systems or portions thereof.

Figure 18B:
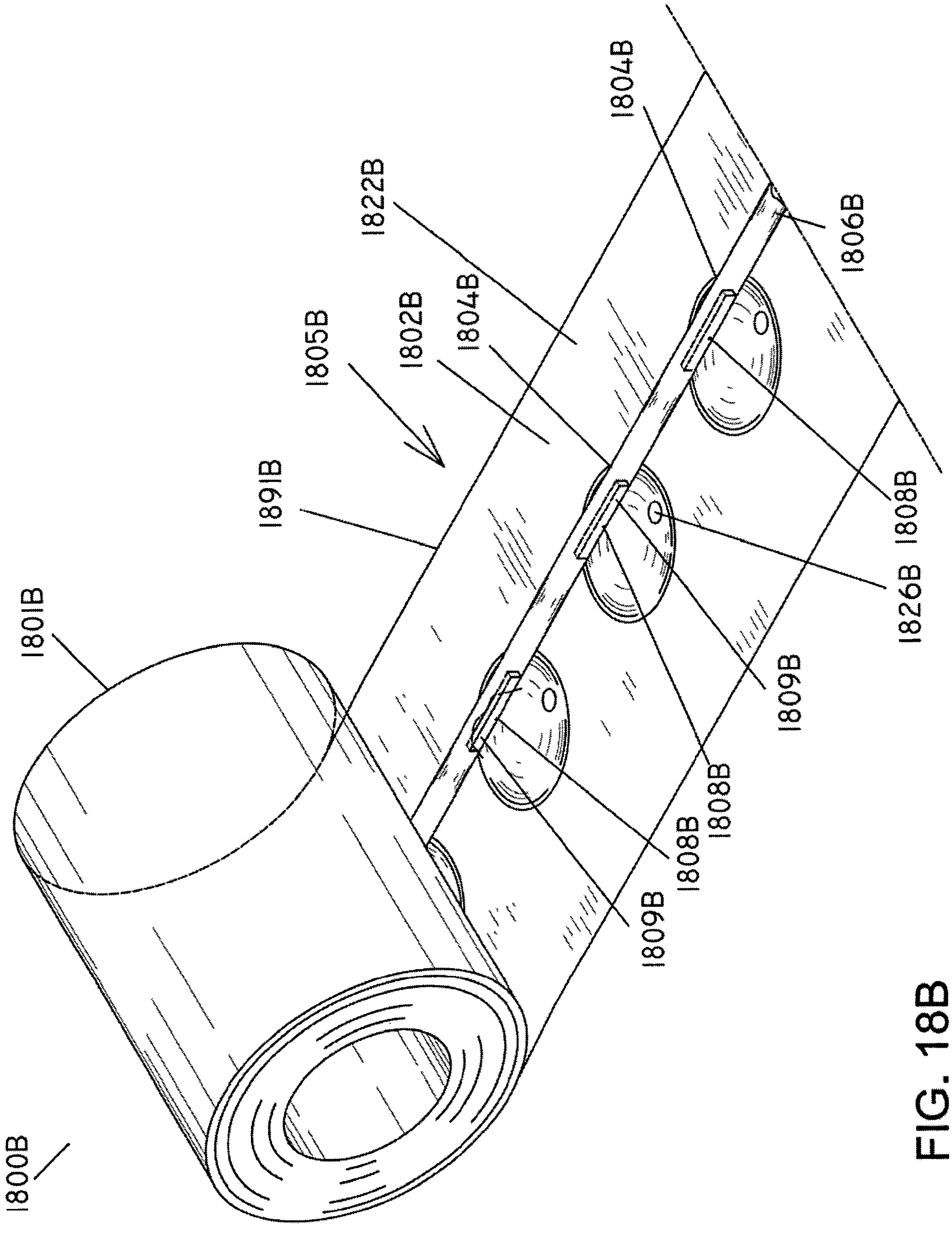
FIG. 18B is a partially cutaway top perspective view illustration of a portion of a system in accordance with embodiments of the present system.

FIG. 18B is a partially cutaway top perspective view illustration of a portion of a system 1800B in accordance with embodiments of the present system. The system 1800B is similar to the system 1800 shown in FIG. 18 and includes a substrate 1802B grow portions 1804B, and a fluid distribution system 1805B. The fluid distribution system 1805B includes a flow manifold 1806B having one or more openings 1808B fluidly coupled to the flow manifold 1806B. Each flow manifold may further include one more fluid flow controls 1809B such as emitters and/or drippers (e.g., such as a Netafim™ brand emitter and/or dripper, etc.) fluidly coupled thereto to control the flow of the fluid (e.g., flow rate, flow velocity, etc.) to pass through the one or more openings 1808B from the from the flow manifold 1806B. Accordingly, the fluid flow controls 1809B may be fluidly coupled to the flow manifold 1806B and, for example, may be located with an internal cavity of the flow manifold 1806B. However, in yet other embodiments, the fluid flow controls 1809B may be located at least partially external of the flow manifold 1806B. The flow controls 1809B may be selected based upon, for example, desired fluid flow rates, flow pressure, water quality, etc. For example, in systems where poor water quality is expected, the flow controls 1809B may be selected such that they do not easily clog.

The substrate 1802B may be coupled to a controller and/or to fluid sources. Accordingly, the controller 1802 may be operative to control the fluid source to provide liquids to fluid distribution system 1805B, and, thus, the grow portions 1804B as described elsewhere. Further, the controller may obtain sensor information from one or more sensors 1826B via, using wireless and/or wired methods. The one or more sensor 1826B may form at least pert of the sensor array and/or network. Further, although sensors 1826B are shown associated with corresponding grow portions 1804B, in some embodiments, only a single sensor 1826B may be provided for several portions 1804. Further, although only a substrate 1802B having a single row of grow portions 1804B is shown, additionally substrates (e.g., similar to substrate 1802) may be coupled to and/or located at sides 1891B and 1893B of the substrate 1804B. Thus, for example, in some embodiments a substrate may include 10 rows of grow portions 1804B and/or corresponding fluid delivery systems 1805B. Further, the fluid distribution system 1805B may include couplers to couple the flow manifolds (or other portions of the fluid distribution system 1805B) of several substrates 1802B-x together.

Figure 18C:
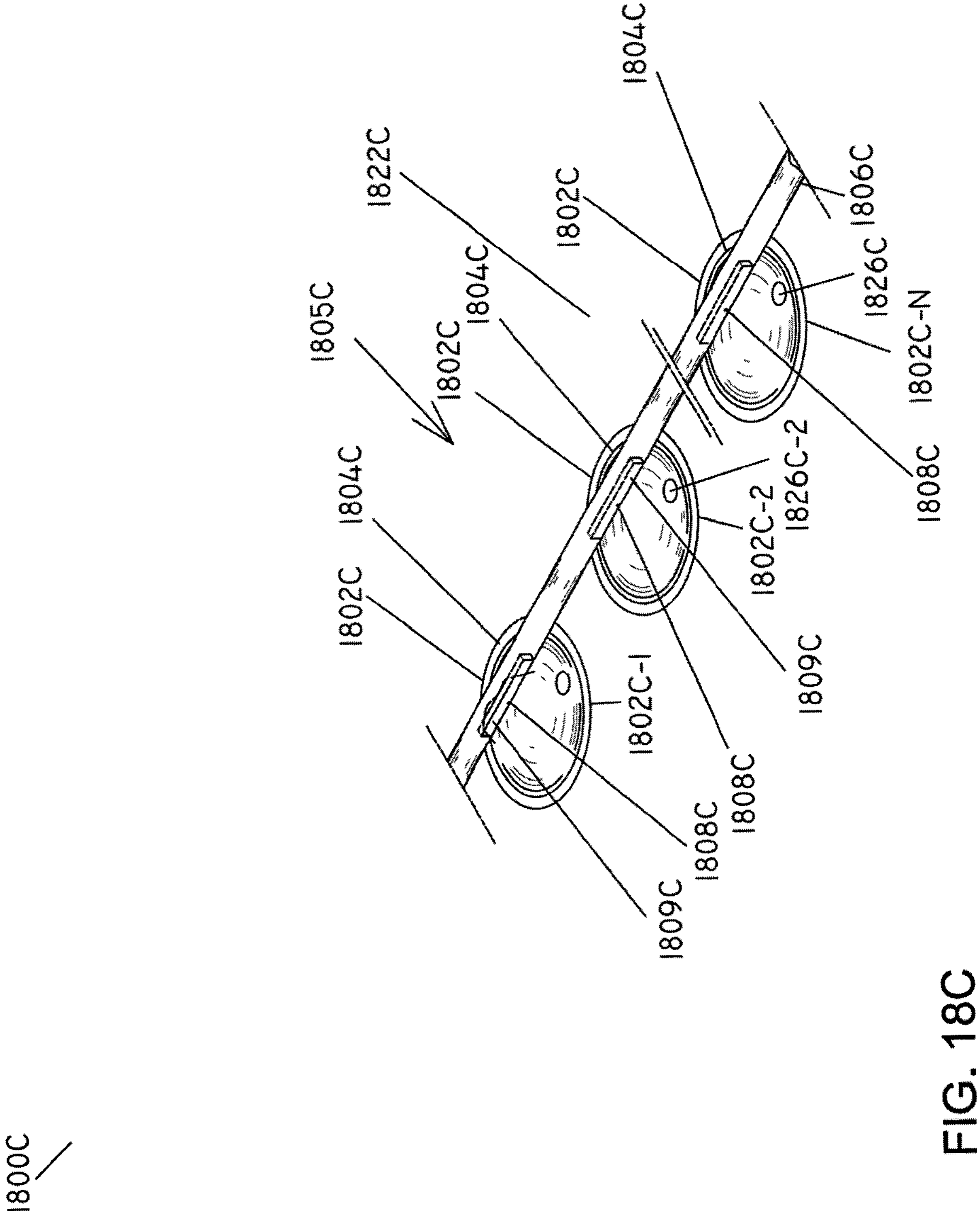
FIG. 18C is a partially cutaway top perspective view illustration of a portion of a system in accordance with embodiments of the present system.

FIG. 18C is a partially cutaway top perspective view illustration of a portion of a system 1800C in accordance with embodiments of the present system. The system 1800C is similar to the system 1800B shown in FIG. 18B and includes a substrate 1802C, grow portions 1804C, and a fluid distribution system 1805C. However, the substrate 1802C may be discontinuous and may include a plurality substrate portions 1802C-1 through 1802C-N (generally 1802C-x) each coupled each other using a coupler such as straps, a flow manifold 1806C, etc. Accordingly, each of the plurality of substrate portions 1802C-x may be coupled to the flow manifold 1806C using any suitable method (e.g., adhesives, pressure bonding, straps, welds, stitches, rivets, screwable (e.g., threaded) mounts, friction fits, loops, hook-and-loop fasteners, etc.). The fluid distribution system 1805C may include a flow manifold 1806C having one or more openings 1808C fluidly coupled to the flow manifold 1806C. Each flow manifold 1806C may further include one more fluid flow controls 1809C such as emitters and/or drippers (e.g., such as a Netafim™ brand emitter and/or dripper, etc.) fluidly coupled thereto to control the flow of the fluid (e.g., flow rate, flow velocity, etc.) to pass through the one or more openings 1808C from the flow manifold 1806C. Accordingly, the fluid flow controls 1809C may be fluidly coupled to the flow manifold 1806C and, for example, may be located with an internal cavity or cavities of the flow manifold 1806C. However, in yet other embodiments, the fluid flow controls 1809C may be located at least partially external of the flow manifold 1806C. The substrate 1800C may be rolled and/or folded similarly to the substrates 1800 and/or 1800B. The one or more of the plurality of substrate portions 1802C-x may be asymmetrically and/or symmetrically located and/or offset and/or centered relative to one or more portions of the system 1800B such as the flow manifold 1806C.

Figure 19:
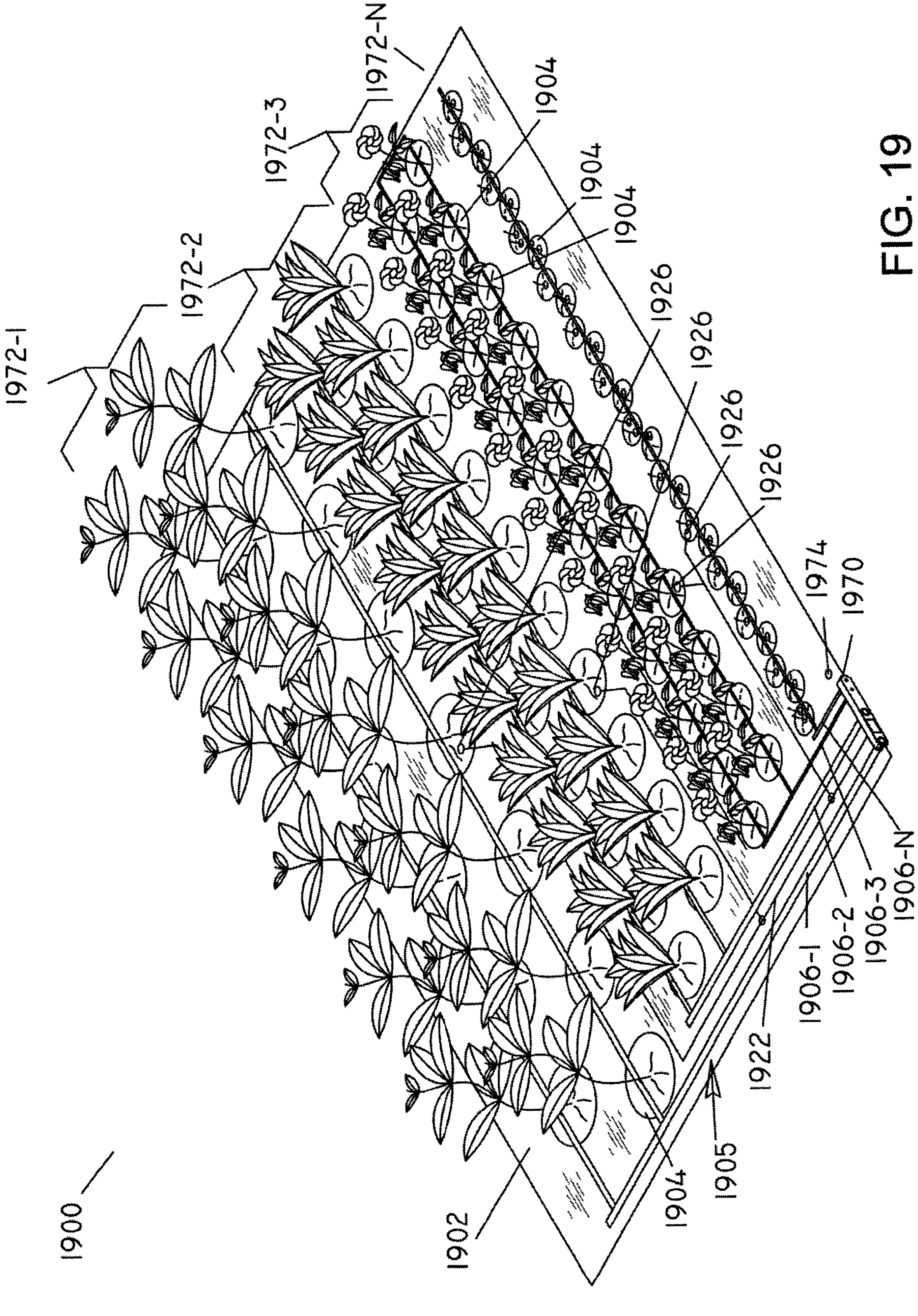
FIG. 19 is a perspective view illustration of a portion of a system in accordance with embodiments of the present system.

FIG. 19 is a perspective view illustration of a portion of a system 1900 in accordance with embodiments of the present system. The system 1900 may include one or more of a substrate 1902, a fluid distribution system 1905, and one or more grow portions 1904. The grow portions 1904 may include one or more groups 1972-1 through 1972-N each including an arrangement of corresponding plant types. Each of the one or more groups 1972-*x* may include one or more rows of plants of a corresponding type or types. The one or more groups 1972-*x* may be arranged in a desired pattern such as a straight pattern or other patterns such as an "S", "T", "U" or other patterns as may be desired One or more sensors such as sensors 1926 may be provided to sense conditions such as growing conditions (e.g., soil moisture, acidity, etc.) in a corresponding grow portion or portions 1904 and may provide corresponding sensor information to a controller of the system via, for example, bus 1922. However, in yet other embodiments, sensors may be provided in other locations and/or may sense other conditions such as substrate moisture level (away from a grow portion), substrate temperature, PID, etc. In some embodiments, a wireless transmission method may be provided to transmit information between the sensors and/or controller such as sensor information, etc. The fluid distribution system 1905 may include one or more flow manifolds such as flow manifolds 1906-1-1906-N (generally 1906-*x*) each of which may provide fluids to the grow portions 1904. The flow manifolds 1906-1-1906-N may be arranged to provide fluids to corresponding groups of grow portions 1904 such as the grow portions 1904 of the one or more groups 1972-1 through 1972-N, respectively. Thus, to conserve water, the controller may activate valves to certain flow manifolds 1906-*x* independently of the others. Accordingly, the controller may be operative to activate valves and/or pumps of the system so as to provide fluids via corresponding flow manifolds 1906-*x* to only certain groups 1972-*x* of the one or more groups 1972-*x* (of grow portions 1904) served by the corresponding flow manifolds 1906-*x* on moisture need basis as may be determined in accordance with sensor information (e.g., soils moisture information) provided by corresponding sensors 1926 and/or in accordance with watering tables stored in a memory of the system. This may conserve water. The watering tables may include information such as watering times (e.g., watering start and/or stop times e.g., 8:00 pm through 8:10 pm, watering days, dates, etc. (e.g., every day), etc.), watering periods (e.g., water for two minutes every 5½ hours). The system may further include rain sensors which may provide corresponding information. Accordingly, when sensing rain, the system may determine to suspend watering operations. In yet other embodiments, it is envisioned that a single flow manifold may provide fluids to one or more of the grow portions. On or more attachment portions such as grommet 1970 may be located, at one or more locations of the system 1900 such as the substrate 1974. Each of the flow manifolds 1906-*x* may be coupled to a coupler 1970 which may fluidly couple the corresponding flow manifold 1906-*x* to a corresponding fluid supply (e.g., which may provide fluid to the corresponding manifold under the control of the controller) and/or to another flow manifold of for example, the same or an other substrate. The coupler 1970 may further include electronic connections to electronically couple the bus 1922 to, for example, the controller directly or via one or more other buses. The coupler 1970 may be matched to another desired coupler. For example, the coupler 1970 may include one or more female connections while another coupler to coupled thereto may include corresponding male connections. Further, the couplers may be held in location relative to each other using any suitable method such as a friction fit, latches, clamps, screwable connections, adhesives, hook-and-loop fasteners, etc. Accordingly, a user may attach the coupler 1970 to anther coupler in a single step, if desired. This may decrease installation time. With regard to the grow portions 1904, the grow portions may be provided with seeds and/or plants of different types. For example, for a certain home-garden arrangement the grow portions 1904 included in group 1972-1 may include cherry tomato plants (e.g., Mexican Midgets), the grow portions 1904 included in group 1972-2 may include a sweet red pepper plants, the grow portions 1904 included in group 1972-3 may include cucumbers, and the grow portions 1904 included in group 1972-N may include radishes. In yet another home-garden arrangement, the grow portions 1904 included in group 1972-1 may include beefsteak tomato plants, the grow portions 1904 included in group 1972-2 may include a cucumbers, the grow portions 1904 included in group 1972-3 may include radishes, and the grow portions 1904 included in group 1972-N may include field greens. Thus, a user may select a desired garden mix, if desired. However, in yet other embodiments, the grow portions of the system may include a single type of plant type. In yet other embodiments, a flow arrangement may be provided. For example, the For example, for a certain home flow-garden arrangement, the grow portions 1904 included in group 1972-1 may include of a first type of flowing plant (e.g., the grow portions 1904 included in group 1972-2 may include a second type of flowering plant, the grow portions 1904 included in group 1972-3 may include a third type of flowering plant, and the grow portions 1904 included in group 1972-N may include an Nth type of flowering plant. Accordingly, the substrate may include various plant types and/or arrangements.

Figure 20:
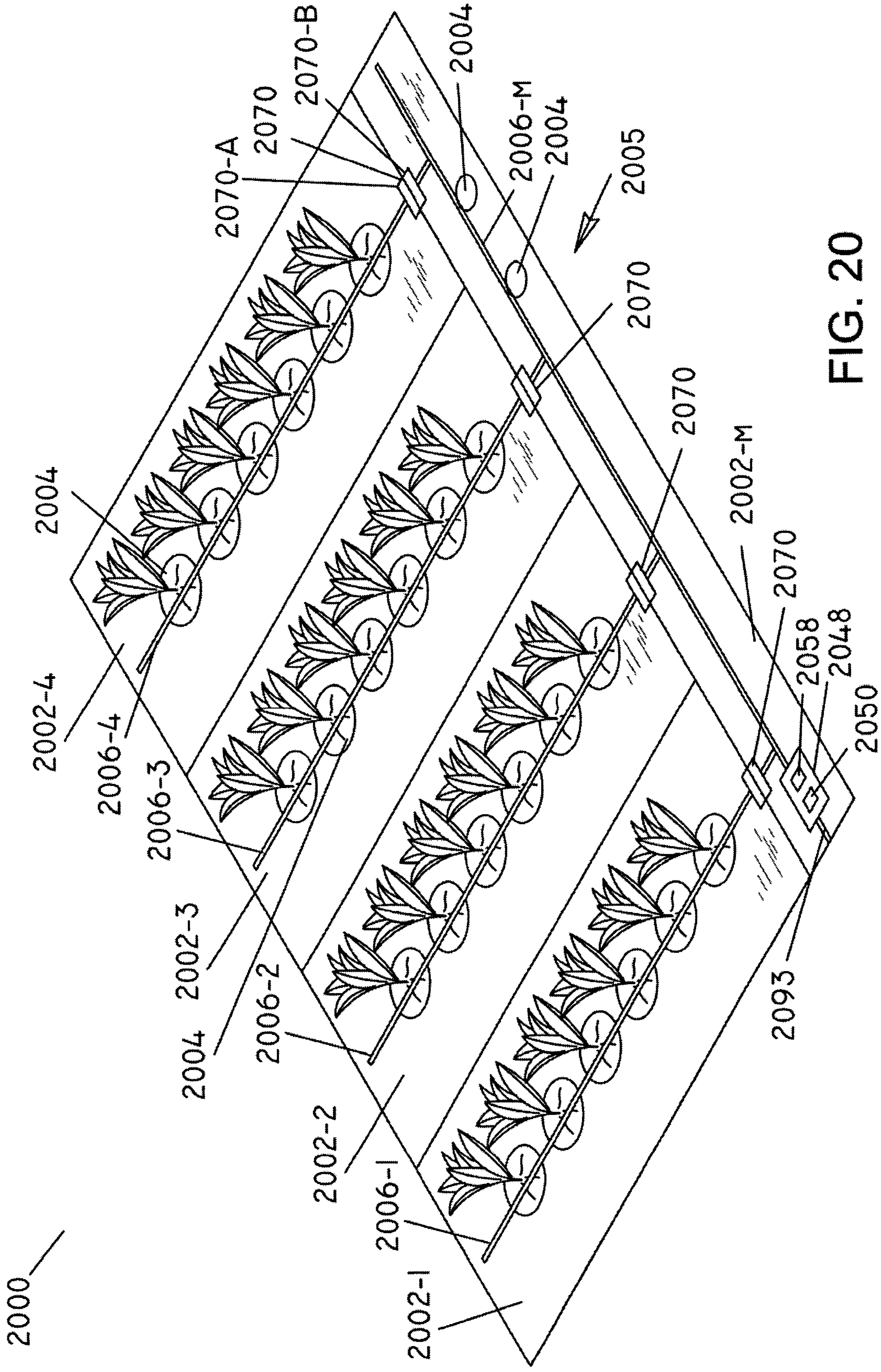
FIG. 20 is a perspective view illustration of a portion of a system in accordance with embodiments of the present system.

FIG. 20 is a perspective view illustration of a portion of a system 2000 in accordance with embodiments of the present system. The system 2000 may include one or more of one or more substrates 2002-1 through 2002-M (generally 2002-*x*), a fluid distribution system 2005, and a control portion 2048. The one or more substrates 2002-1 through 2002-M may include one or more flow manifolds 2006-1 through 2006-M (generally 2006-*x*), respectively, and one or more grow portions 2004. Accordingly, the flow manifolds 2006-*x* may provide fluid such as water to the corresponding grow portions 2004. The fluid distribution system 2005 may include the flow manifolds 2006-*x* which may be fluidly coupled to each other and/or to the control portion 2048 so as to receive fluid therefrom. The control portion 2048 may include a controller 2050 and/or one or more valves 2058 controlled by the controller 2050 and which may provide fluid to one or more of the flow manifolds 2006-*x* under the control of the controller 2050. The controller 2050 may include a microprocessor, a logic device, a timer, etc., which may determine to activate the one or more valves 2058 so as to provide a flow of fluid to the flow manifolds 2006-*x* fluidly coupled thereto. Sensors such as soil moisture sensors, temperature sensors, ambient air humidity sensors, etc., may be included and may provide corresponding sensor information to the controller 2050 for further processing. Each of the substrates 2002-*x* may have the same and/or different shapes and/or sizes from each other. One or more of the substrates 2002-*x* may include a coupler 2070 which may couple (e.g., mechanically, fluidly, optically, and/or electronically) a corresponding substrate 2002-*x* to another substrate 2002-*x* and/or to the control portion 2048. Accordingly, the coupler 2070*s* may include matching first and second couplers 2070-A and 2070-B, respectively, which may be coupled to each other using any suitable methods. The couplers 2070 may, for example, include quick-connect type couplers. A fluid input 2093 may provide fluid to the control portion 2048 for distribution to flow manifolds 2006-*x* under controller of the controller 2048 and/or directly to one or more of the flow manifolds 2006-*x*, if desired. It is further envisioned that in some embodiments, the control portion may be situated remotely, in whole or in part, from the substrates 2002-*x*.

Figure 21:
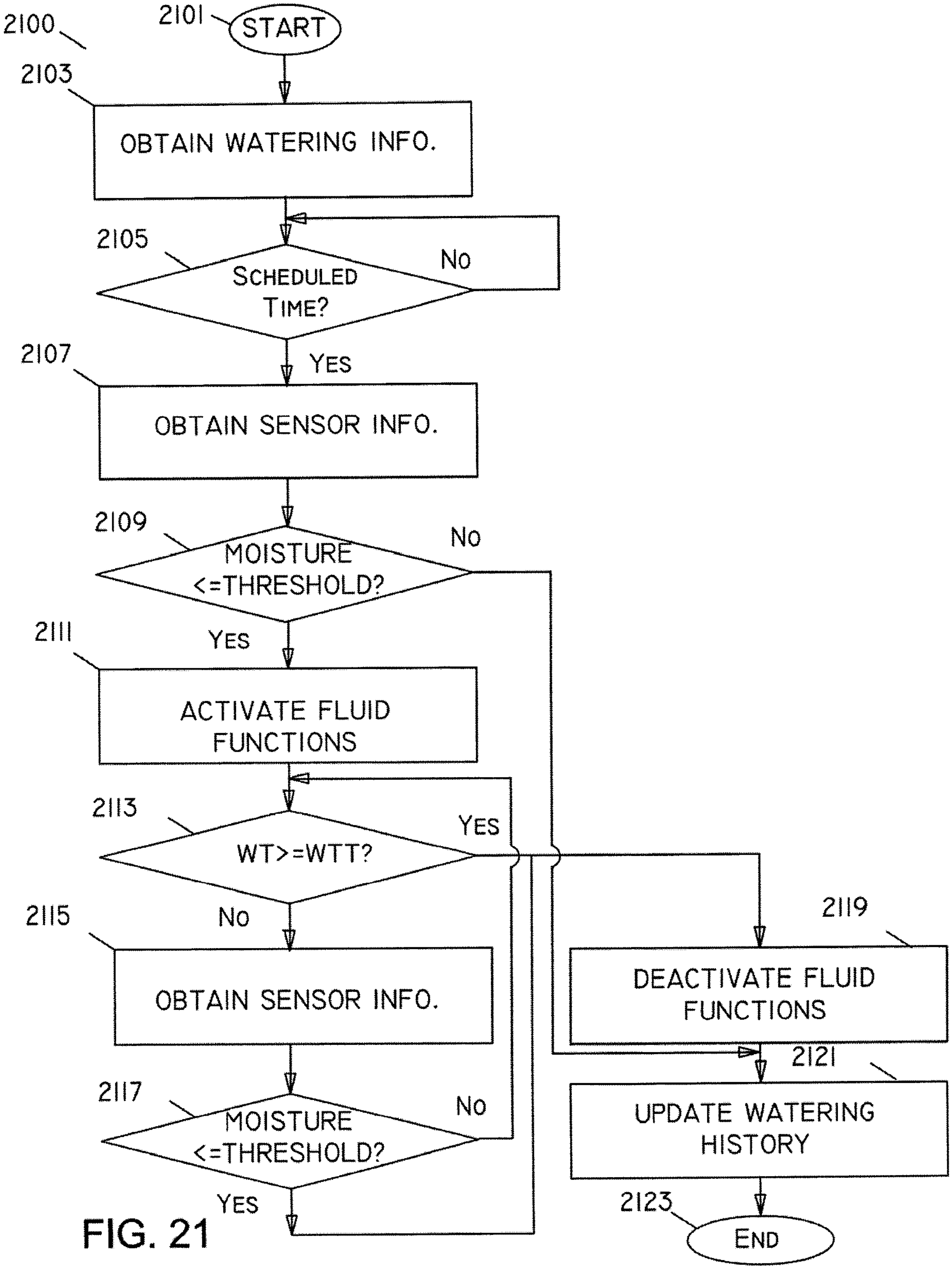
FIG. 21 is a flow diagram that illustrates a process in accordance with an embodiment of the present system.

FIG. 21 is a flow diagram that illustrates a process 2100 in accordance with an embodiment of the present system. The process 2100 may be performed using one or more computers communicating over a network. The process 2100 can include one of more of the following acts. Further, one or more of these acts may be combined and/or separated into sub-acts, if desired. In operation, the process may start during act 2101 and then proceed to act 2103.

During act 2103, the process may obtain watering information. The watering information may be obtained from a memory of the system and may include information related to watering, fertilization, heating, times of application information, etc., of one or more grow portions or groups of grow portions (e.g., a grow portion group) of the system. Further, the times of application information may include information related to a watering schedule (e.g., water twice daily at 2:00 pm). The groups of grow portions may include a plurality of grow portions which may include be assigned together (e.g., by a user), include common plant types, be served by the same flow manifold or manifolds, be included on the same substrate or substrates, etc. The watering information may include default watering information, watering information which may be stored in accordance with one or more substrates and/or grow portions of the system. For example, the process may include an act of obtaining substrate identification (SID) of a substrate of the system. Then, the process may obtain corresponding watering information for the corresponding SID. Thus, for example, if an SID is identified as SID #5, the process may obtain watering information corresponding to the SID #5 from a memory of the system. Accordingly, the memory may store watering information for a plurality of SIDs in a suitable format such as a table format in a memory of the system. With regard to the watering information, it may include various thresholds such as a soil moisture threshold (SMTs), fertilization thresholds, etc., for one or more SIDs or portions thereof (e.g., grow portions). Thus, for example, if a substrate includes two different types of plants in corresponding grow portions, the process may obtain SMTs corresponding to the grow portions. Further, the process may refer to a fluid map which may map grow portions to corresponding flow manifolds. Thus, for example, the process may determine that a certain grow portion which is to be watered is supplied with fluids by a first flow manifold of a plurality of flow manifolds. Accordingly, the process may supply the first flow manifold with fluids for the corresponding grow portion or grow portions. In some embodiments, the watering information may store watering thresholds, scheduled times, etc., in accordance with information related to a plant type (e.g., petunia). The watering information may further include scheduled times and/or duration (e.g., 6:00 am, 10:00 pm, 2 minutes duration, etc.). A method to obtain the watering information may be set and/or reset by a user and/or the system and may be stored in a memory of the system. After completing act 2103, the process may continue to act 2105.

During act 2105, the process may determine whether the current time corresponds with a scheduled time. Accordingly, the process may compare the current time (e.g., obtained from a clock of the system) and the scheduled time (e.g., obtained from the watering information) and if it is determined that the current time (6:00 am) corresponds with (or substantially corresponds with) the scheduled time (6:00 am), the process may continue to act 2107. However, if the process determines that the current time does not correspond with the scheduled time, the process may repeat act 2105. The scheduled time may be adjusted by the system and/or user and/or may be based upon watering history. For example, the process may set the scheduled time such that fluids are applied every other day. Thus, the process may obtain the watering history and set the scheduled time accordingly. Further, the process may include a scheduling application such as a third-party scheduling application to determine whether the current time corresponds with a scheduled time.

During act 2107, the process may obtain sensor information from one or more sensors of the system such as soil moisture sensors. The process may obtain the sensor information using any suitable method. For example, in some embodiments the process may rely upon a query/response method (e.g., single cast, unicast, broadcast, multicast, etc.) to obtain the sensor information. However, in yet other embodiments, the sensors may transmit sensor information to the controller at certain times (e.g., randomly, at certain times (e.g., once an hour, etc.). In yet other embodiments, the controller may merely sample a sensor bus to obtain the sensor information. The methods used to obtain the sensor information may be dependent upon the system configuration and will nor be discussed further for the sake of clarity. After obtaining the sensor information, the process may continue to act 2109.

During act 2109, the process may compare the soil moisture value obtained from the sensor information with a moisture threshold value. Accordingly, if the soil moisture value is determined to be less than or equal to the moisture threshold value, the process may continue to act 2111. However, if the soil moisture value is determined to be greater than the moisture threshold value, the process may continue to act 2121. The process may determine the soil moisture value in accordance with sensor information obtained from one or more soil moisture sensors. Further, the process may average soil moisture values when obtained from a plurality of sensors or may isolate certain soil moisture values such as the lowest soils moisture value, etc. Further, the process may repeat act 2109 for each sensor. The moisture threshold value may be obtained from the watering information and may be mapped to a corresponding sensor. Accordingly, when the process performs act 2109, the process may compare the moisture threshold for the corresponding sensor.

During act 2111, the process may activate fluid functions so as to supply fluid (e.g., water and/or fertilizer (nutrients)) to the grow portions via the flow manifold for the corresponding sensors. Accordingly, the system may activate valves, pumps, relays, solenoids, pressure regulators, etc., as may be desired so as to control to fluid pressure, fluid volume, fluid velocity, etc., so as to supply the fluid. The fertilizer may be supplied at a default rate (e.g., per volume fluid) and/for in accordance with a fertilizer information (e.g., 2 oz, fertilizer for every 10 gallons of water, etc.).

Further, the process may determine which flow manifolds correspond with which sensors (e.g., sensors may be mapped to flow manifolds) and may activate the fluid functions accordingly (e.g., may activate valves to supply the fluid(s)). Thus, based upon results of act 2109, the process may supply flow manifolds of a corresponding sensor. This may conserve water as flow manifolds mapped to sensors which had an associated soil moisture value(s) which were determined to be greater than the moisture threshold value may not be provided with fluid, if desired. However, in yet other embodiments, all flow manifolds may be provided with fluid. In yet other embodiments, the flow manifolds may be simultaneously and/or sequentially provided with fluid, if desired. For example, the process may provide fluid to flow manifolds sequentially so as to reduce a fluid flow rate. Further, when initially (e.g., for the current cycle) activating the fluid functions, the process may start (e.g., at 0) counting a counter to determine a (current) watering time (WT). After completing act 2111, the process may continue to act 2113.

During act 2113, the process may determine whether the (current) WT is greater than or equal to a watering time threshold (WTT) (e.g., a maximum watering time for a corresponding area). Accordingly, if it is determined that the WT is greater than or equal to the WTT, the process may continue to act 2119. However, if it is determined that the WTC is less than the WIT, the process may continue to act 2115. The WIT may be set by the system and/or user. For example, in some embodiments, the WIT may be set to a threshold time such as 15:00 minutes, etc. However, other times are also envisioned. However, in yet other embodiments the WIT may be determined in accordance with a WIT table which may include WTTs associated with various sensor information such ambient temperature values, ambient humidity values, soil moisture values, etc. For example, if the soil moisture value is determined to be less than a threshold moisture value, the WIT may be set to a default value (e.g., 5:00 minutes). However, if the soil moisture is detected to be greater than or equal to the threshold moisture value, the WTT may be set to 1:00 minutes. In yet other embodiments, the WTT may be determined in accordance with sensor information such as ambient temperature, ambient humidity, soil moisture, etc. The WIT(s), watering time table, and/or watering time functions may be stored in a memory of the system and obtained by the process when desired. The process may also meter the fluid flow (e.g., water, fertilizer, etc.) by integrating fluid flow over time and/or using one or more fluid flow meters (e.g., for one or more fluids (e.g., mains water, fertilizer, etc.)).

During act 2115, the process may obtain sensor information. This act may be similar to act 2115 and will not be discussed further for the sake of clarity. After completing act 2115, the process may continue to act 2117.

During act 2117, the process may compare the soil moisture value obtained from the sensor information with a moisture threshold. This act may be similar to act 2109. However, if the moisture value is determined to be less than or equal to the moisture threshold, the process may continue to act 2119. Conversely, if the moisture value is determined to be greater than the moisture threshold, the process may repeat act 2113.

During act 2119, the process may deactivate water functions which were activated during act 2111. Accordingly, the process may deactivate water pumps and/or valves activated during act 2111. After completing act 2119, the process may continue to act 2121 where the process may update watering history information and store the updated watering history information in a memory of the system. The watering history information generated during the process 2000. For example, the watering history may include previous watering times (e.g., by day, date, etc.), total fluid flow (e.g., water used), nutrient application information (e.g., an amount of nutrients applied and dates of application), soil moisture values, etc. Thus, for example, if it is desired to apply nutrients every other day, the process may refer to the watering history information to determine whether nutrients were applied during the past day (24 hours or other time period as may be desired by the system and/or user).

In some embodiments, fluid functions (e.g., a fluid supply operation) may be activated or initiated using, for example, a timer (e.g., by day, date, etc.) which may control one or more valve(s), pump(s), pressure regulators, etc. For example, each day at 2:00 pm fluid functions may be activated for 3:00 minutes. The timer may be analog or digital and may be programmed by the system and/or user.

Figure 22:
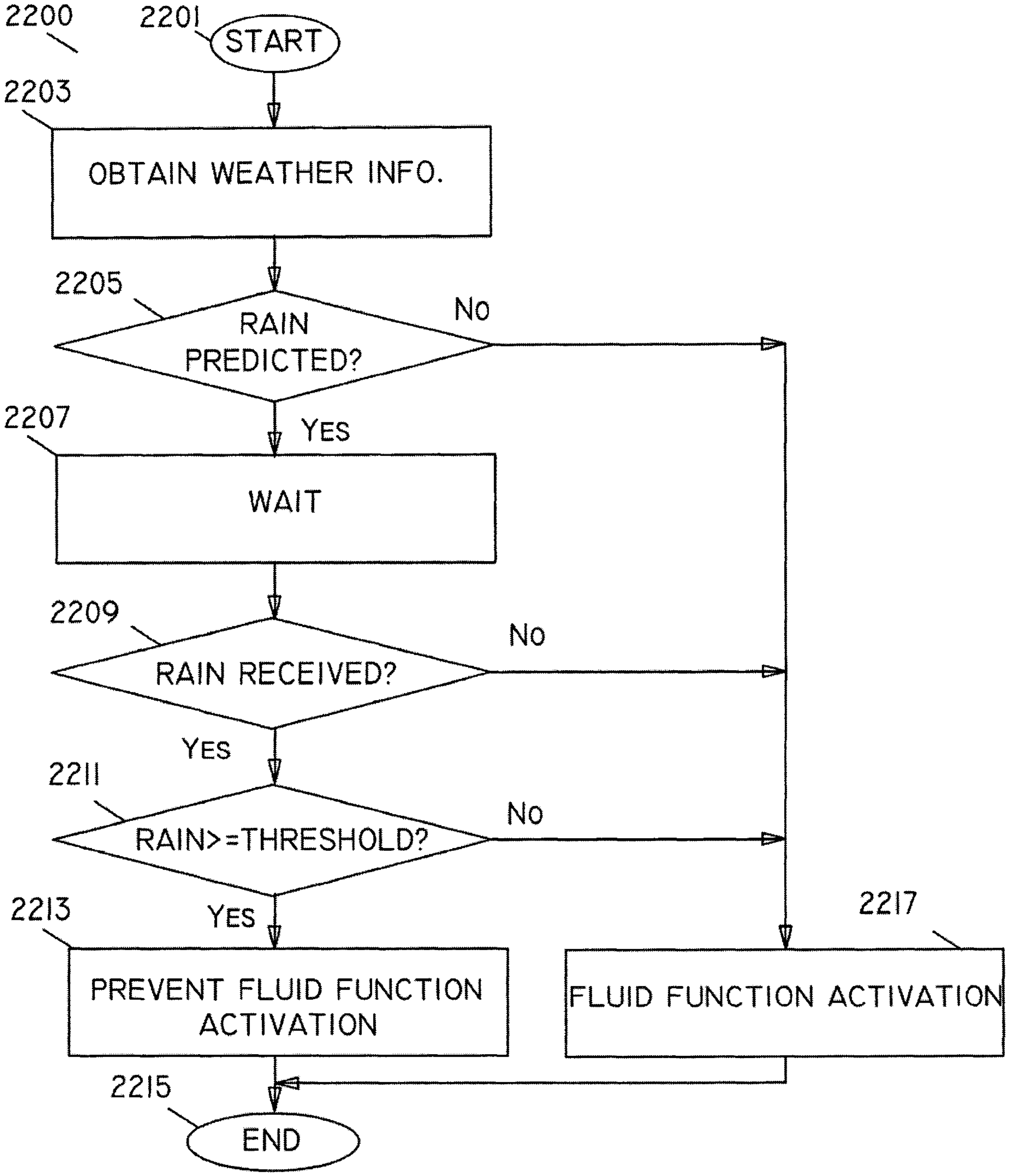
FIG. 22 is a flow diagram that illustrates a process in accordance with an embodiment of the present system.

FIG. 22 is a flow diagram that illustrates a process 2200 in accordance with an embodiment of the present system. The process 2200 may be performed using one or more computers communicating over a network. The process 2200 can include one of more of the following acts and/or may be initiated at the start of a fluid supply operation such as a watering or nutrient supply operation. Further, one or more of these acts may be combined and/or separated into sub-acts, if desired. In operation, the process may start during act 2201 and then proceed to act 2203. In some embodiments, the process 2200 may be performed periodically and/or non-periodically. Further, in some embodiments the process 2200 may be performed when a fluid supply operation (e.g., a watering process is or is about to be initiated). In some embodiments, the process 2200 may interface with and/or control conventional plant watering systems so as to further conserve water. For example, in some embodiments, a controllable valve (e.g., a solenoid controlled valve) may be placed so that it serially coupled to a flow path (e.g., an input or output flow path) of a conventional water timer valve. Then, this controllable valve may be activated by the system to control a flow of the fluids to or from the water timer valve in accordance with one or more processes of the present system.

During act 2203, the process may obtain weather information from one or more resources such as from one or more sensors of the system (e.g., a barometer (e.g., barometric pressure information)) and/or from third party weather information sources (e.g., Accuweather™, the National Oceanic and Atmospheric (NOAA), etc. The weather information may be obtained via a network of the system (e.g., the Internet, etc.). As the system may be centrally controlled, it may obtain weather information for one or more locations (e.g., zones) controlled by the process. Thus, for example, a city (e.g., Anycity, USA) may include a central controller which may control functions of the system (e.g., a fluid supply operation, etc.) in one or more zones which may be locally and/or remotely located relative to each other. However, for the sake of clarity, only operations for a single zone may be discussed unless the context indicates otherwise. The system may obtain weather information from the weather source which may include expected weather (e.g., 90% chance of rain in Anycity during next 4 hours) and/or may determine expected weather using information obtained from one or more sensors of the system (e.g., barometers, satellite information, radar information (e.g., including atmospheric condensation information, etc.), etc.). Thus, for example, the system may obtain radar information (e.g., a radar map of condensation in a certain are) and may predict whether it may rain in a certain zone of Anycity (e.g., in the south west side of the city) within the next hour. However, for the sake of clarity, it will be assumed that the weather information includes predicted weather (e.g., 100% chance of rain Anycity in the next hour) for the current zone. The system may further include rainfall sensors which may detect actual rainfall in one or more locations and provide this information to a controller of the system. Further, the system may filter weather information for one or times or time periods (e.g., currently (current time) to 12:00 pm, current time through the next 2 hours, 12:00 pm to 8:00 pm today, etc.). The one or more times or time periods may be selected by the process (e.g., in accordance with a time table) and/or user settings.

When obtaining weather information from multiple sources (e.g., Accuweather™, NOAA, radar information, satellite information, etc.), the system may further assign weights to these different sources by, for example expected accuracy and/or user settings. Then, the system may filter the weather information in accordance with weights. For example, radar (mapping) information may be assigned a higher weight than satellite cloud cover information. Similarly, weather predictions from the NOAA may be assigned a higher weight than weather predictions from Accuweather™ Thus, the system may use weather predictions (e.g., rain expected between 6:00 through 4:00 pm today) included in the weather information and/or may predict weather information using, for example, the weather information provided to the system such as, for example, radar information. The one or more time periods may be set in accordance with desired watering times (e.g., every morning at 6:00 am) which may be delayed and/or cancelled by operative acts of the present system. After obtaining the weather information, the system may continue act 2205.

During act 2205, the process may determine whether rain is predicted (e.g., for the one or more time or time periods of act 2203 (e.g., next two hours, between 6:00 am and 4:00 pm today, etc.)). Accordingly, if the process determines that rain is predicted, it may continue to act 2207. However, it the process determines that rain is not predicted, it may continue to act 2217. In yet other embodiments, rain predictions must be greater than a threshold value. For example, rain will be considered to be predicted only its chance (e.g., 70% chance of rain) is equal to or greater than a threshold value e.g., 70. Thus, if the predicted chance of rain (e.g., 80% chance of rain) is equal to or greater than the threshold value (70), the process will determine that rain is predicted. However, if the change of rain (e.g., 60%) is determined to be less than the threshold value, the process may determine that rain is not predicted.

During act 2207, the process may control the fluid supply to wait for a threshold time interval. In the present embodiment, the threshold time interval may correspond with the one or more time or time periods of act 2203. Thus, for example if rain is expected between 6:00 am and 4:00 pm today, the process may wait until the threshold time interval has elapsed (e.g., at 4:00 pm in the current embodiment.). However, in yet other embodiments the threshold time interval may be set by the process and/or user (e.g., 30 minutes, 1:00 hours, 2:00 hours, etc.).

This wait may provide time for the expected rainfall to arrive (e.g., pending rainfall between 6:00 am and 4:00 pm today). After the threshold time interval has elapsed, the process may continue to act 2209.

During act 2209, the process may determine whether rain it rained (e.g., rain received). Accordingly, the process may obtain information from sensors of the system (e.g., rain sensors, moisture sensors, etc. within the current zone or zones) and/or weather information (e.g., from a third party source such as Accuweather™ for the current zone or zones) and determine whether it rained. Accordingly, if it is determined that it has rained (rain received), the process may continue to act 2211. However, if it is determined that it has not rained (rain not received), the process may continue to act 2217.

During act 2211, the process may determine whether the rainfall received is greater than or equal to a threshold rainfall value (e.g., 0.25 inches for the current zone). Accordingly, the process may obtain rainfall information indicative of rainfall received from one or more rainfall sensors of the system and/or from the third party sources (e.g., Accuweather™, the NOAA, etc.) as may be selected by the process and/or user. Then, the process may compare the rainfall information with the threshold rainfall value and if it is determined that the rainfall information is greater than or equal to the threshold rainfall value, the process may continue to act 2213. However, if it is determined that the rainfall information is less than the threshold rainfall value, the process may continue to act 2217.

During act 2213, the process may prevent fluid functions (e.g. to cancel a current fluid supply (e.g., watering) cycle). Thus, for example, the process may prevent activation of one or more valves, pumps, pressure regulators, solenoids, etc., which may be operative to supply fluid (e.g., water) to the current zone (e.g., including one or more planting portions). Thus, a current fluid supply operation may be considered to be prevented which may conserve water. After completing act 2213, the process may continue to act 2215 where it ends. In some embodiments, the process may generate an enable signal (EN) equal to a zero to prevent fluid supply functions from being activated.

During act 2217, the process may perform a fluid function activation and may activate on or more fluid supply functions to supply fluid to the current zone. Accordingly, for example, the process may activate one or more valves, pumps, pressure regulators, solenoids, etc., which may be configured to supply fluid to the current zone. In some embodiments, the process may generate an enable signal (EN) equal to a 1 to allow fluid supply functions to be activated. Thus, for example, a fluid supply valve (or relay) in accordance with embodiments of the present system may include an enable (EN) input. If EN is enabled, the fluid supply valve (or relay) may be enabled to be operative to supply fluid(s) to one or more zones of the system. However, if EN is not enabled, the fluid supply valve (or relay) may be disabled and not be operative to supply fluid(s) to one or more zones of the system. After completing act 2217, the process may continue to act 2215 where it ends.

In some embodiments, one or more acts of process 2200 may be repeated for each zone of a plurality of zones. Further, in some embodiments, one or more acts of process 2200 may be repeated for each watering time (e.g. daily at 6:00 am and at 7:00 pm).

Figure 23:
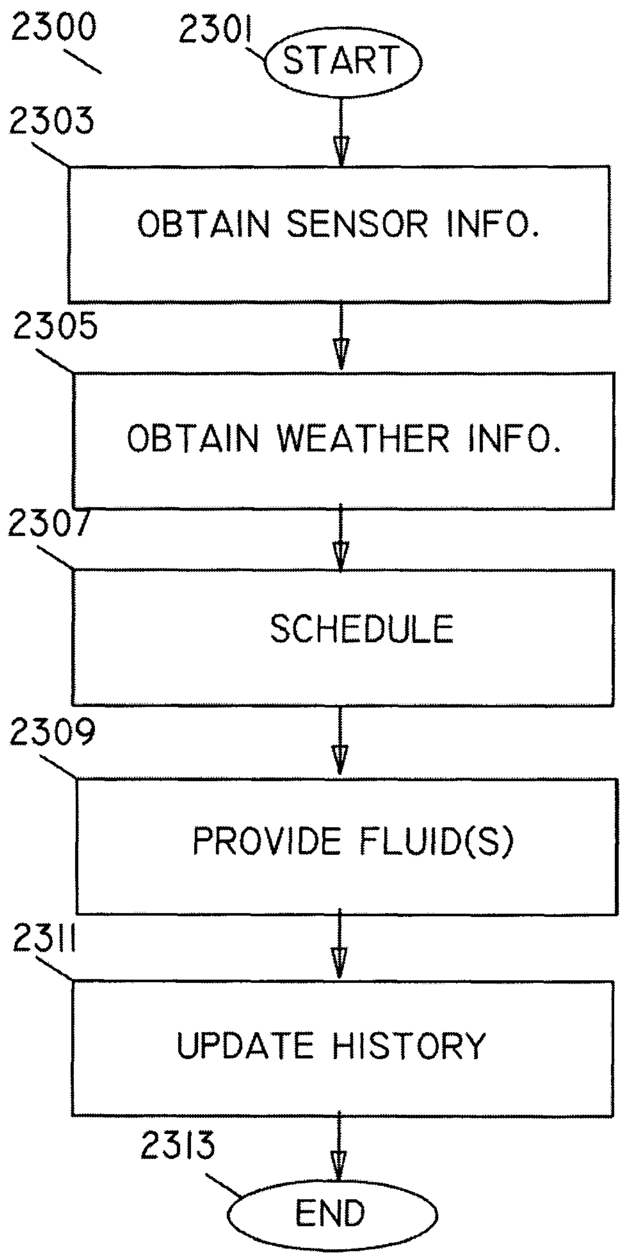
FIG. 23 is a flow diagram that illustrates a process in accordance with an embodiment of the present system.

FIG. 23 is a flow diagram that illustrates a process 2300 in accordance with an embodiment of the present system. The process 2300 may be performed using one or more computers communicating over a network. The process 2300 can include one of more of the following acts and/or may be initiated at the start of a fluid supply operation such as a watering or nutrient supply operation. Further, one or more of these acts may be combined and/or separated into sub-acts, if desired. In operation, the process may start during act 2301 and then proceed to act 2303. In some embodiments, the process 2300 may be performed periodically and/or non-periodically. Further, in some embodiments the process 2300 may be performed when a fluid supply operation (e.g., a watering process is or is about to be initiated). In some embodiments, the process 2300 may interface with and/or control conventional plant watering systems so as to further conserve water. The process may be performed for a plurality of locations. However, for the sake of clarity only a single location (e.g., a single area) including one or more fluid supply zones is discussed.

During act 2303, the process may obtain sensor information from one or more sensors of the system. The sensors may include soil moisture sensors such as one or more electrical resistance type soil moisture sensors (e.g., a Watermark™ Granular Matrix Sensors by Irrometer, Co. Riverside Calif.) which may provide information related to soil moisture and/or matric potentials in a corresponding location such as a current location. The process may then process the sensor information and determine and/or obtain corresponding information such as soil moisture levels, current soil matric potentials, temperature, humidity, dew points, etc., for the current location. Further, the process may average sensor information provided by a plurality of similar sensors (e.g., soil matric potential sensors located at different depths in the current location. After completing act 2303, the process may continue to act 2305.

During act 2305, the process may obtain weather information corresponding with the current location. The weather information may include information related to current and/or future (e.g., expected or predicted) weather information for the current location. The weather information may be obtained from a third-party source (e.g., Accuweather™, the NOAA, etc.) and may include current and predicted weather. However, in some embodiments, the process may obtain sensor information (e.g., barometric sensors, etc.) and predict weather accordingly. After completing act 2305, the process may continue to act 2307.

During act 2307, the process may schedule one or more fluid supply operations (e.g., including irrigation cycles, additive delivery, etc.) in accordance with the sensor information and/or the predicted weather information. For example, assuming a crop or landscape is watered twice a day (e.g., at 6:00 (morning watering cycle) am and at 7:00 pm (afternoon watering cycle)), if the soil matric potential determined during act 2303 is within a threshold range for the crop or landscape (e.g., between 10 and 60 kPA) and if rain is predicted (e.g., expected) between 10:00 and 4:00 pm of the current day, the process may delay or cancel one or more watering cycles (e.g., the morning and afternoon watering cycles) for the day. However, if the soil matric potential exceeds the threshold range (e.g., is determined to be greater than 60 kPA in the current example), the process may schedule a fluid delivery cycle (e.g., to water the plants of the crop or landscape) to deliver fluids as soon as possible. The system may also take into account the likelihood of rainfall (e.g., 60% chance of rain, etc.) and/or time of predicted rainfall and schedule a fluid delivery cycle accordingly. The fluid deliver cycle may further include a nutrient delivery cycle. Accordingly, the process may take into account current temperature (e.g., 80 degrees F., at the current time 6:00 am) and/or expected temperature (e.g., 100 degrees between 12:00 and 8:00 pm) and schedule a corresponding fluid deliver cycle. For example, if the current temperature is less than a nutrient delivery threshold value (e.g., 92 degrees) and the expected temperature is expected to be greater than the nutrient delivery threshold value, the process may schedule a nutrient delivery cycle as soon as possible (e.g., 6:10 am) with minimum nutrients delivered. This may prevent or reduce nutrient burns to the plants which may occur when the actual temperature exceeds the nutrient delivery threshold value. Further, the process may look ahead for one or more days and schedule fluid deliver cycles accordingly. For example, if rain is expected in the afternoon (e.g., between 2:00 and 5:00 pm) during the next 96 hours, the process may reschedule the morning fluid deliver cycle during each of the next 96 hours to deliver a corresponding amount of water (e.g., less water when rain is expected during the day). The process may refer to a table lookup and/or to one or more equations to determine fluid delivery schedules. The fluid deliver schedule may set forth times, duration, flow rates, for one or more fluid types (e.g., water, additives (e.g., nutrients, pesticides, fungicide, bactericides, herbicides, etc.), etc.). For example, irrigation water may be provided daily at 6:00 am for 5 minutes, nutrients (e.g., fertilizer) may be provided with the water at two week intervals, etc. Fluid deliver schedules may vary in accordance with user preferences, plant variety, location, weather, soil type, soil matric information, etc. After completing act 2307, the process may continue to act 2309.

During act 2309, the process may provide one or more fluids in accordance with the fluid schedule. Accordingly, the process may activate one or more pumps, relays, solenoids, valves, pressure regulators, flow regulators, etc., to deliver and/or to provide for the passage of the one or more fluids to one or more fluid delivery conduits (e.g., flow manifolds, laterals, parallels, etc.) of the system to provide (the desired) fluids to the current location. Embodiments of the present system may further interface with conventional fluid delivery system such as overhead watering systems, dripless systems, etc. After completing act 2309, the process may continue to act 2311.

During act 2311, the process may update history information including information related to the one or more fluid deliver schedules (e.g., past, current, future, etc.), weather information, sensor information, and/or information formed by the current process. The process may consult the history information to determine form a fluid deliver schedule. For example, the history information may include information such as information related to a total fluid flow (e.g., 10 cubic meters) for fluid deliver cycle (e.g., a watering cycle). Then, the process may obtain soil matric information both before (e.g., 1 hour before fluid deliver matric potential=20 kPA) and after (e.g., 1 hour after fluid deliver matric potential=66 kPA) the corresponding fluid delivery cycle. Then, by determining a difference in the matric information (66-20 kPA=46 kPA), and dividing the this number by the total fluid flow (e.g., 10 cubic meters), the process may determine a relationship between an increase in soil matric potential per cubic meter water (46 kPA/10 cubic meters=4.6 kPA/cubic meter fluid) for the current location. Then, if it is desired to increase the matric potential of the soil by about 20 kPA, the process may use this relationship to determine an amount of water (e.g., in cubic meters) to deliver to the soil in a future watering process (e.g., 20 kPA*1 cubic meter/4.6 kPA/cubic meter)=(4.34 cubic meters water). Further, the history information may be displayed on a user interface (UI) of the system such as a display for the convenience of the user. After completing act 2311, the process may continue to act 2313 where it ends.

Figure 24:
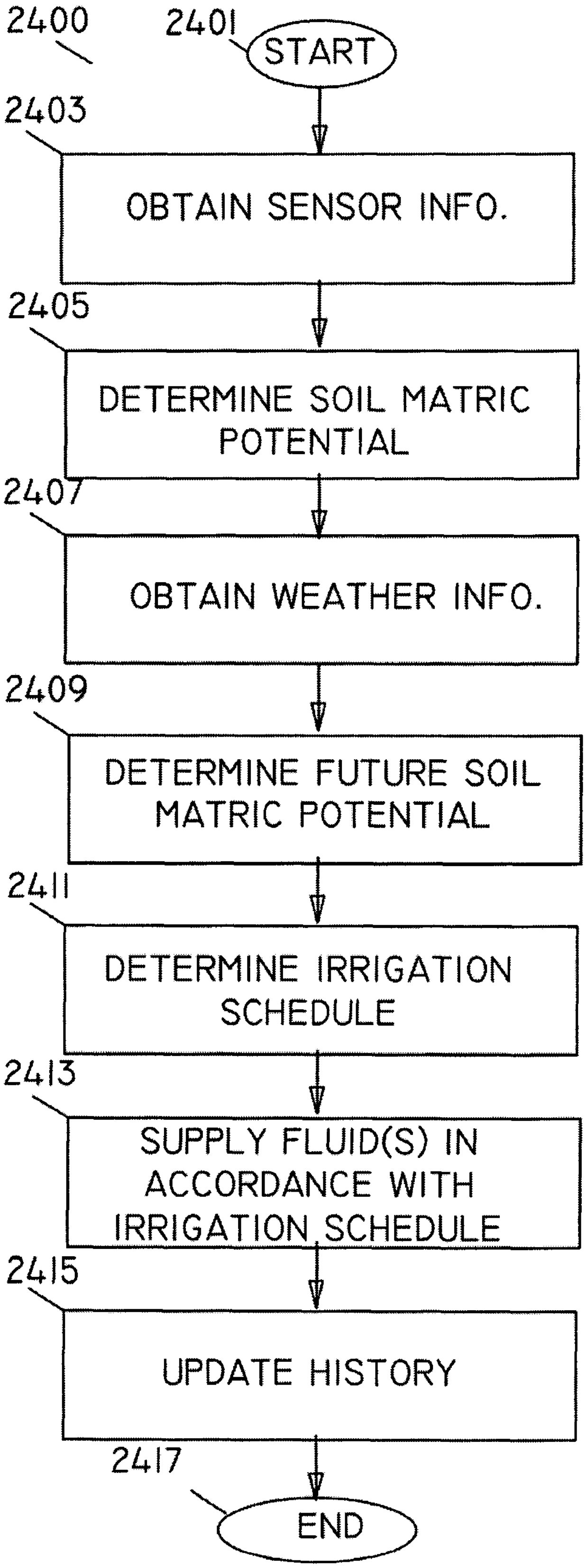
FIG. 24 is a flow diagram that illustrates a process in accordance with an embodiment of the present system.
Figure 29:
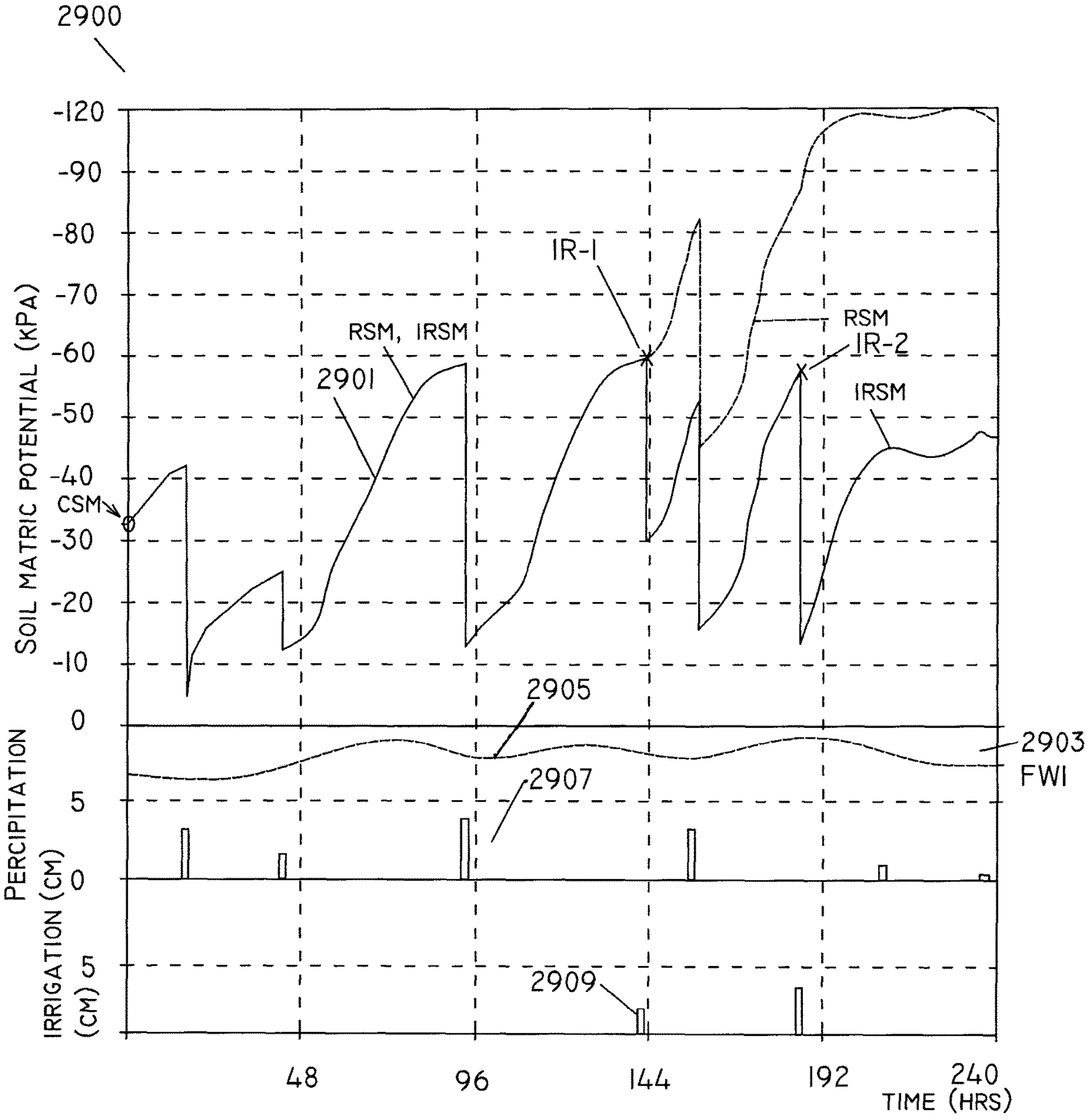
FIG. 29 is a graph illustrating soil matric information as a function of time in accordance with embodiments of the present system.

FIG. 24 is a flow diagram that illustrates a process 2400 in accordance with an embodiment of the present system; and FIG. 29 is a graph 2900 illustrating soil matric information 2901 as a function of time in accordance with embodiments of the present system.

Referring to FIG. 24, the process 2400 may be performed using one or more computers communicating over a network. The process 2400 can include one of more of the following acts and/or may be initiated at the start of a fluid supply operation such as a watering or nutrient supply operation. Further, one or more of these acts may be combined and/or separated into sub-acts, if desired. In some embodiments, the process 2400 may be performed periodically and/or non-periodically. Further, in some embodiments the process 2400 may be performed when a fluid supply operation (e.g., a watering process is or is about to be initiated). In some embodiments, the process 2400 may interface with and/or control conventional plant watering systems so as to further conserve water. The process may be performed for a plurality of locations each location. However, for the sake of clarity only a single location (e.g., a single area) including one or more fluid supply zones is discussed. The acts of process 2400 may be repeated and/or performed for each location. Further, the process 2400 (and/or other processes of embodiments of the present system) may be repeated periodically (e.g., every hour, at certain times each day, etc.) and/or non-periodically (e.g., upon detecting the occurrence of certain conditions occur, etc.). In operation, the process may start during act 2401 and then proceed to act 2403.

During act 2403, the process may obtain sensor information for the corresponding location. This act may be similar to act 2303 and the process may obtain information related to a current (e.g., actual) soil matric potential from one or more sensors in the current location. As this act may be similar to act 2303, a further description thereof will not be provided. After completing act 2403, the process may continue to act 2405.

During act 2405, the process may process the sensor information and determine a corresponding current soil matric potential (e.g., see, CSM as illustrated by "o" in graph 2900) for the present location. In some embodiments, the process may determine an average current soil matric potential based upon sensor information from one or more sensors of the system. However, as act 2405 is generally similar to act 2303, a further description thereof will not be provided. After completing act 2405, the process may continue to act 2407.

During act 2407, the process may obtain future (e.g., expected or predicted) weather information (e.g. a current and/or future weather prediction) (FWI) (e.g., see, 2903, FIG. 29) for the corresponding location. The FWI may be obtained for a desired time period (Td) (e.g., the next 240 hours) using any suitable methods. The FWI may be obtained from using any suitable method such as from a third party source (e.g., Accuweather™, the NOAA, etc.) and/or may be determined in accordance with information obtained from sensors of the system (e.g., barometric sensors, radar sensors, satellite sensors, etc.). The time period (Td) may be set by the system and/or user and/or may be determined based upon accuracy of weather predictions. For example, if it is known that the weather prediction is expected to be 90% accurate for the first 24 hours, 80% accurate up to 240 hours, and only 70% accurate for up to 288 hours, the process may compare the expected accuracy with a prediction threshold accuracy value (e.g., 75% in the present example), and select a time period whose accuracy is greater than or equal to the prediction threshold accuracy value (which may be set by the system and/or user). The Td may be set by the system and/or user. FWI may include information related to future (expected or predicted) weather (e.g., rain tomorrow from 6:00 to 10:00 pm, etc.). Referring to FIG. 29, the FWI 2903 may include temperature information 2905 and/or atmospheric precipitation information 2907. The atmospheric precipitation information may include a bar chart illustrating an amount of atmospheric precipitation obtained in cm. For the sake of clarity, information such as humidity, barometric pressure, etc., is not shown. After completing act 2407, the process may continue to act 2409.

During act 2409, the process may determine (future expected) soil matric potential (SMP) 2901 information for the corresponding time period (e.g., Td) in accordance with the CSM and/or the FWI using any suitable method or methods. For example, the process may use mathematical modeling (e.g., modeling, fitting, digital signal processing, etc.) and/or any other suitable method(s) to determine the SMP information (e.g., see, 2901) based upon one or more of the CSM, the FWI, plant coverage, plant variety (e.g., Tomatoes, etc.), historical information (e.g., previous weather information and/or corresponding soil matric information), soil matric potential determining equations, soil characteristics (e.g., sand, loam, clay, etc.), and/or fluid provided to the system (e.g., ground water, streams, non-adjustable irrigation, dew, etc.). The SMP information 2901 may include raw soil matric potential (RSM) information which may reflect expected soil matric potential absent irrigation provided by the system (e.g., during an irrigation cycle such as first and second irrigation cycles (IR-1 and IR-2, respectively)). Further, the SMP may include irrigation applied soil matric potential (IRSM) information which may reflect the expected soil matric potential in accordance with irrigation (e.g., fluid) applied by the system. For example, the RSM and IRSM information may be similar to each other up to a first irrigation point (IR-1) and may differ afterwards. The history information may include information related to historic atmospheric information (e.g., past weather) and/or corresponding (actual) soil matric information. In some embodiments, the process may perform a fitting application may match current weather conditions to past weather conditions for a certain interval of time and determine an RSM based upon historic soil matric potential information for a similar time period and/or the CSM. Further, the process may include a learning application which may form and/or update modeling or fitting equations used by the modeling and/or fitting application for later use. After completing act 2409, the process may continue to act 2411.

During act 2411, the process may determine an irrigation schedule. The irrigation schedule may be determined using any suitable method and may, for example, be based upon the RSM determined during act 2409 and/or fluid supply rules (FSR) and/or portions thereof. The FSR which may set forth rules for providing irrigation such as irrigation limits and/or ranges (e.g., irrigate when soil matric potential is determined to be between −50 and −60 kPa, however, if rain is expected within 2 hours soil matric potential may exceed −60 kPA for not longer than 2 hours, etc.), irrigation times (6:00-8:00 am and 4:00-6:00 pm), etc. The FSR may further be based upon product yield rules. The FSR may be set in accordance with a determined variety of plant. Thus, the FSR may be formed to increase product yield. The irrigation schedule may set forth irrigation times (e.g., see, IR-1 and IR-2) as marked by "X's" and corresponding irrigation amounts (e.g., fluid supplied by the system illustrated as a bar graph 2909). Referring to graph 2900 it is seen that the process may adjust the irrigation amounts to conserve resources such as water and abide by the irrigation rules. Thus, at IR-2 the process may supply less fluid (e.g., water)

than at the second irrigation time (IR-2). The irrigation rules may be weighted so that certain rules may have more weight than others.

The FSR may be used to determine an irrigation schedule in accordance with the SMP information determined during act 2409. For example, if sufficient rainfall (e.g., more than ½ inch) is predicted to occur within three hours of the predicted soil matric potential increasing below −60 kPa, the system may await the rainfall and schedule a next irrigation cycle to a later time. However, if rainfall (sufficient) is not predicted to occur within three hours of the predicted soil potential from increasing below −60 kPA, the system may schedule a next irrigation cycle to occur as soon as possible. Thus, the system may look ahead and determine an irrigation schedule in accordance with the FSR based upon current soil and/or weather conditions (e.g., soil, temperature, etc.) and/or previous soil conditions (e.g., obtained from history information). Further, the past conditions may be consulted to determine an amount of fluid to supply during an irrigation cycle. For example, sandy soil and clay soil may have different water capacities and/or therefore may require a corresponding amount of fluids to be applied during an irrigation cycle. Thus, the process may delay an irrigation cycle pending expected rainfall. This may conserve resources such as water and may benefit the environment by reducing an amount of nutrients, pesticides, herbicides, fungicide, and/or bactericide applied. The FSR may vary based on upon soil type, crop type, plant type, weather conditions (e.g., temperature, humidity, sunlight, etc.), historical growing conditions, etc., and may be set by the system (e.g., using heuristic data, etc.) and/or user. After completing act 2411, the process may continue to act 2413.

During act 2413, the process may provide fluids in accordance with the irrigation schedule determined during act 2411. Accordingly, the process may activate one or more pumps, relays, solenoids, valves, pressure regulators, flow regulators, etc., to deliver and/or to provide for the passage of the one or more fluids to one or more fluid delivery conduits (e.g., flow manifolds, laterals, parallels, etc.) of the system to provide (the desired) fluids to the current location. Embodiments of the present system may further interface with conventional fluid delivery system such as overhead watering systems, dripless systems, etc. After completing act 2413, the process may continue to act 2415.

During act 2415, the process may update history information including information related to the one or more irrigation cycles, schedules (e.g., past, current, future, etc.), weather information (actual and/or predicted), sensor information, and/or information formed by the current process. After completing act 2415, the process may continue to act 2417 where it ends.

Figure 25:
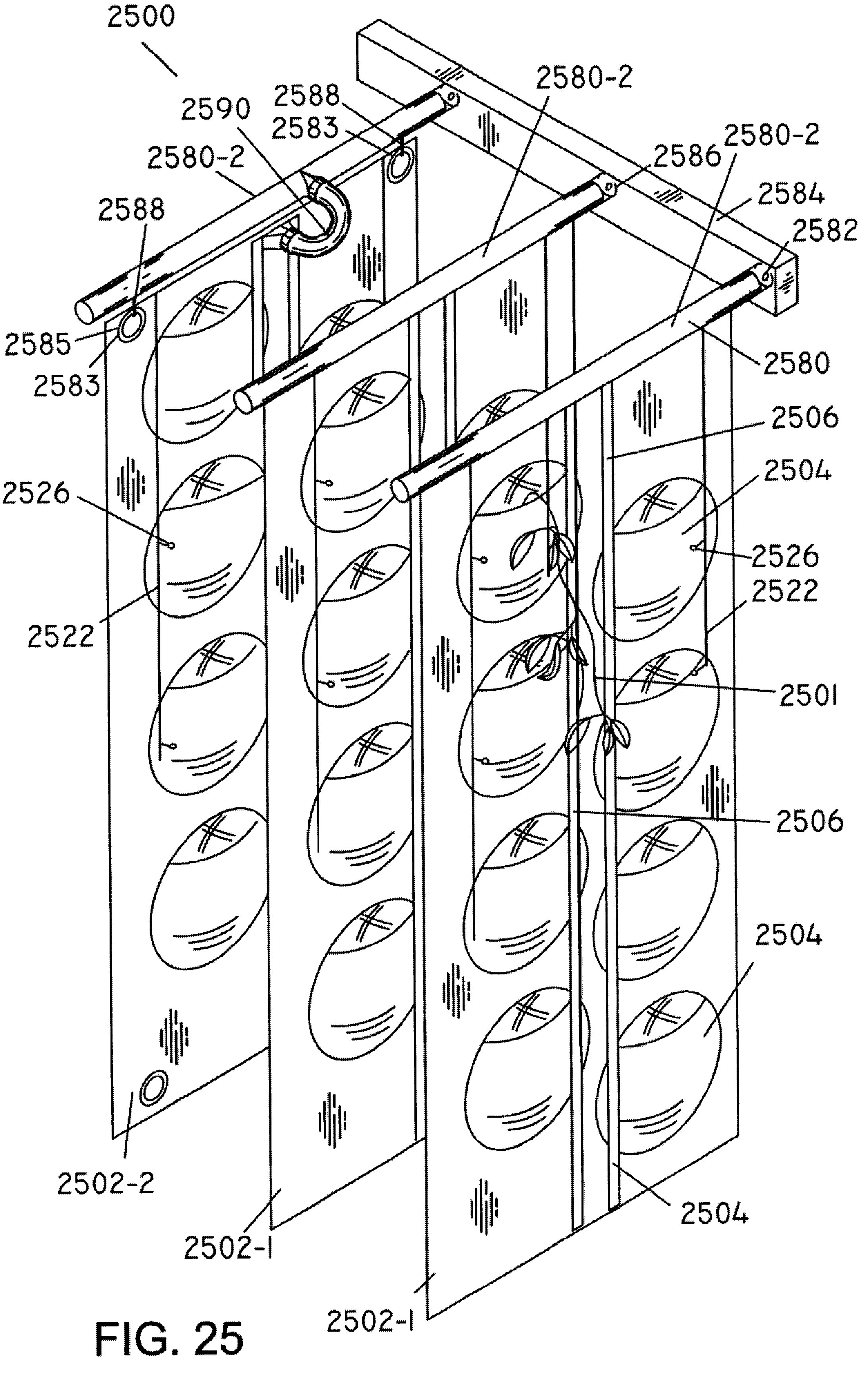
FIG. 25 is a perspective view illustration of a portion of a system in accordance with embodiments of the present system.

FIG. 25 is a perspective view illustration of a portion of a system 2500 in accordance with embodiments of the present system. The system 2500 may include one or more substrates 2502-1, 2502-2. The each substrate 2502-*x* may be similar to the substrate 300 of FIG. 3 and includes one or more of grow portions 2504 and a fluid distribution system 2505. However, the substrates 2502-*x* may include one or more suitable couplers for supporting (e.g., hanging) the corresponding substrates 2502-*x* in a desired position such as vertical, substantially vertical, horizontal, substantially horizontal and/or combinations thereof (e.g., at a 20 degree angle to vertical or horizontal, etc.). This may be desired for priming, germination, and/or growth of seeds/plants (e.g., of a plant 2501 shown for illustration) within corresponding grow portions 2504. When placed in a position other than vertical, a frame may be provided to tension the substrate (e.g., to keep the substrate taught). After desired growth is attained, the substrates 2502-*x* may be relocated to a desired position and/or location for further growth of the seeds/plants. Accordingly, seedlings of the substrates 2502-*x* may be grown in a space conserving and/or controlled environment for the initial growth/germination of seeds/plants and thereafter the substrates 2502-*x* may be located in a desired location (e.g., a crop, a landscape, etc.) for further growth of the seeds and/or plants. However, in yet other embodiments, the substrates may be grown in a vertical position for the duration of germination/growth of the seeds/plants.

With regard to the couplers, they may include any suitable support such as rods, hooks, hook-and-loop fasteners, screws, chains, cables, rope, nylon ties, staples, frames, etc. For example, the couplers may include support rods 2580-1 which may be coupled to corresponding substrates 2502-1 using any suitable coupling method such as friction fits, welds, stitching, adhesives, screws, hook-and-loop fasteners, etc. The support rods 2580-1 may include one or more openings which fluidly couple a fluid supply provided under the control of a controller of the system to one or more flow manifolds 2506 of corresponding substrates 2502-*x*. In some embodiments, the support may include hooks 2588 which may couple to openings 2583 of a corresponding substrate such as substrate 2502-2. Grommets 2585 may be coupled to the substrate 2502-2 to evenly distribute forces to the substrate 2502-2. One or more fluid couplings such as hose 2590 may fluidly couple the one or more openings of the support rods 2580-*x* to the flow manifolds 2506, if desired. Each support rod 2580-2 may be supported by one or more supports such as support 2584. The support 2584 may include one or more openings to fluidly couple the support rods 2580-*x* to the fluid supply provided by the controller of the system. In some embodiments, the support rods 2580-*x* may include a quick-connect-type coupling which may mechanically, fluidly, and/or electronically couple, a corresponding substrate 2502-*x* to the support 2584. Accordingly, the support 2584 may be mechanically, fluidly, and/or electronically coupled to a controller of the system. However, in yet other embodiments, each substrate may include a controller or a portion thereof.

Referring back to the substrates 2502-*x*, each substrate may include one or more sensors 2526 which may provide sensor information (e.g., via a sensor bus 2522) to a controller of the system for further processing. The sensors 2522 may be similar to the sensors 1322 and may provide, for example, information related to, for example, moisture, temperature, etc. of a corresponding grow portion 1304.

The substrates 2502-*x* may be situated in the vertical position for initial germination of seeds and/or growth of plants in the grow portions 2504. Thereafter, the substrates 2502-*x* may be placed in a different orientation and/or location. For example, the substrates 2502-*x* may be placed over a surface to form at least a portion of a landscape, a crop, etc. Thus, in some embodiments, the grow portions 2504 may have major surfaces from which plants and/or roots may exit. However, in yet other embodiments, at least a portion of a major surface of the grow portions 2504 may prevent roots and/or stems from passing. The substrates 2502-*x* may include a protective layer to prevent germinated seeds and/or young plants during handling and/or transportation of the substrates 2502-*x*. The support rods 2580-2 may be removed from the corresponding substrate 2502-*x* when the substrate is relocated (e.g., to a crop, a landscape, a field, a garden, etc.).

The fluid distribution system 2505 of each substrate 2502-*x* may include one or more flow manifolds 2506, flow valves (e.g. coupled to emitters/drippers) in fluid communication with each other and which may provide fluid from the corresponding follow manifold to the corresponding grow portions.

In some embodiments, a frame (e.g., a rigid frame, etc.) may be coupled (e.g., using any suitable method such as hooks, fasteners, etc.) to the substrate and may tension the substrate to hold the substrate in a desired position relative to the frame. A rack system may be provided to receive the frame. For example, a horizontal rack system may receive a plurality of frames each frame including at least one substrate. The substrate may be coupled to the frame using any suitable fastening method such as hooks, loops, hook-and-loop type fasteners (e.g., Velcro™), straps, screws, staples, adhesives. The frame may be formed from a suitable material such as metals, wood, plastics, and/or combinations thereof. However, other types of materials are also envisioned. The frame may include one or more fluid conduits which may couple to a fluid conduit of the substrate and/or the controller of the system. The frame may extend about the outer periphery of the substrate and may be coupled to the substrate at a plurality of locations (e.g. at sides, edges, and corners of the substrate, etc.) using any suitable fastening methods. For example, with respect to the substrate 2502-2, the frame may extend about this substrate and fasten to openings 2583 of the substrate using a hook-and-loop type fastener. During a growing cycle, the substrate may be placed in a horizontal position for an initial growing period (e.g., germination of seeds and initial growth of plants of corresponding grow portions 2504).

Figure 26:
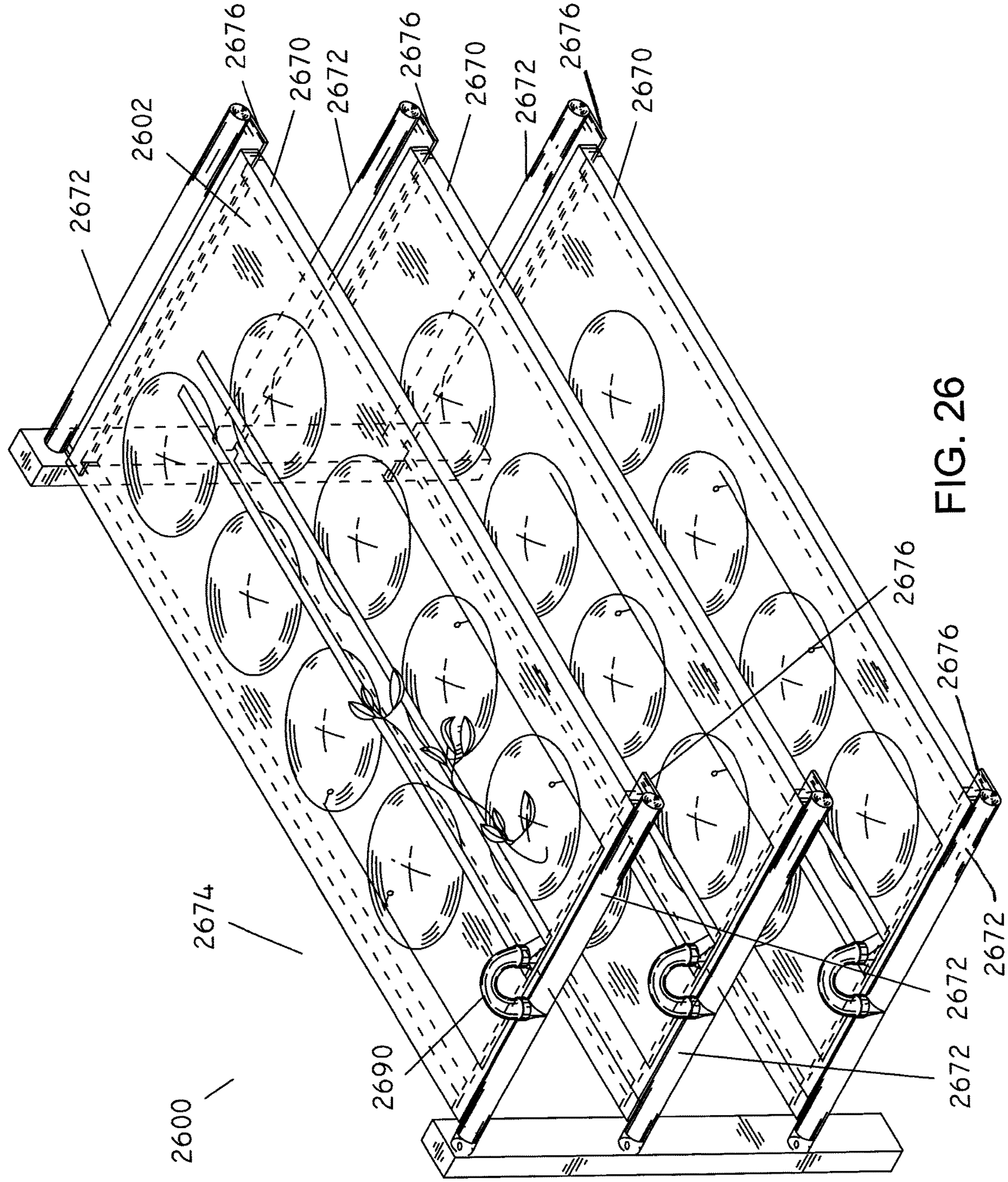
FIG. 26 is a perspective view illustration of a portion of a system in accordance with embodiments of the present system.

FIG. 26 is a perspective view illustration of a portion of a system 2600 in accordance with embodiments of the present system. The system 2600 may include one or more substrates 2602 coupled to a support frame 2670 such as rigid frame made from a suitable material or materials (e.g., a wooden, plastic, foam, metal, fabric, etc.) using any suitable coupling method (e.g., staples, hook-and-loop fasteners, clips, friction fitting, string, cord, stitches, etc.). The support frame 2670 may hold the corresponding substrate 2602 taught during storage, transportation, and/or use. A support rack 2674 may include a plurality of shelves or support brackets 2672 which may receive the substrate 2602. The support bracket 2672 may include a flange 2676, a "U," "C," "L" channels to securely and removable receive the combination of the substrate 2602 and a corresponding frame 2670. However, in yet other embodiments a sliding rail may be provided to receive the frame 2672. The substrates 2602 may be coupled to a fluid channel controlled by a controller of the system using one or more couplers such as hoses 2690. In some uses, seeds and/or plants within a grow portion may be germinated and/or grown, then one or more of the substrates 2602 may be removed from corresponding support bracket 2672. Thereafter, the combination of the frame 2670 and/or substrate 2602 may be related to a desired location. After positioning the substrate 2602 into the desired location, the frame 2670 may be removed (e.g., by removing the fasteners and/or cutting the substrate 2602). Accordingly, gardeners may easily transport and/or position a substrate which may form a part of a landscape, etc. It is farther envisioned that the frame 2670 may be received in a corresponding rack (e.g., of a truck, etc.) for transportation. The frame 2670 may have a continuous outer periphery. However, in yet other embodiments, the frame may be discontinuous. For example, the frame may include first and second rods which may separate from each other and coupled to opposite sides of the substrate. Then, each of first and second users (or a holding mechanism) may hold the ends of the rods apart from each other so as to tension the substrate with a desired substrate.

Figure 27:
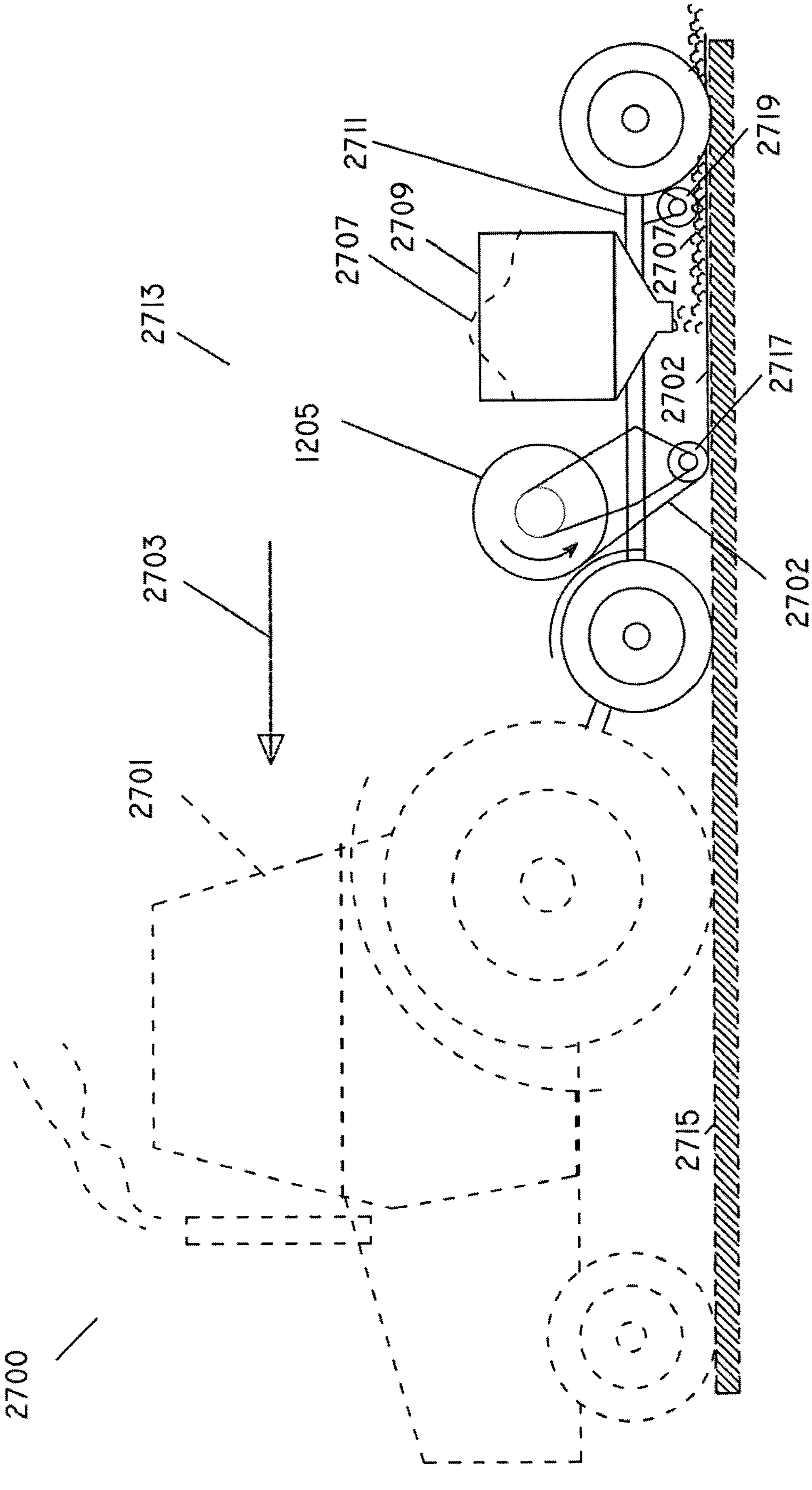
FIG. 27 is a schematic diagram that illustrates a process of laying substrate in accordance with an embodiment of the present system.

FIG. 27 is a schematic diagram that illustrates a process 2700 of laying substrate in accordance with an embodiment of the present system. The process 2700 may be performed using one or more computers communicating over a network which may control one or more functions of a vehicle for laying a substrate 2702 in accordance with embodiments of the present system. The vehicle 2713 may include a tractor pert 2701 and/or a trailer 2711 and may include one or more of substrate 2702 which may be wound about a spool 1205, and a top cover 2707 (e.g., a desired cover such as sand, earth, mulch, peat moss, etc.) stored in a bin 2709. One or more functions of the vehicle 2713 (e.g., steering, hydraulics, braking, power-take-off, spool release, spool tension, fill release, etc.) may be controlled by a controller of the system. The process 2700 can include one of more of the following acts. Further, one or more of these acts may be combined and/or separated into sub-acts, if desired. In accordance with the acts of the process, as the vehicle moves in a direction indicated by arrow 2703, the substrate 2702 may be pulled off of the spool 2705 and may be placed on a base layer 2715. A plate or roller such as roller 2717 may apply a force to flatten the substrate 2702 into the base layer 2715. The top cover 2707 may be released from the bin 2709 (e.g., by a gate (e.g., under the control of the controller) upon the substrate 2702. An other plate or roller 2719 may apply a force upon the top cover 2707 and/or substrate 2702 to compact the top cover 2707 upon the substrate 2702. The plates may include one or more forks or tangs, if desired. The substrate 2702 may include a fluid distribution system which may be coupled to a fluid source controlled by a controller of the system as may be described elsewhere. The substrate 2702 may be similar to substrates such as the substrate 1800. In yet other embodiments, it is envisioned that the substrates may be folded rather than rolled.

Figure 28:
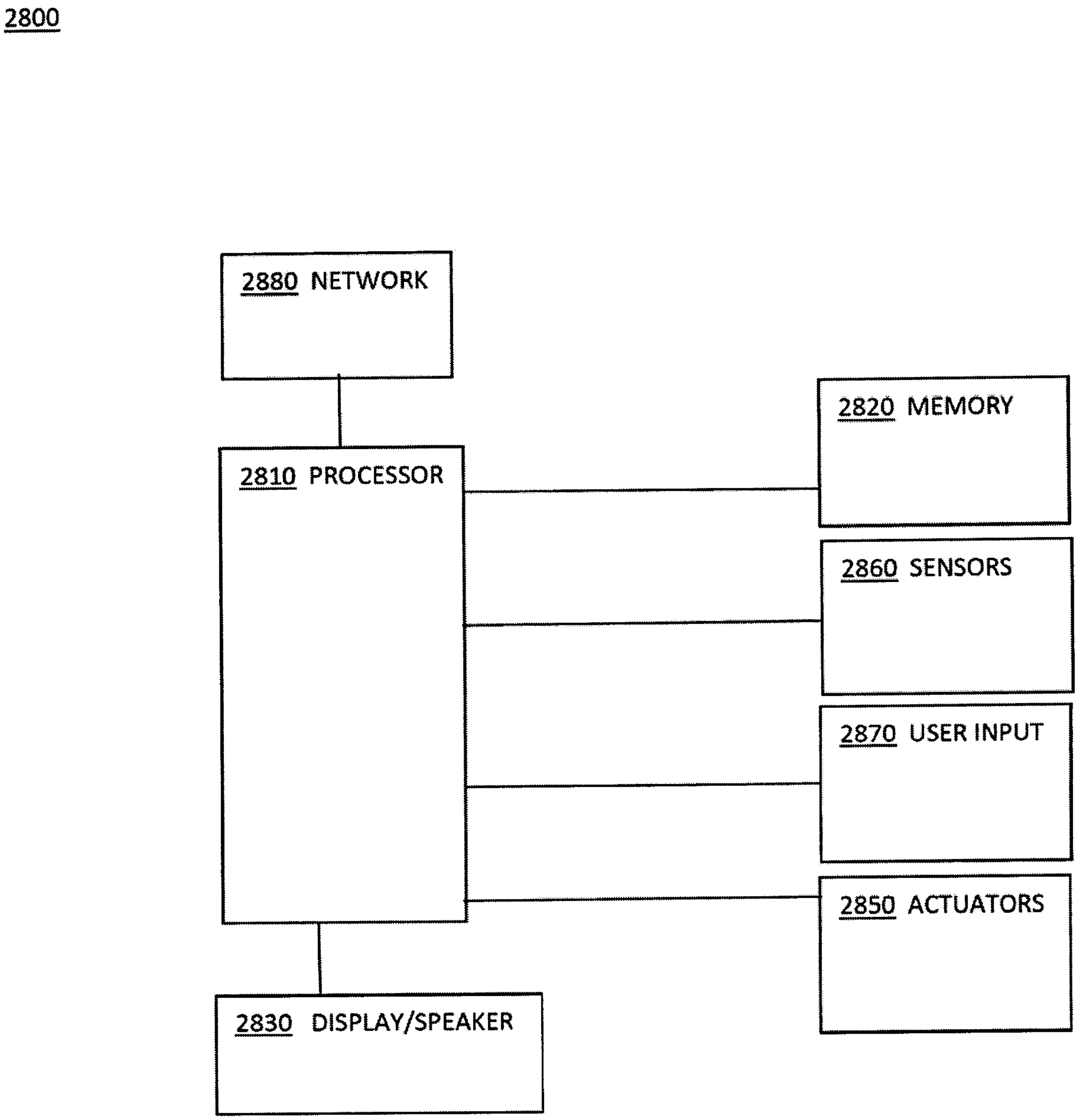
FIG. 28 shows a portion of a system (e.g., peer, server, etc.) in accordance with an embodiment of the present system.

FIG. 28 shows a portion of a system 2800 (e.g., peer, server, etc.) in accordance with an embodiment of the present system. For example, a portion of the present system may include a processor 2810 operationally coupled to a memory 2820, a display (and/or speaker) 2830, a user input device 2870, and one or more actuators 2850. The memory 2820 may be any type of device for storing application data as well as other data related to the described operation. The application data and other data are received by the processor 2810 for configuring (e.g., programming) the processor 2810 to perform operation acts in accordance with the present system. The processor 2810 so configured becomes a special purpose machine particularly suited for performing in accordance with the present system. The sensors 2860 may include location sensors such as global position system (GPS) sensors, triangulation sensors, etc.

The operation acts may include requesting, providing, and/or rendering of information. The user input 2870 may include a keyboard, mouse, trackball, haptic device, a microphone, and/or other device, including touch sensitive displays, which may be stand alone or be a part of a system, such as part of a server, a client, a personal computer, a laptop, a personal digital assistant (PDA), mobile phone (e.g., a smart phone), a tablet (e.g., an IPAD™, etc.), and/or other device for communicating with the processor 2810 via any operable link. The user input device 2870 may be operable for interacting with the processor 2810 including enabling interaction within a UI as described herein. Clearly the processor 2810, the memory 2820, the display 2830, the sensors, the sensors 2860, the actuators 2850, and/or user input device 2870 may all or partly be a portion of a computer system or other device.

The methods of the present system are particularly suited to be carried out by a computer software program, such program containing modules corresponding to one or more of the individual steps or acts described and/or envisioned by the present system. Such program may of course be embodied in a computer-readable medium, such as an integrated chip, a peripheral device or memory, such as the memory 2820 or other memory coupled to the processor 2810.

The program and/or program portions contained in the memory 2820 configure the processor 2810 to implement the methods, operational acts, and functions disclosed herein. The memories may be distributed, for example between the clients and/or servers, or local, and the processor 2810, where additional processors may be provided, may also be distributed or may be singular. The memories may be implemented as electrical, magnetic or optical memory, or any combination of these or other types of storage devices. Moreover, the term "memory" should be construed broadly enough to encompass any information able to be read from or written to an address in an addressable space accessible by the processor 2810. With this definition, information accessible through a network is still within the memory, for instance, because the processor 2810 may retrieve the information from the network for operation in accordance with the present system.

The processor 2810 is operable for providing control signals and/or performing operations in response to input signals from the sensors 2860, the user input device 2870 as well as in response to other devices of a network and executing instructions stored in the memory 2820. The processor 2810 may be an application-specific or general-use integrated circuit(s). Further, the processor 2810 may be a dedicated processor for performing in accordance with the present system or may be a general-purpose processor wherein only one of many functions operates for performing in accordance with the present system. The processor 2810 may operate utilizing a program portion, multiple program segments, or may be a hardware device utilizing a dedicated or multi-purpose integrated circuit. Further variations of the present system would readily occur to a person of ordinary skill in the art and are encompassed by the following claims. The processors 2810 may control the actuators 2850 in accordance operations and/or operative acts of embodiments of the present system. The actuators 2850 may include controllable portions of embodiments of the present system such as pumps, pressure or flow regulators, solenoids, valves, mixers, sensors, etc. For example, the actuators 2850 may include a controllable valve which may provide mains water under the control of the processor 2810. \

Figure 30:
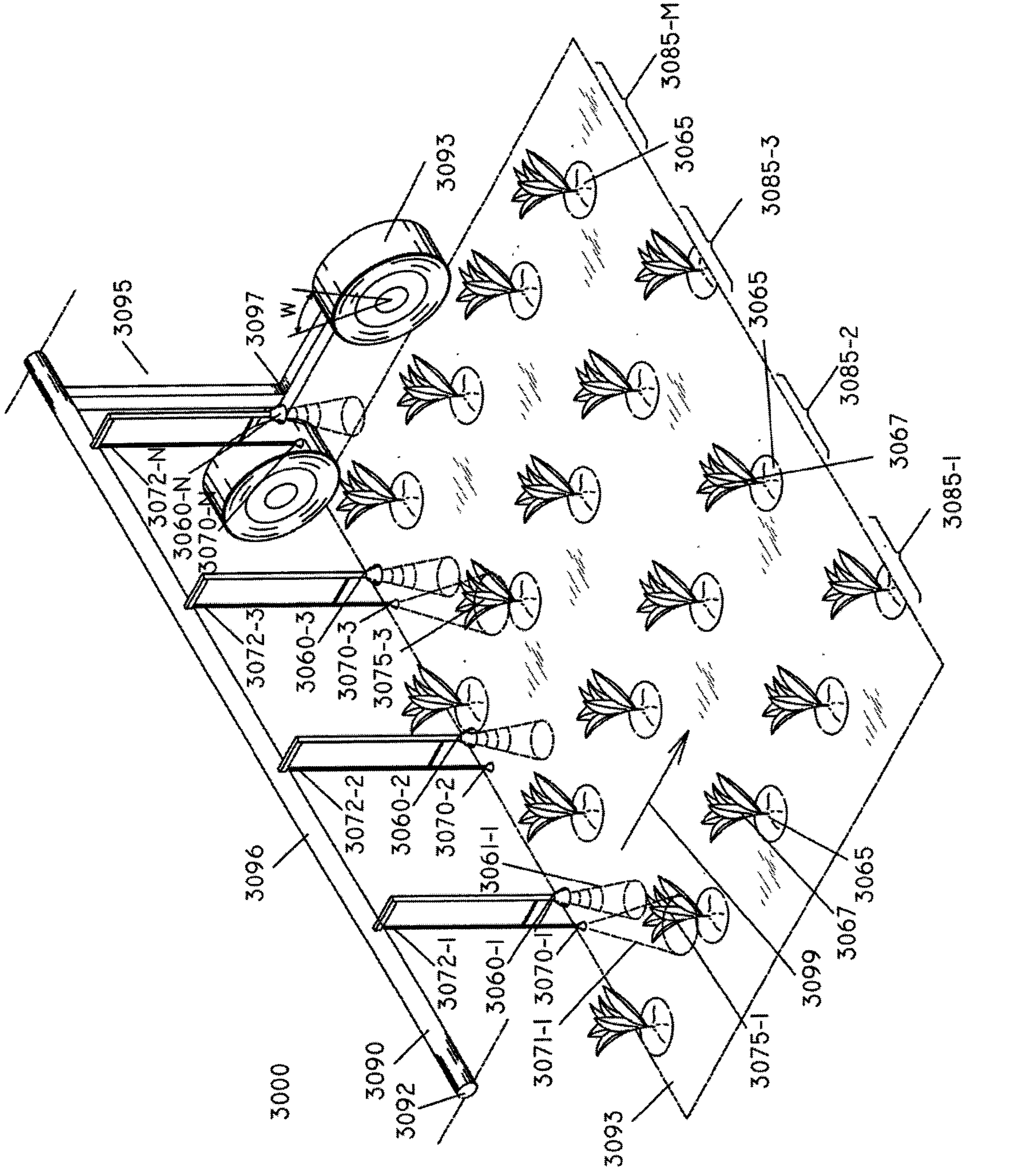
FIG. 30 is a perspective view illustration of a portion of a system in accordance with embodiments of the present system.

FIG. 30 is a perspective view illustration of a portion of a system 3000 in accordance with embodiments of the present system. The system 3000 may include an overhead-type watering system 3090 which may include an at least one overhead portion 3096 having at least one cavity 3092, a plurality of fluid distributors 3070-1 through 3070-N (generally 3070-*x*), a plurality of valves 3072-1 through 3072-N (generally 3072-*x*), and a plurality of proximity sensors 3060-1 through 3060-M. Each of the fluid distributors 3070-*x* may be fluidly coupled to the at least one cavity 3092 via corresponding valves 3072-*x*. Further, the fluid distributors 3070-*x* may be of a drop-type which may extend away from the overhead portion 3096. Further, this extension may be adjustable by a user and/or the system (e.g., in accordance with proximity information). The valves 3072-*x* may be controlled by a controller of the system 3000 so as to selectively control from flow of fluid from the at least one cavity 3092 to a corresponding fluid distributor 3070-*x*. The system 3000 may be configured to operate in accordance with linear and/or fixed point irrigation systems.

A carriage 3095 may include one or more trucks 3097 each including one or more wheels 3093 and may at least partially support the at least one overhead portion 3096. The carriage 3095 may include one or more motive force portions such as motors to provide a motive force to move the at least one carriage 3095. In some embodiments, the carriage 3095 may move in a linear or substantially linear direction as indicated by arrow 3099. The system 3000 may be located in a portion of a field 3093 having a plurality of plant portions 3065 arranged in a desired configuration such as a row type configuration having rows 3085-1 through 3085-M each include a plurality of plant portions 3065. Each plant portion 3065 may include one or more plants 3067. The controller may control the one or more motive force portions such that a location of one or more portions of the system may be controlled. Further, the one or more trucks 3097 may include one or more jack portions (e.g., telescoping portions, etc.) which may be controlled by the controller to control a height and/or orientation of one or more portions of the system such as the overhead portion 3096. A height adjusting mechanism may further be provided to control the height of one or more of the fluid distributors 3070-*x* and/or valves 3072-*x*. The heights may be adjusted in accordance with a detected height (e.g., in accordance with height information) of one or more of the corresponding the plants 3067. However, in some embodiments, the one or more wheels may be located coaxially with the overhead portion 3096.

Each of the proximity sensors 3060-*x* may detect the presence of a corresponding plant 3067 in proximity zone (e.g., 3061-*x*) to the corresponding proximity sensor 3060-*x* and may form corresponding proximity information. The controller may then process the proximity information to determine whether a plant 3065 is located in proximity to the corresponding proximity sensor 3060-*x*. If it is determined that a plant 3065 is located in (detected in) proximity (e.g., less than or equal to a threshold distance) to the corresponding proximity sensor 3060-*x*, the controller may control a valve 3072-*x* open (or remain opened) so as to supply fluid (e.g., from the at least one cavity 3092) to a corresponding fluid distributor 3070-*x*. However, if it is determined that a plant 3065 is not located in proximity (e.g., greater than the threshold distance) to the corresponding proximity sensor 3060-*x*, the controller may control the valve 3072-*x* to close or remain closed so that fluid (e.g., from the at least one cavity 3092) is not supplied to a corresponding fluid distributor 3070-*x*. Thus, the controller may control fluid flow from the fluid distributors 3070-*x* such that fluid is substantially delivered in an area which includes a plant 3065.

The proximity sensors 3060-*x* may include optical, infrared (IR), or other types of proximity sensors which may provide corresponding proximity sensor information to a controller of the system for further processing. For example, in some embodiments the proximity sensors 3060-*x* may include image capturing devices such as cameras (e.g. still and/or video) which may provide proximity sensor information including image information. The image information may then be processed using, for example, image processing methods and/or applications to determine whether a plant 3067 (or planting portion 3065) is located within a certain area such as within a proximity zone 3061-*x* of a corresponding proximity sensor 3060-*x*. The image information may further be processed to determine height information corresponding to a determined height of the plants.

In yet other embodiments, the proximity sensors 3060-*x* may include optical beam type devices which may detect whether the IR beam is broken (e.g., similarly to garage-door-obstruction type sensors) and provide proximity sensor information including an indication of such. Accordingly, if it is determined that the IR beam is broken, the system may determine that a plant 3067 is within a proximity zone 3061-*x* of corresponding sensor 3060-*x*. However, if it is determined that the IR beam is not broken the system may determine that a plant 3067 is not within the proximity zone 3061-*x* of the corresponding sensor 3060-*x*.

In yet further embodiments, the proximity sensors 3060-*x* may include proximity-type sensors such as Microsoft™ Kinect™ sensors or the like which may provide proximity sensor information including proximity information (e.g. location to an object) and/or image information. The proximity sensor information may include distance information. Accordingly, when it is determined that a plant is within a threshold distance (e.g., when a detected distance of the detected plant is determined to be less than or equal to the threshold distance) of a corresponding proximity sensor 3060-*x*, the system may determine that a plant is within a proximity zone 3061-*x* of corresponding sensor 3060-*x*. However, if it is determined that a plant is not within a threshold distance (e.g., when the detected distance of the detected plant is determined to be greater than the threshold distance) of a corresponding proximity sensor 3060-*x*, the system may determine that a plant is not within a proximity zone 3061-*x* of corresponding sensor 3060-*x*. The proximity information may further include height information.

The system may further process image information obtained from cameras of the system (e.g., still, video, etc.) and determine whether a detected object is a registered plant. For example, by using an image processing method, a detected plant may be compared with a registered plant. If the detected plant is determined to be a registered plant (e.g. tomatoes), the system may provide control the corresponding valve 3072-*x* to open and provide fluid. However, if the detected plant is determined not to be a registered plant, the system may control a corresponding valve 3072-*x* to close so as not to supply fluid to the plant. This operation may control growth of undesired varieties of plant such as invasive species, weeds, plants from previous growth periods, etc.

One or more location sensors may provide information indicative of a location of at least a portion of the overhead-type watering system 3090. In some embodiments the one or more sensors may include GPS sensors, triangulation sensors, optical sensors, orientation sensors, etc. which may provide corresponding sensor information to the controller. For example, in some embodiments, the one or more sensors may include rotation sensors which may sense an angular rotation (W) of the one or more wheels 3093 and provide corresponding rotation information to the controller. The controller may then determine location and/or velocity information indicative of a location and/or velocity, respectively, of at least one or more portions of the overhead-type watering system 3090 in accordance with the sensor information, if desired. The controller may then control a duration of an on cycle and/or an off cycle of a corresponding valve 3072-*x* in accordance with the determined velocity and/or location information. The controller may be coupled to the sensors and/or valves 3072-*x* using wired and/or wireless communication methods. Further, the controller may control one or more pumps, regulators, solenoids, valves, etc. of the system so that the fluid at one or more locations of the system such as at the fluid distributors 3070-*x* and/or the at least one cavity 3092 has a desired velocity, flow rate, pressure, etc. as may be set forth in one or more processes of the present system.

In some embodiments each proximity sensor 3060-*x* may control a plurality (e.g., a group) of fluid distributors 3070-*x* and/or corresponding valves 3072-*x*. It is further envisioned that one or more of the proximity sensors 3060-*x*, the of fluid distributors 3070-*x*, and/or corresponding valves 3072-*x* local and/or remote from each other and/or may be formed integrally with one another.

It is further envisioned that the controller may control a fluid distribution pattern (e.g., 3071-*x*) of a corresponding fluid distributor 3070-*x*. The fluid distributors 3070-*x* may further include oscillation type distributors, sprinklers, sprayers, etc. Further, the sensors may include wind speed sensors which may provide corresponding information to the controller. The controller may then activate valves 3072-*x* and/or fluid distributors 3070-*x* accordingly, so that a fluid flow is corrected for wind and fluid is provided to a desired location.

Figure 31:
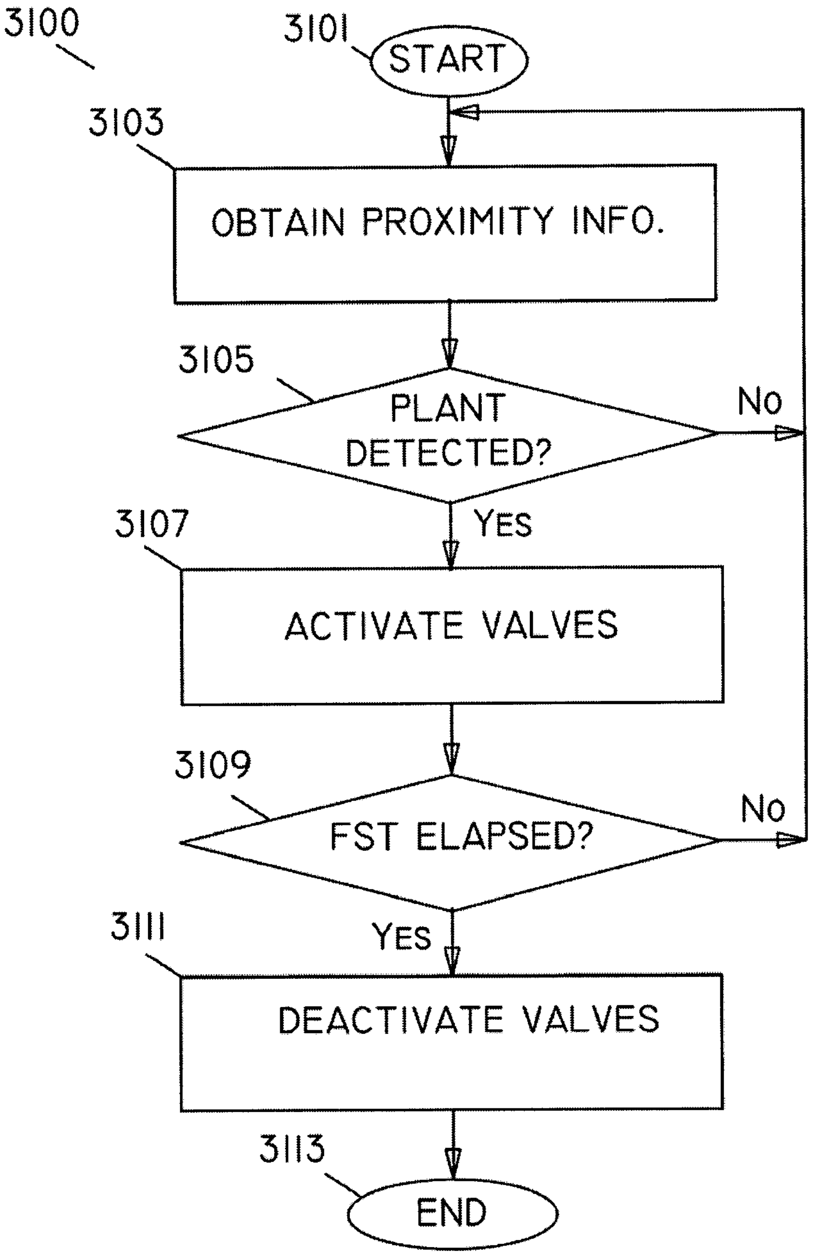
FIG. 31 is a flow diagram that illustrates a process in accordance with an embodiment of the present system.

FIG. 31 is a flow diagram that illustrates a process 3100 in accordance with an embodiment of the present system. The process 3100 may be performed using one or more computers communicating over a network. The process 3100 can include one of more of the following acts and/or may be initiated at the start of a fluid supply operation such as a watering or nutrient supply operation. Further, one or more of these acts may be combined and/or separated into sub-acts, if desired. In operation, the process may start during act 3101 and then proceed to act 3103. In some embodiments, the process 3100 may be performed periodically and/or non-periodically. Further, in some embodiments the process 3100 may be performed during a fluid supply operation (e.g., a watering process) is performed using embodiments of the present system such as the system 3000. In some embodiments, the process 3100 may interface with and/or control conventional plant watering systems so as to further conserve water. For the sake of clarity, only a single valve and/or corresponding proximity sensor may be discussed unless the context indicates otherwise. However, the process may be repeated for each valve and/or corresponding proximity sensor.

During act 3103, the process may obtain sensor information such as proximity sensor information from one or more proximity sensors of the system (e.g., proximity sensors 3060-*x*). The process may then process the sensor information to determine a location of one or more plants. After completing act 3103, the process may continue to act 3105.

During act 3105, the process may determine whether a plant is detected. Methods for detecting plants are discussed above. Accordingly, if a plant is detected, the process may continue to act 3107. However, if a plant is not detected, the process may repeat act 3103. It will be assumed that during the process 3100 an overhead type watering system is in motion (e.g., rotational or linear motion) so as to change position and/or orientation relative to a given object such as a field having a plurality of plants. After completing act 3105, the process may continue to act 3107.

During act 3107, the process may control one or more one or more valves to supply fluid (e.g., water, additives, etc.) to one or more corresponding fluid distributors (e.g., 3070-*x*) so as to supply fluid to the detected plant(s). Accordingly, the process may activate one or more valves to supply the desired fluid. Further, the process may control pressure, flow rate, and/or additive mix of the fluid being supplied, if desired.

Further, the process may set a fluid supply time (FST) to a default FST. The default FST time may be set by the user and/or system to a desired duration (e.g., 2:00 minutes, etc.). However, in yet other embodiments, the process may set the default FST in accordance with one or more of for example, ambient conditions, soil conditions, etc. For example, the FST may be based, at least in part upon one or more of ambient humidity, ambient temperature, soil temperature, soil matrics, available fluid (water) pressure, soil pH, and/or speed of the overhead type watering system 3090. For example, if the matric potential of a corresponding location is more negative (indicating dryer soil), the process may increase the default FST. Similarly, during dry and/or hot weather, the process may increase the default FST to accommodate for evaporation of fluids. After completing act 3107, the process may continue to act 3109.

During act 3109, the process may determine whether the FST has elapsed. Accordingly, if it is determined that the FST has elapsed, the process may continue to act 3111. However, if it is determined that the FST has not elapsed, the process may repeat act 3103.

During act 3111, the process may deactivate the one or more valves which were activated during act 3107 so as to stop or substantially stop the flow of fluid through the valves and/or to the fluid distributors. After completing act 3111, the process may continue to act 3113, where it ends. The process 3100 may be constantly repeated to water, for example, a crop.

Figure 32:
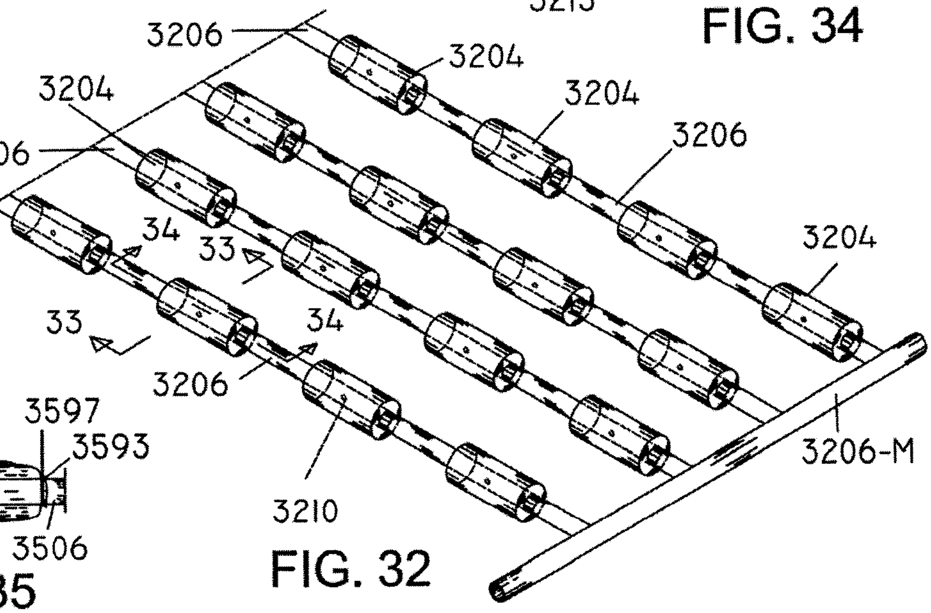
FIG. 32 is a perspective view illustration of a portion of a system in accordance with embodiments of the present system.

FIG. 32 is a perspective view illustration of a portion of a system 3200 in accordance with embodiments of the present system.

Figure 33:
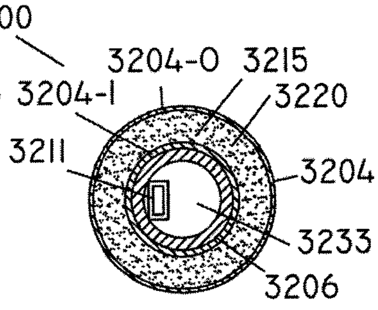
FIG. 33 is a cross-sectional view illustration of a portion of the system taken along lines 33-33 of FIG. 32 in accordance with embodiments of the present system.

FIG. 33 is a cross-sectional view illustration of a portion of the system 3200 taken along lines 33-33 of FIG. 32 in accordance with embodiments of the present system.

Figure 34B:
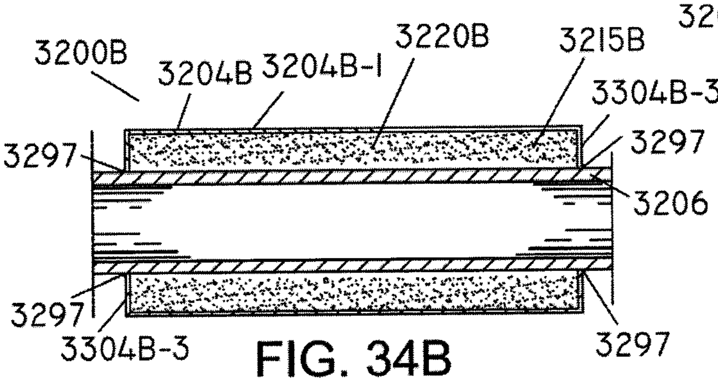
FIG. 34B is a cross-sectional view illustration of the system in accordance with embodiments of the present system.
Figure 34:
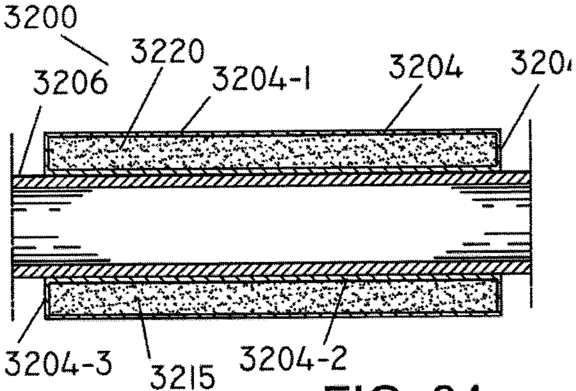
FIG. 34 is a cross-sectional view illustration of a portion of the system taken along lines 34-34 of FIG. 32 in accordance with embodiments of the present system.

FIG. 34 is a cross-sectional view illustration of a portion of the system 3300 taken along lines 34-34 of FIG. 32 in accordance with embodiments of the present system.

With reference to FIGS. 32 through 35, the system 3200 may include at least one flow manifold 3206 and least one grow portion 3204. However, for the sake of clarity only a single flow manifold 3206 and/or grow portion 3204 may be discussed unless the context indicates otherwise. The flow manifold 3206 include an outer wall which may define a cavity 3220 for receiving a fluid and one or more drippers and/or emitters 3211 which may be located within the cavity and/or externally of the outer wall of the flow manifold 3206. A plurality of the flow manifolds 3206 may be coupled to each other and/or to a manifold 3206-M so as to receive a fluid flow under the control of a controller. The plurality of flow manifolds 3206 may be configured in any desired configuration such as in a row configuration, etc. The configuration may be in accord with a desired landscape configuration such as a radial configuration, etc. Further, in yet other embodiments, it is envisioned that the flow manifolds may be curved, linear, etc., and may extend in various directions. For example, it is envisioned that either or both ends of the flow manifolds 3206 may be coupled to each other and/or to an other manifold which may be similar to manifold 3206M.

In yet other embodiments, it is envisioned that a configuration of flow manifolds 3206 may extend radially away from, and/or be coupled to, a manifold substantially located in a center of the configuration. A controller may control flow of one or more fluids to one or more of the manifolds 3206. The flow manifolds 3206 may include any suitable type of coupling such as a threaded coupling, a quick connect type coupling, etc. The flow manifolds 3206 may include openings through which liquid contained within may exit into a corresponding grow portion 3204. Accordingly, the location of the openings (e.g., a distance between the openings) may be set to correspond with desired locations of corresponding grow portions 3204. In some embodiments, it is envisioned that the grow portions 3204 may be inserted and/or replaced as a cartridge unit 3204-C. Accordingly, the grow portions 3204 and/or flow manifolds 3206 may be configured to provide for the removal and/or insertion of the grow portions 3204. A user may then slide one or more cartridge units 3204-C over a desired flow manifold 3206 (e.g., such as a Netafim™ dripperline). Various landscapes may be formed using cartridge units 3402-C with the same or different seed and/or plant varieties.

Each grow portion 3204 may have a center opening 3233 through which at least a portion of a corresponding flow manifold 3206 may pass. The grow portion 3204 may include an inner cavity 3220 defined by one or more walls such as an outer wall 3204-1, an inner wall 3204-2, and end walls 3204-3, one or more of which may be formed integrally with, or separately from, each other. Further, one or more of the walls 3204-1, 3204-2, and/or 3204-3 (generally 3204-*x*), may be continuous or discontinuous in one or more locations. A filler 3215 may be similar to fillers discussed elsewhere in this application and may be located within a corresponding cavity and may include one or more seeds and/or plants. One or more of the walls 3204-*x* may include one or more weakened areas through which at least a portion of a plant contained within may pass. A distance between grow portions 3206 may be set as desired and, in some embodiments, it is envisioned that adjacent grow portions 3206 may touch each other. Further, one or more grow portions 3206 may include the same or different varieties of plants or seeds, if desired. The grow portions 3204 may be coupled to a corresponding flow manifolds 3206 using any suitable method (e.g., friction, bonding, adhesives, threaded, latches, pins, rivets, a snap lock, zip ties, etc.). The walls 3204-*x* may have any desired shape, angular relationship, may be flexible, may be semi-rigid, and/or may be rigid, as desired. In some embodiments, the filler 3220 may be flexible, rigid, and/or semi-rigid. Thus, when rigid or semi-rigid, the filler 3220 may support one or more of the walls 3204-*x*.

Figure 33B:
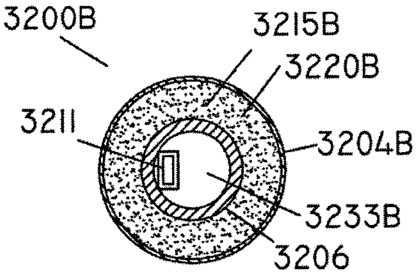
FIG. 33B is a cross-sectional view illustration of a portion of a system in accordance with embodiments of the present system.

FIG. 33B is a cross-sectional view illustration of a portion of a system 3200B in accordance with embodiments of the present system. FIG. 34B is a cross-sectional view illustration of the system 3200B in accordance with embodiments of the present system. FIGS. 33B and 34B are essentially taken along similar respective cross-sections as the cross-sectional views of FIGS. 33 and 34. The system 3200B is similar to the system 3200 and may include one or more flow manifolds 3206 and grow portions 3204B. However, the grow portion 3204B may have an inner cavity 3220B having an inner diameter or wall defined, at least in part, by the flow manifold 3206. Thus, the inner cavity 3220B may be defined at least in part, by one or more of walls 3404B-1, end walls 3304B-3 (generally 3304B-x), at least a portion of the flow manifold 3206. The end walls 3204B-3 may have openings 3233B which may be sealed to the flow manifold 3206 using any suitable method such a friction fits, adhesives 3297, threaded fasteners, zip ties, threads, etc. These seals may be configured to prevent the filler 3215B from leaking from the inner cavity 3220B. However, the filler 3215B may be formed from a rigid or semi-rigid material (e.g., similar to a pelletized filler) to prevent leakage from the cavity 3220B and/or hold the walls 3304B-x in a desired shape and/or position. For example, in some embodiments, an inner diameter of the filler 3220B may have an inside diameter which is substantially similar to the outside diameter of the flow manifold 3206B so as to form a fiction fit. During use, the walls 3304B-x and/or the filler 3220B may weaken and/or compost.

Figure 35:
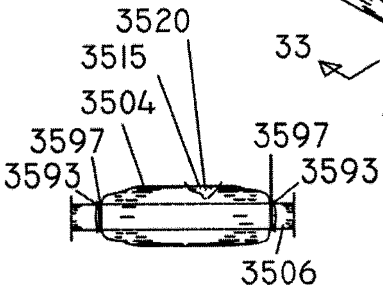
FIG. 35 is a partially cutaway side view illustration of a portion of a system in accordance with embodiments of the present system.

FIG. 35 is a partially cutaway side view illustration of a portion of a system 3500 in accordance with embodiments of the present system. The system 3500 may be similar to the systems 3200 and/or 3200B and includes one or more grow portions 3504 situated about a corresponding flow manifold 3506 of a plurality of flow manifolds 3506. However, the grow portion 3500 may include at least one outer wall 3405-1 formed from a tubular material (e.g., similar to a hosiery material) which defines at least part of an inner cavity 3520 situated at between ends 3593. A suitable sealing method such as zip ties 3597 may seal the inner cavity 3520 to the flow manifold 3506. A filler 3515 may be located, at least in part, within the inner cavity 3520.

Figure 36:
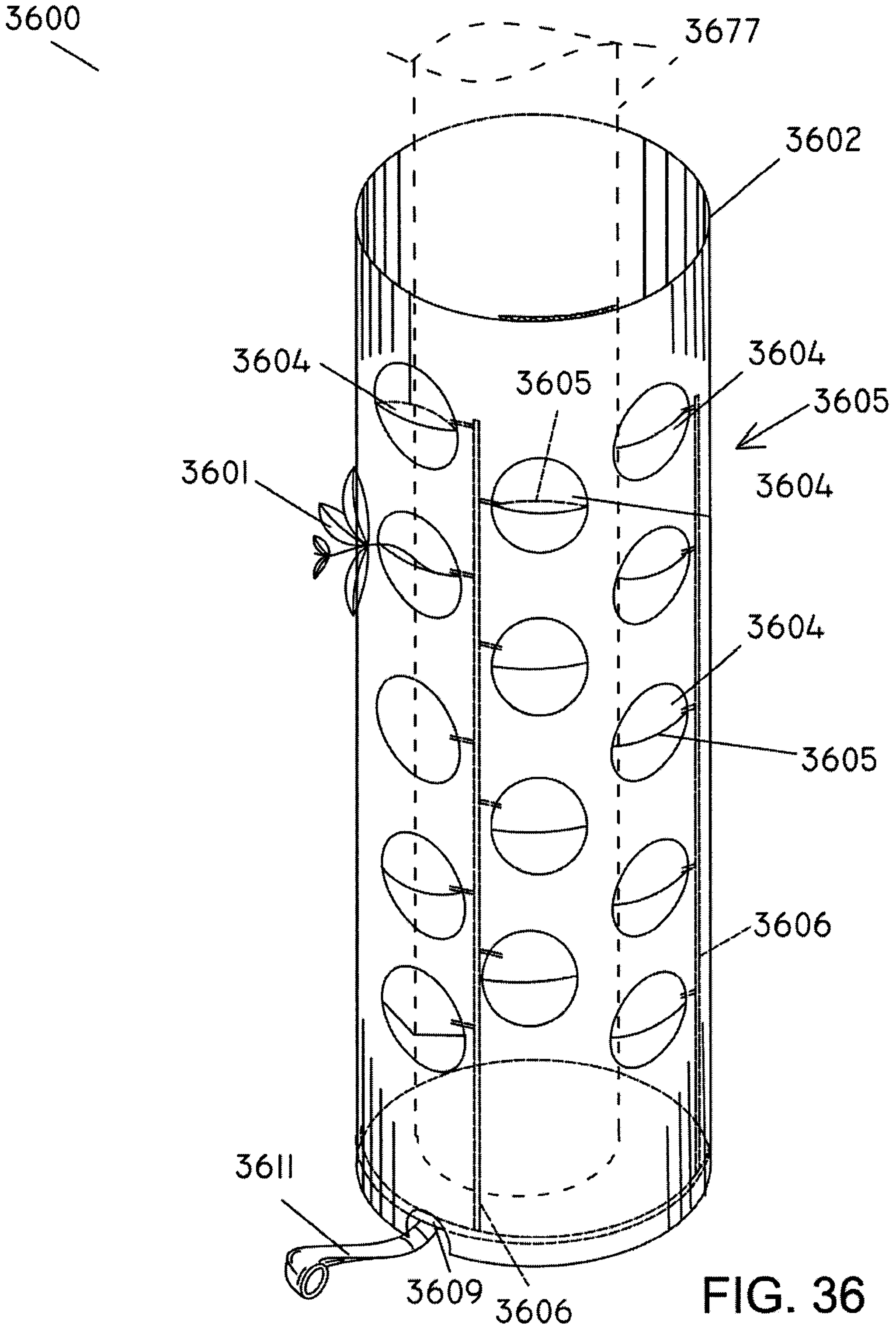
FIG. 36 is a perspective view illustration of a portion of a system in accordance with embodiments of the present system.

FIG. 36 is a partially cutaway side view illustration of a portion of a system 3600 in accordance with embodiments of the present system. The system 3600 may be similar to the system 100 of FIG. 1 and includes one or more of a substrate 3602, one or more grow portions 3604, and a fluid distribution system 3605. However, the system 3600 may be folded or rolled so as to form a cylinder, a cone, or other desired shape. The substrate 3600 may be formed from a rigid or semi-rigid material so as to be self-supporting when formed into the desired shape such as the cylinder of FIG. 3600. Accordingly, for example, the substrate 3602 may be formed from a material such as a corrugated plastic. The one or more grow portions 3604 may include one or more supports such as support portions 3605, if desired. Further, the one or more grow portions 3604 may be shaped as desired. In the present embodiments the substrate 3602 may be freestanding and, if desired, may be placed about a desired object such as a pole or other freestanding object (e.g., a utility pole 3677, a banister, a garbage can, a barrel, a lamp post, a hydrant, an ornament, etc.) and may include one or more access openings. The access openings may provide access to the freestanding object (e.g., a hydrant). The substrate 3602 may be secured to itself using any suitable method such as notches, pins, clips, screws, rivets, adhesives, tapes, glues, cords, hook-and-loop fasteners, zip ties (e.g., nylon zip ties), friction fits, etc. For example, in some embodiments, double-sided adhesive tape may be situated between overlapping portions of the substrate 3606. In some embodiments, the substrate 3606 may be rolled into a semi-circle such as a "C" The substrate 3606 may be transported flat and may then be rolled on site. In yet other embodiments, the substrate 3606 may hang using any suitable hanger such as cable, rope, etc. Thus, for example, the substrate 3606 may hang from a utility pole, if desired.

The fluid distribution system 3605 may distribute water to one or more of the grow portions 3604 and may include one or more of a distribution manifold 3609, one or more flow manifolds, 3606, and an input 3611. The input 3611 may receive fluid from a source controlled by a controller of the system. The one or more flow manifolds 3606 may be formed, at least in part, integrally with the substrate 3602 if desired. For example, the one or more flow manifolds 3606 may be formed, at least in part, within conjugations channels of the substrate 3606, if desired. However, in yet other embodiment the flow manifolds may include any suitable conduit. The flow manifolds 3606 may be coupled to the input 3611 directly or via the distribution manifold 3609, as desired. However, in yet other embodiments, it is envisioned that the flow manifolds 3606 may be fluidly coupled to the source directly. The grow portions 3606 may include a wicking material to absorb fluids from the fluid distribution system 3605, if desired.

The grow portions 3606 may include a cavity in which a filler may be located. An outer periphery of the grow portion may include one or more openings and/or weakened areas such as weakened area through which portions of a plant 3601 situated within a corresponding grow portion 3606 may extend.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that: a) the word "comprising" does not exclude the presence of other elements or acts than those listed in a given claim; b) the word "a" or "an" preceding an element does not exclude the presence of a plurality of such elements; c) any reference signs in the claims do not limit their scope; d) several "means" may be represented by the same item or hardware or software implemented structure or function; e) any of the disclosed elements may be comprised of hardware portions (e.g., including discrete and integrated electronic circuitry), software portions (e.g., computer programming), and any combination thereof; f) hardware portions may be comprised of one or both of analog and digital portions; g) any of the disclosed devices or portions thereof may be combined together or separated into further portions unless specifically stated otherwise; h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A mobile watering device, comprising:
- a body configured to move over an area of land including a plurality of plants;
- at least one sensor coupled to the body and configured to form sensor information; and
- at least one fluid distributor coupled to the body and configured to emit a fluid therefrom; and
- at least one processor configured to:
  - obtain the sensor information,
  - determine whether a plant is detected based upon an analysis of the sensor information, and
  - control a flow of fluid to the at least one fluid distributor based upon the determination to supply fluid to an area substantially including the plant when it is determined that a plant is detected and not supply fluid when it is determined that a plant is not detected.

2. The device of claim 1, wherein the at least one sensor comprises at least one of an image sensor, a height sensor, and a proximity sensor.

3. The device of claim 1, wherein the sensor information further comprises at least one of image information, distance information, wind speed, and height information; and the at least one processor is further configured to detect an object in accordance with the sensor information.

4. The device of claim 1, wherein the at least one processor is further configured to analyze the sensor information to detect an object.

5. The device of claim 4, wherein the at least one processor is further configured determine whether the detected object is a registered plant.

6. The device of claim 5, wherein the at least one processor is configured to employ an image processing method to determine whether the detected object is a registered plant.

7. The device of claim 1, wherein the at least one processor is further configured to determine location and/or velocity information indicative of a location and/or velocity, respectively, of at least a portion of the mobile watering device.

8. The device of claim 1, wherein the at least one at least one fluid distributor comprises a plurality of overhead fluid distributors situated over the area of land.

9. A mobile watering device, comprising:

a body configured to move over an area of land including a plurality of plants;

at least one fluid distributor coupled to the body;

a fluid control portion coupled to the body and configured to control a flow of a fluid to be emitted from the at least one fluid distributor;

at least one sensor coupled to the body and configured to form sensor information comprising at least image and object presence information; and at least one processor configured to: obtain the image information, determine whether a detected object presence is a registered plant, control the fluid control portion to emit fluid from the at least one fluid distributor when it is determined that the detected object is a registered plant to provide fluid to the registered plant, and not provide fluid when it is determined that a plant is not registered.

10. The device of claim 9, wherein the fluid control portion comprises at least one of a pump, a regulator, a solenoid, and a valve configured to control the flow of the fluid.

11. The device of claim 9, wherein the at least one processor is configured to determine at least one of location, velocity, and speed of at least a portion of the mobile watering device.

12. The device of claim 9, wherein the at least one fluid distributor comprises a plurality of fluid distributors situated apart from each other along the body, wherein the at least one processor is configured to selectively control fluid flow to a corresponding fluid distributor of the plurality of fluid distributors.

13. The device of claim 12, further comprising a height adjuster configured to control a height of the at least one fluid distributor.

14. The device of claim 13, wherein the body is supported by at least one wheel, the body configured to support the at least one fluid distributor.

15. The device of claim 14, wherein the at least one processor is further configured to determine a speed of the at least one wheel.

16. The device of claim 9, wherein the at least one sensor comprises a camera.

17. A mobile watering device, comprising:

a body supported by at least one wheel and configured to move over an area of land;

at least one fluid dispenser coupled to the body and configured to emit a fluid therefrom;

at least one sensor coupled to the body and configured to generate proximity information; and at least one processor which is configured to:

analyze the proximity information from the at least one sensor of the system to detect a plant, and control a flow of the fluid from the at least one fluid distributor such that the fluid is delivered to area which includes the detected plant when it is determined that a plant is detected and not supply fluid when it is determined that a plant is not detected.

18. The system of claim 17, wherein the at least one processor is further configured to determine a height of the detected plant in accordance with the proximity information.

19. The system of claim 18, wherein the at least one processor is further configured to adjust a height of at least the fluid dispenser in accordance with the determined height of the detected plant.

20. The system of claim 18, wherein the at least one processor is further configured to determine whether a detected plant is a registered plant and controls the flow of the fluid based upon the determination.

* * * * *